United States Patent
Park et al.

(10) Patent No.: US 11,678,383 B2
(45) Date of Patent: *Jun. 13, 2023

(54) METHOD AND APPARATUS FOR UE SIGNAL TRANSMISSION IN 5G CELLULAR COMMUNICATIONS

(71) Applicant: Samsung Electronics Co., Ltd., Suwon-si (KR)

(72) Inventors: Seunghoon Park, Seoul (KR); Jungmin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,076

(22) Filed: Nov. 5, 2021

(65) Prior Publication Data
US 2022/0061107 A1 Feb. 24, 2022

Related U.S. Application Data

(63) Continuation of application No. 16/799,118, filed on Feb. 24, 2020, now Pat. No. 11,172,515, which is a (Continued)

(30) Foreign Application Priority Data

Jan. 31, 2017 (KR) ........................ 10-2017-0013770

(51) Int. Cl.
*H04W 72/08* (2009.01)
*H04W 74/08* (2009.01)
(Continued)

(52) U.S. Cl.
CPC ... *H04W 74/0841* (2013.01); *H04W 72/0446* (2013.01); *H04W 74/006* (2013.01); *H04W 16/14* (2013.01); *H04W 74/0833* (2013.01)

(58) Field of Classification Search
CPC ......... H04W 74/0841; H04W 72/0446; H04W 74/006; H04W 16/14; H04W 74/0833
See application file for complete search history.

(56) References Cited

U.S. PATENT DOCUMENTS 9,198,186 B2   11/2015   Jung et al.
9,210,676 B2   12/2015   Dinan
(Continued)

FOREIGN PATENT DOCUMENTS

CN    102227948 A  * 10/2011   ............ H04W 76/02
CN    104521312 B  *  6/2019   ............ H01Q 1/242
(Continued)

*Primary Examiner* — Samina F Choudhry
(74) *Attorney, Agent, or Firm* — Jefferson IP Law, LLP

(57) ABSTRACT

A communication method and a system that combines fifth generation (5G) communication systems with internet of things (IoT) technologies to support much higher data rates than fourth generation (4G) communication systems are provided. Based on 5G communication technologies and IoT technologies, the present disclosure can be applied to intelligent services, such as smart home, smart building, smart city, smart car or connected cars, health care, digital education, retail business, and security and safety measure. A method of communication for a user equipment includes receiving a random access channel (RACH) configuration from a base station (an evolved nodeB (eNB)), and transmitting to the eNB a random access preamble (RAP) message in an uplink subframe of an unlicensed band matching a subframe configured as a RACH resource according to the RACH configuration.

16 Claims, 28 Drawing Sheets

Related U.S. Application Data continuation of application No. 15/424,136, filed on Feb. 3, 2017, now Pat. No. 10,575,338.

(60) Provisional application No. 62/291,157, filed on Feb. 4, 2016.

(51) Int. Cl.
  *H04W 72/0446* (2023.01)
  *H04W 74/00* (2009.01)
  *H04W 16/14* (2009.01)

(56) References Cited

U.S. PATENT DOCUMENTS

| | | | |
|---|---|---|---|
| 9,986,559 | B2 | 5/2018 | Bontu et al. |
| 2011/0150156 | A1 | 6/2011 | Xue et al. |
| 2011/0211503 | A1 | 9/2011 | Che et al. |
| 2012/0243498 | A1* | 9/2012 | Kwon ............... H04L 5/0091 370/328 |
| 2013/0188620 | A1 | 7/2013 | Dinan |
| 2013/0301541 | A1 | 11/2013 | Mukherjee et al. |
| 2013/0343307 | A1 | 12/2013 | Desai et al. |
| 2014/0177607 | A1 | 6/2014 | Li et al. |
| 2014/0341018 | A1 | 11/2014 | Bhushan et al. |
| 2015/0009984 | A1 | 1/2015 | Jung et al. |
| 2015/0055588 | A1 | 2/2015 | Yerramalli et al. |
| 2015/0365976 | A1 | 12/2015 | Lee et al. |
| 2016/0095018 | A1 | 3/2016 | Vajapeyam et al. |
| 2016/0323757 | A1 | 11/2016 | Braun et al. |
| 2017/0111889 | A1 | 4/2017 | Li et al. |
| 2017/0164377 | A1 | 6/2017 | Ho et al. |
| 2018/0115361 | A1 | 4/2018 | Li et al. |
| 2018/0184459 | A1 | 6/2018 | Kim et al. |

FOREIGN PATENT DOCUMENTS

| | | | |
|---|---|---|---|
| KR | 10-2014-0003940 A | 1/2014 | |
| KR | 10-2016-0010587 A | 1/2016 | |
| WO | 2014-000644 A1 | 1/2014 | |
| WO | WO-2015046781 A1 * | 4/2015 | ........... H04B 7/2612 |
| WO | 2015-174748 A1 | 11/2015 | |

* cited by examiner

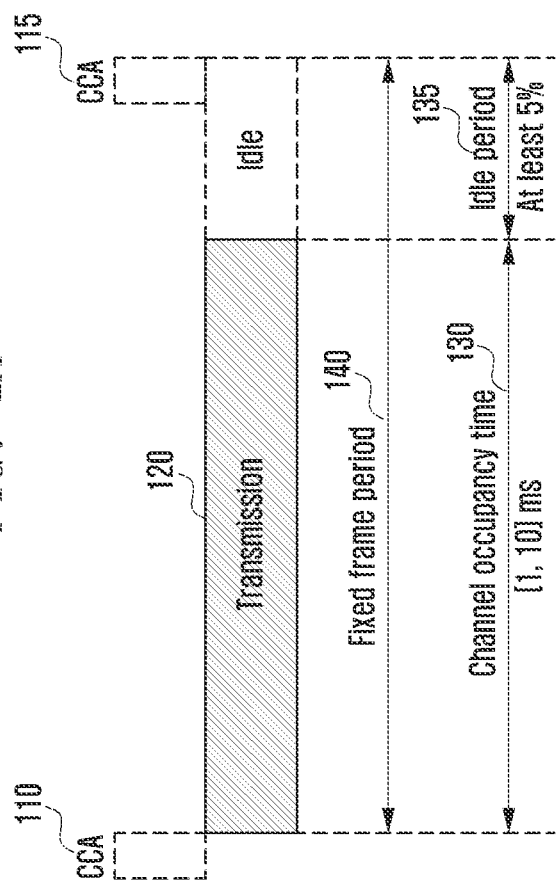
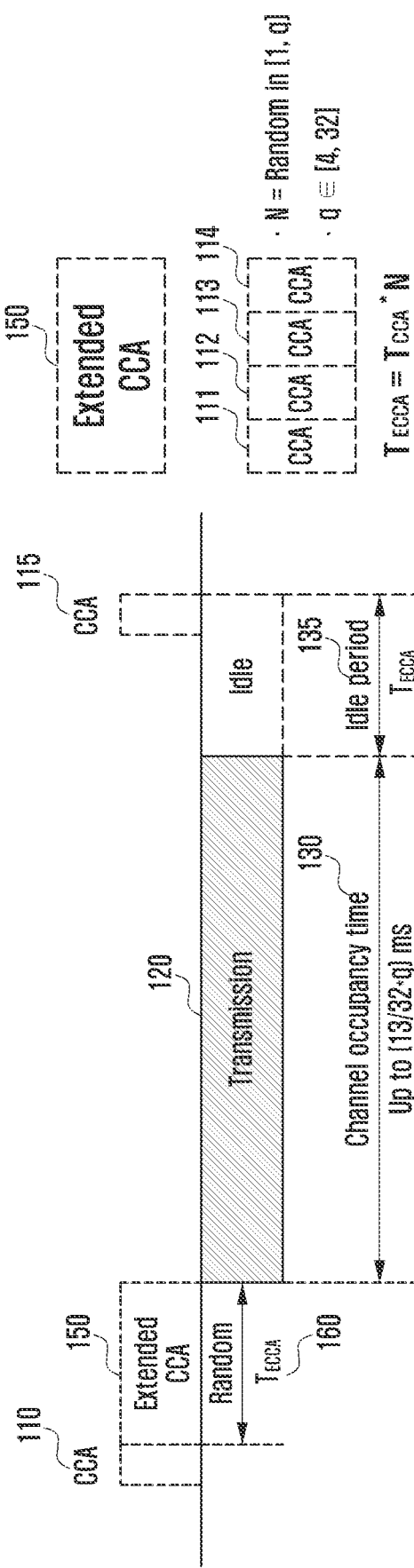

FIG. 23
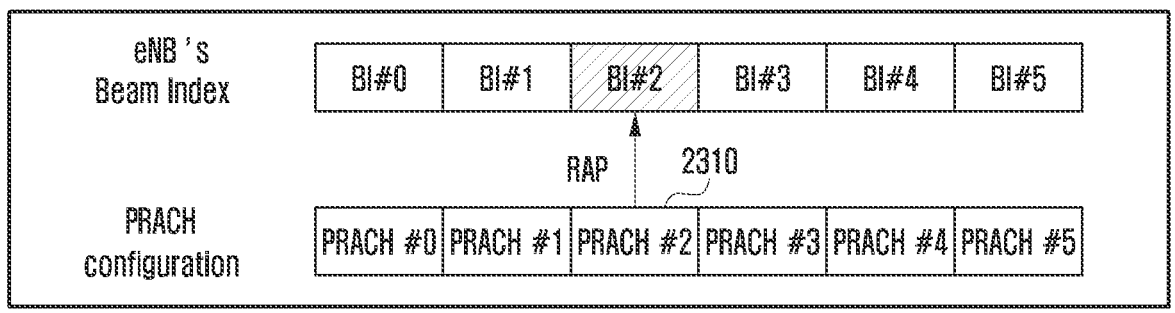
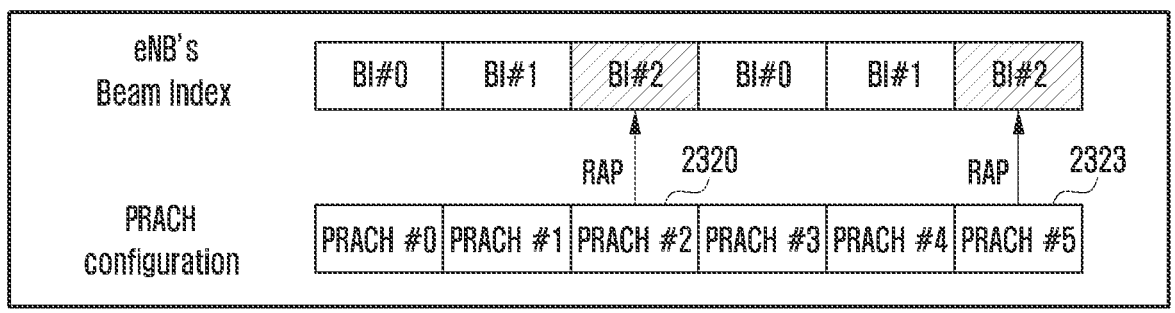
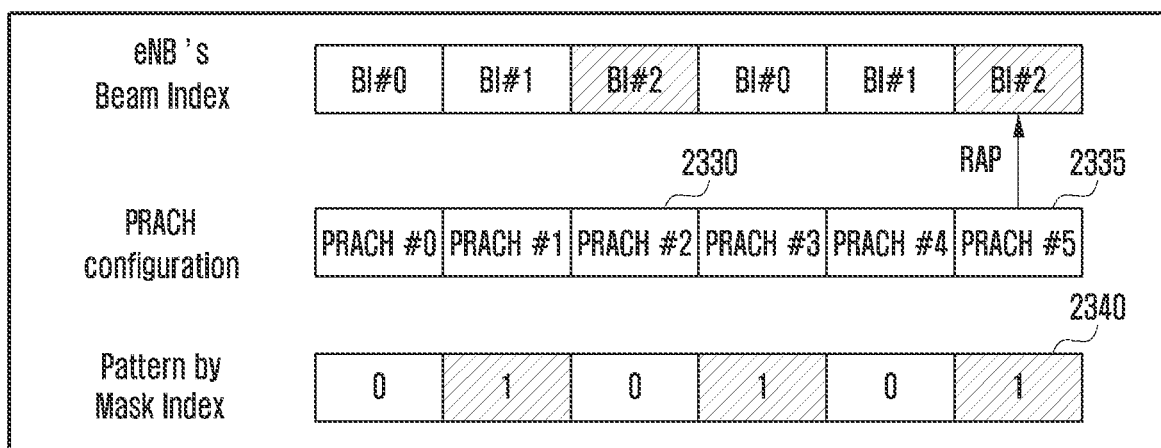

METHOD AND APPARATUS FOR UE SIGNAL TRANSMISSION IN 5G CELLULAR COMMUNICATIONS

CROSS-REFERENCE TO RELATED APPLICATION(S)

This application is a continuation application of prior application Ser. No. 16/799,118, filed on Feb. 24, 2020, which is a continuation application of prior application Ser. No. 15/424,136, filed on Feb. 3, 2017, which has issued as U.S. Pat. No. 10,575,338 on Feb. 25, 2020 and is based on and claims priority under 35 U.S.C. § 119(e) of a U.S. Provisional application Ser. No. 62/291,157, filed on Feb. 4, 2016, in the U.S. Patent and Trademark Office, and under 35 U.S.C. § 119(a) of a Korean patent application number 10-2017-0013770, filed on Jan. 31, 2017, in the Korean Intellectual Property Office, the disclosure of each of which is incorporated by reference herein in its entirety.

TECHNICAL FIELD

The present disclosure relates to a method and an apparatus enabling a communication equipment to communicate in a wireless communication system utilizing fifth generation (5G) bands including unlicensed, licensed shared, and extremely high frequency (EHF) bands.

More particularly, the present disclosure relates to a random access procedure designed for 5G communication using 5G frequency bands including EHF bands, licensed shared access (LSA) bands, and unlicensed bands, and to a transmission method and an apparatus needed for the random access procedure.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and M2M communication may be implemented by beamforming, MIMO, and array antennas. Application of a cloud RAN as the above-described big data processing technology may also be considered to be as an example of convergence between the 5G technology and the IoT technology.

Compared to existing 4G systems, 5G systems are expected to support more diversified services. For example, representative services may include enhanced mobile broad band (eMBB), ultra-reliable and low latency communication (URLLC), massive machine type communication (mMTC), and evolved multimedia broadcast/multicast service (eMBMS). A system providing URLLC services may be referred to as a URLLC system, a system providing eMBB services may be referred to as an eMMB system, and a system providing mMTC services may be referred to as an mMTC system. The words "service" and "system" may be used interchangeably.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an uplink signal transmission method for random access, channel measurement, and terminal feedback in a cellular network using fifth generation (5G) frequency bands including unlicensed, licensed shared and extremely high frequency (EHF) bands.

Another aspect of the present disclosure is to provide a method for channel quality measurement and terminal signal transmission based on coexistence between different systems based on cellular communication using licensed shared bands.

Another aspect of the present disclosure is to provide a control and access method capable of supporting random access in 5G communication.

Another aspect of the present disclosure is to provide a control and access method capable of supporting a variety of services in 5G communication.

In accordance with an aspect of the present disclosure, a method for a base station and a user equipment (UE) to transmit and receive a reference signal or control signal are provided. The method includes transmitting and receiving a control signal regarding channel measurement, and transmitting and receiving a control signal regarding terminal feedback.

In accordance with another aspect of the present disclosure, a random access procedure and operation method for a UE are provided. The random access procedure and operation method include criteria and operations for the base station and UE to transmit a signal, criteria and operations for the base station and UE to receive a signal, criteria and operations for the base station and UE to determine parameters to be included in a transmission signal, criteria and operations to control parameters for transmission according to evolved node B's (eNB's) direction or UE's determination, and criteria and operations to obtain system synchronization according to eNB's direction or UE's determination.

In accordance with another aspect of the present disclosure, a method of communication for a user equipment is provided. The method includes receiving a random access channel (RACH) configuration from an evolved node B (eNB), and transmitting to the eNB a random access preamble (RAP) message in an uplink subframe of an unlicensed band matching a subframe configured as a RACH resource according to the RACH configuration.

The RACH configuration may cause periodic allocation of RACH resources.

Receiving RACH configuration may include receiving the RACH configuration in a downlink subframe of the unlicensed band from the eNB.

The RACH configuration may cause RACH resource allocation by at least one of 1) allocating a subframe appearing after a preset time from the downlink subframe, as a RACH resource, 2) allocating the first or last subframe among consecutive uplink subframes appearing after the downlink subframe, as a RACH resource, and 3) allocating a subframe appearing after a preset time from the downlink subframe as a RACH resource, and allocating, when consecutive uplink subframes end before expiration of the preset time, the last subframe among the consecutive uplink subframes as a RACH resource.

In accordance with another aspect of the present disclosure, a method of communication for a base station is provided. The method includes transmitting RACH configuration to a UE, and receiving a RAP message in an uplink subframe of an unlicensed band matching a subframe configured for the UE as a RACH resource according to the RACH configuration.

Transmitting RACH configuration may include transmitting to the UE the RACH configuration in a downlink subframe of the unlicensed band.

In accordance with another aspect of the present disclosure, a UE is provided. The UE includes a transceiver configured to transmit and receive a signal, and a controller configured to receive RACH configuration from a base station (eNB), and transmit to the eNB a RAP message in an uplink subframe of an unlicensed band matching a subframe configured as a RACH resource according to the RACH configuration.

In accordance with another aspect of the present disclosure, a base station is provided. The base station includes a transceiver configured to transmit and receive a signal, and a controller configured to transmit RACH configuration to a UE, and receive a RAP message in an uplink subframe of an unlicensed band matching a subframe configured for the UE as a RACH resource according to the RACH configuration.

In accordance with another aspect of the present disclosure, a method of communication for a UE is provided. The method includes receiving a beam reference signal from a base station (eNB) in the eNB transmission beam sweeping interval, transmitting to the eNB a RAP message on multiple reception beam resources within the eNB reception beam sweeping interval, and receiving at least one random access response (RAR) message corresponding to the RAP message from the eNB.

In a feature of the present disclosure, it is possible to provide an uplink signal transmission method for random access, channel measurement, and terminal feedback in a cellular network using fifth generation (5G) frequency bands including unlicensed, licensed shared and extremely high frequency (EHF) bands.

In another feature of the present disclosure, it is possible to provide a method for channel quality measurement and terminal signal transmission based on coexistence between different systems based on cellular communication using licensed shared bands.

In another feature of the present disclosure, it is possible to provide a control and access method capable of supporting random access in 5G communication.

In another feature of the present disclosure, it is possible to provide a control and access method capable of supporting a variety of services in 5G communication.

Other aspects, advantages, and salient features of the disclosure will become apparent to those skilled in the art from the following detailed description, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A and 1B illustrate listen before talk (LBT) regulations on unlicensed bands according to an embodiment of the present disclosure;

FIG. 23 illustrates eNB information regarding beams, PRACH configuration table, and PRACH resource selection according to an embodiment of the present disclosure;

Throughout the drawings, like reference numerals will be understood to refer to like parts, components, and structures.

DETAILED DESCRIPTION

Figure 2:
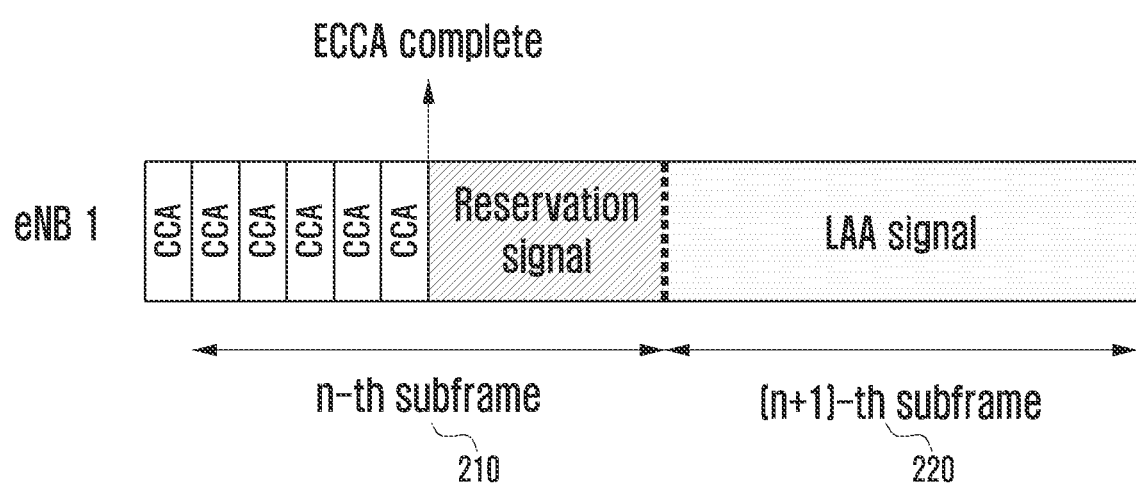
FIG. 2 illustrates transmission of a reservation signal after successful extended clear channel assessment (ECCA) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the drawings, some elements are exaggerated, omitted, or only outlined in brief, and thus may be not drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an field-programmable gate array (FPGA) or application specific integrated circuits (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card. A component or unit may include one or more processors.

Prior to the detailed description, terms or definitions necessary to understand the present disclosure are described. However, these terms should be construed in a non-limiting way.

The "base station" (BS) is an entity communicating with a user equipment and may be referred to as BS, base transceiver station (BTS), NodeB (NB), eNodeB (eNB), access point (AP), or 5G NodeB (5GNB). More particularly, in a heterogeneous network composed of primary base stations and secondary base stations, which serves as the main background of the present disclosure, the primary base station may be referred to as macro BS, primary BS, or primary cell (PCell), and the secondary base station may be referred to as a small BS, a secondary BS, or a secondary cell (SCell).

The "user equipment" (UE) is an entity communicating with a base station and may be referred to as UE, device, mobile station (MS), mobile equipment (ME), or terminal.

The main goal for designing fifth generation (5G) communication is to significantly increase the communication capacity for managing explosive data growth. To this end, active research is underway to utilize wide bandwidths, small cells, and enhanced transmission schemes. In 5G communication, for wider bandwidths, use of licensed bands and unlicensed/shared bands higher than 6 GHz is considered in addition to existing licensed bands up to 6 GHz. In the case of a fixed bandwidth, use of small cells may increase spatial reusability.

Communication using a shared band should comply with transmission regulations set for the band. The transmission regulations may use various approaches to mitigate signal interference between devices, such as limiting transmission power so that reception power does not exceed a preset threshold at a given distance, hopping in position over time or frequency resources, enforcing use of designated resources only among the total resources, and enforcing listening before transmission by permitting transmission only when signal reception power from another device is less than a preset threshold. The transmission regulations are typically applied to license-exempt or unlicensed bands. The following description focuses on the 5 GHz unlicensed spectrum in Europe, and may be applied to other bands based on similar shared-band regulations.

Typical mobile communication needs the following procedure to determine the transmission capacity of transmission and reception links.

In the downlink, the UE measures reference signals from the base station and reports signal quality to the base station. Reference signals of a base station may include common/cell-specific reference signal (CRS), discovery reference signal (DRS), channel state information-reference signal (CSI-RS), and demodulation reference signal (DMRS). Here, CRS, DRS and CSI-RS are given to all UEs belonging to the coverage of the base station, and DMRS is given to a specific UE. The UE may be controlled by the base station to periodically or aperiodically measure or monitor CRS/DRS/CSI-RS and report channel quality in the form of channel quality indicator (CQI) to the base station. The UE may use an uplink control channel for periodic reporting and use an uplink data channel for aperiodic reporting. The base station performs scheduling based on CQIs reported by UEs to determine how to allocate physical channel resource blocks to individual UEs, and notifies per-UE allocation information to the individual UEs. For a particular UE, this allocation information scrambled with the cell radio network temporary identifier (C-RNTI) or multimedia broadcast/multicast service (M-RNTI (RNTI) of the UE is transmitted as a control signal through the physical downlink control channel (PDCCH). Upon reception of the control signal, the UE receives the physical channel resource block allocated to it from the physical downlink data channel (PDSCH) indicated by the control signal.

In the uplink, the base station may be aware of signal quality by measuring a reference signal from the UE. The reference signal of a UE may be sounding reference signal (SRS), which is scheduled by the base station on a periodic basis of 2 to 320 ms. Although different from the current specification, use of DMRS transmitted together with UE uplink data can be considered. The base station performs scheduling based on CQIs obtained by measuring reference signals from UEs to determine how to allocate physical channel resource blocks to individual UEs, and notifies per-UE allocation information to the individual UEs. For a particular UE, this allocation information scrambled with the C-RNTI or M-RNTI of the UE is transmitted as a control signal through the PDCCH. Upon reception of the control signal, the UE transmits the physical channel resource block allocated to it from the PUSCH indicated by the control signal.

Meanwhile, it may be expensive to densely deploy small cell base stations based on interference. Use of unlicensed/shared bands requires consideration of coexistence with devices of different systems or network operators. In this regard, it is necessary to consider schemes for interference control between small cell base stations and schemes for resource access.

In addition, it is necessary to provide a resource access scheme suitable for various service characteristics. More particularly, in a scenario where small cell base stations operate independently, a random access procedure is required for communication involving uplink transmission. In some cases, uplink transmission of the UE may be not ensured according to characteristics of the frequency band. For example, uplink transmission of the UE (transmission or reception of a UE signal for random access, in particular) may fail when the unlicensed band is found to be being used by another device, when the shared band is found to be being used by a higher-priority device, or when the previously configured beam is misaligned owing to beam mismatch in the EHF band.

An uncertainty may occur in the RACH procedure owing to beam mismatch in the case of an EHF band, and owing to regulation characteristics in the case of an unlicensed band or a licensed shared band. Hence, it is necessary to consider a mechanism to handle such uncertainty. In the following description, a listen before talk (LBT) failure of a base station or UE in a licensed shared band may be interpreted that the base station or UE is not allowed to use the licensed shared band because the band is occupied by a higher tier device.

FIGS. 1A and 1B illustrate LBT regulations on unlicensed bands according to an embodiment of the present disclosure, and FIG. 2 illustrates transmission of a reservation signal after successful ECCA according to an embodiment of the present disclosure.

Devices using unlicensed bands are classified into frame based equipment (FBE) and load based equipment (LBE). Each device should comply with the following regulations.

Referring to FIG. 1A, in the case of FBE, the transmitter should perform clear channel assessment (CCA), 110) for at least 20 μs before starting transmission (120). The CCA procedure may be performed by a transmitter to determine whether the corresponding unlicensed band is used by another device by examining the level of interference. The transmitter does not start transmission if the level of interference is higher than or equal to a preset threshold, and starts transmission if the level of interference is lower than the threshold. After occupying the unlicensed band for a time duration ranging from 1 ms to 10 ms (channel occupancy time (130)), the transmitter keeps silent and waits for a short time (idle period (135)). The idle period is about 5 percent of the channel occupancy time. If CCA finds that the unlicensed band is occupied by another device, the transmitter may newly perform CCA (115) after a fixed frame period (140).

Referring to FIG. 1B, in the case of LBE, the transmitter should perform CCA (110) for at least 20 μs before starting transmission like the case of FBE. If CCA finds that the unlicensed band is not occupied by another device, the transmitter may start transmission (120). If CCA finds that the unlicensed band is occupied by another device, the transmitter should perform additional CCA (150) (namely, extended CCA or ECCA), unlike the case of FBE. ECCA (150) (corresponding to duration TECCA (160)) is composed of N CCAs (111, 112, 113, 114), where N is randomly selected from the range $\{1, 2, \ldots, q\}$ and q is a preset value. Although N is set to 4 in FIG. 1B, N may be a value less than or greater than 4. The CCA counter initially set to N is decremented whenever CCA is successfully performed. When the unlicensed band is found to be occupied before the CCA counter becomes 0, the transmitter freezes its operation by saving the CCA counter and waiting for release of occupation. When the unlicensed band is found to be available again, the transmitter resumes decrementing the CCA counter. When the CCA counter becomes 0 and the unlicensed band is not occupied by another device, the transmitter start transmission (120) after the end of the last CCA time. Here, the maximum channel occupancy time (130) for LBE operation is (13/32)*q ms. Thereafter, the transmitter has an idle period (135) and newly performs ECCA (115).

The FBE and LBE mechanisms have their own advantages and disadvantages. First, the LBE mechanism may perform better than the FBE mechanism in terms of the possibility of occupying the unlicensed band. The reason is as follows. In the FBE mechanism, if CCA (110) fails, it is not allowed for execution for the fixed frame period (140). In the LBE mechanism, if CCA (110) fails, ECCA (150) is initiated, providing N additional CCA opportunities (150, 111, 112, 113, 114) for occupying the unlicensed band.

Second, the FBE mechanism is better (simpler) than the LBE mechanism in terms of scheduling or PDCCH transmission. In the FBE mechanism, the unlicensed band may be used at subframe boundaries, that is, according to the PDCCH transmission timing. In the LBE mechanism, as the value for N (the number of CCA operations in ECCA (150)) is randomly selected, it is difficult to synchronize the start time of occupation of the unlicensed band with the subframe boundary. For example, referring to FIG. 2, the LBE mechanism reserves a portion of n-th subframe (210) and performs PDCCH and data transmission at (n+1)-th subframe (220).

Additionally, the FBE mechanism causes less influence on nearby Wi-Fi devices sharing the unlicensed band in comparison to the LBE mechanism. The LBE mechanism tends to have a higher possibility of occupying the unlicensed band compared with the FBE mechanism, and it can be considered that the LBE mechanism takes away the corresponding opportunities from nearby Wi-Fi devices.

Figure 3:
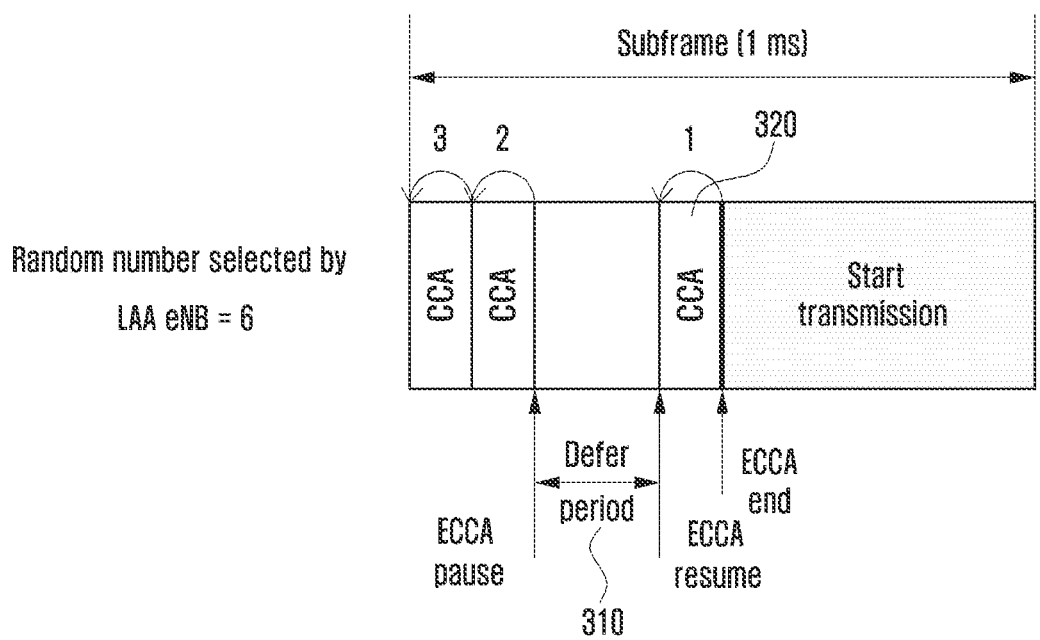
FIGS. 3 and 4 illustrate variations of load based equipment (LBE) operation according to an embodiment of the present disclosure.
Figure 4:
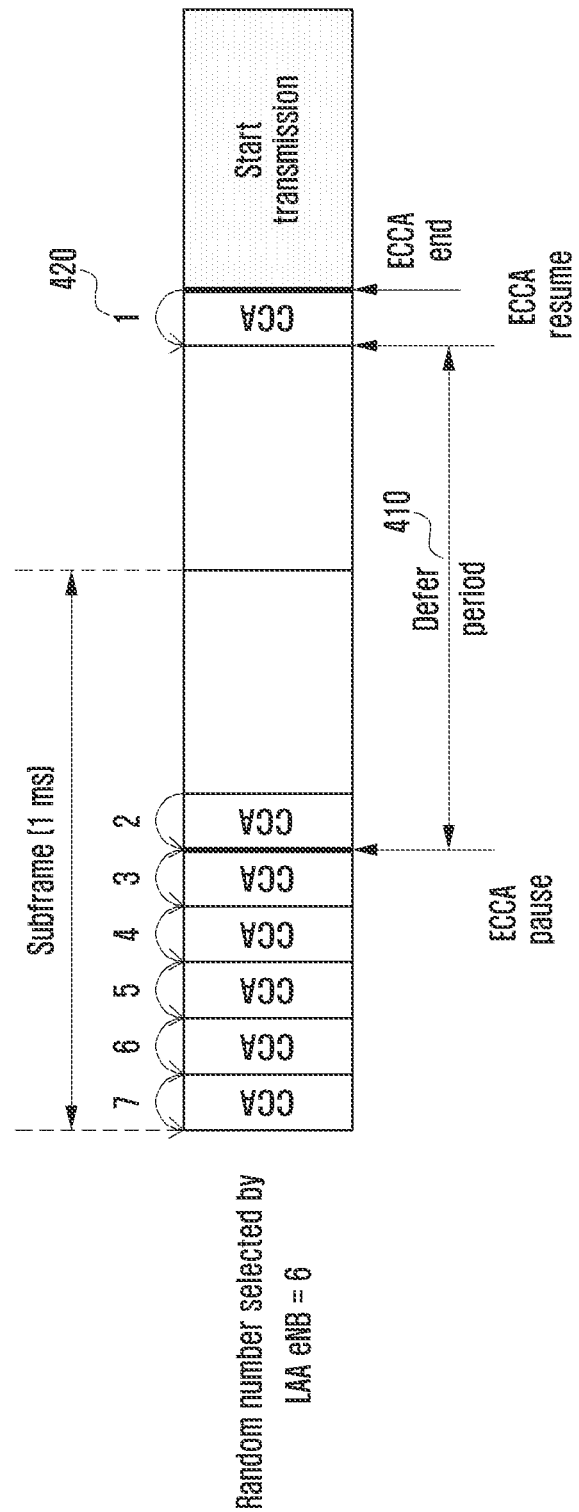

FIGS. 3 and 4 illustrate variations of LBE operation according to an embodiment of the present disclosure.

Referring to FIGS. 3 and 4, a modified LBE mechanism may be used for mixed FBE/LBE operation. The modified LBE mechanism may be useful to increase the frequency reuse efficiency by causing neighboring base stations to transmit at the same point in time, or to mitigate transmission and reception interference between different channels by causing transmissions to occur at the same point in time. Additionally, in the uplink, it is possible to address the issue that only one of neighboring devices is allowed to transmit owing to failure of CCAs between devices.

In the modified LBE mechanism, the transmitter (base station or UE) operates in the same way as required by the original LBE mechanism, but performs defer operation (310, 410) by suspending ECCA and waiting when the ECCA count becomes one (320, 420). The defer operation (310, 410) is performed until reaching a point in time set by the base station or UE. At the set point in time, ECCA is resumed. When the resource is found to be available, the transmitter decrements the last ECCA count (320, 420) and immediately starts transmission. When the last ECCA count is not reached until the set point in time, the transmitter performs the same operation for the next scheduled point in time.

Meanwhile, although using an unlicensed band, the user equipment operating in a mobile environment needs to keep in contact with a corresponding licensed band to provide reliable cellular communication services. Hence, the user equipment may increase the available data rate by providing a delay-sensitive service like a voice service through the licensed band and by providing a data service through opportunistic utilization of the unlicensed band in addition to the licensed band.

Carrier aggregation (CA) and dual connectivity (DC) are usually considered for enabling a cellular system to utilize the unlicensed spectrum. In carrier aggregation, the PCell may be assigned to one band and one or more SCells may be assigned to another band. For the purpose of performance, main control procedures for initial attachment, random access, channel quality reporting, and acknowledgement (ACK)/negative acknowledgement (NACK) reporting may be carried out through the PCell. In dual connectivity, separately from the PCell, a PSCell (PUCCH SCell, SCell with PUCCH) may be assigned to the unlicensed band, and main control procedures for initial attachment, random access, channel quality reporting, and ACK/NACK reporting may be carried out through the PSCell. In the present disclosure, "PCell" may be used interchangeably with "PSCell" or SCell with a non-PUCCH channel configured as a reporting resource.

In a heterogeneous network, the UE may communicate with PCell to handle mobility-sensitive traffic such as main system information, control signals, and voice data, and may communicate with SCell to handle instantaneous high-volume traffic like a data service. In the present disclosure, SCell is assumed to be configured for the shared band. A cellular communication system of this type may be long term evolution licensed-assisted access (LTE LAA). In the following description, a user equipment additionally using the shared band is referred to as LAA UE, and a user equipment using the licensed band only is referred to as LTE UE.

A UE within the coverage of the eNB may be either in radio resource control (RRC) Idle state or in RRC Connected state. These two states may be described as follows.

RRC Idle: in this state, the UE performs eNB (or cell) selection, monitors the paging channel and receives system information (SI), but does not transmit or receive data to or from the eNB. The UE may be described as camping on the eNB.

RRC Connected: in this state, the UE monitors the control channel, and transmits and receives data to and from the eNB through a data channel. To help eNB scheduling, the UE reports various measurement results related with the eNB and neighboring eNBs. The UE may be described as being served by the corresponding eNB, and the corresponding eNB may be referred to as a serving cell for the UE.

A UE remaining in RRC Idle state (RRC Idle UE) performs time/frequency synchronization and cell (re)selection in order to establish a connection to the eNB. The UE may receive synchronization signals (primary synchronization signal (PSS) and secondary synchronization signal (SSS) periodically transmitted by the eNB. While receiving system information master information block (MIB), system information block 1 (SIB1), system information block 2 (SIB2), system information block 2 X (SIBX) through broadcast channel signals from eNBs, the UE measures reference signals (RS) and may select one of the eNBs based on channel qualities. Only when parameters regarding channel quality satisfy preset criteria, while camping on a specific eNB, the UE may identify the ID thereof via paging or may start the random access procedure.

The present disclosure provides a method that enables a UE to report channel measurement results with respect to a reference signal transmitted by an eNB and enables the eNB to direct or assist channel selection of the UE based on UE reports.

The following description focuses on carrier aggregation and small cell technologies specified in the third generation partnership project (3GPP) LTE advanced LTE-A) standards.

The carrier aggregation technology has been devised to extend transmission and reception operations using one licensed band to those using multiple bands. Here, the existing licensed band may be referred to as primary component carrier (PCC), and the newly added band may be referred to as secondary component carrier (SCC). The PCC may be used for establishment and management of a connection to the network and mobility control, and the SCC may be used for data transmission only. To support the newly added band, it is necessary to add a separate RF circuit to the eNB and the UE. When the newly added band is a shared band, unlike the existing licensed band, it is required to consider a resource access scheme such as LBT for the purpose of coexistence.

The small cell technology may be used to address the ever increasing data demand by employing multiple small base stations. Such a small base station may be referred to as a small cell, a small eNB or an SeNB. Small cells may increase the signal-to-noise rate (SNR) for UEs and increase the eNB capacity. However, small cells may decrease the distance between eNBs and increase the number of neighbor eNBs, causing an overall increase in interference. Compared to a macro eNB (MeNB) with a large coverage, a small eNB may be more directly exposed to fluctuations in number of UEs or in traffic demand. Hence, it may be necessary to deactivate a small eNB without a traffic request. As a deactivated small eNB does not transmit a reference signal, the overall interference is reduced. Consequently, the UE may receive a reference signal from an activated small eNB with enhanced reception performance.

To perform eNB access and mobility control differently for the MeNB cell and the SeNB cell, two cell groups are defined as follows.

1) Master cell group (MCG): MCG indicates a group of serving cells controlled by the MeNB and is composed of one PCell and up to N SCells.

2) Secondary cell group (SCG): SCG indicates a group of serving cells controlled by the SeNB and is composed of one PUSCH (or primary) secondary cell (PSCell) and up to N secondary cells (SCells).

Unlike MCG with PCell, PSCell is defined for SCG and is always in active state unlike a SCell. The difference between PCell and PSCell is described below.

PCell functions random access, PUCCH, channel quality measurement, mobility control, and security.

PSCell functions random access, PUCCH, and channel quality measurement.

In the case of dual connectivity (DC), PCell and PSCell are referred to as a special cell (SpCell), and MCG and SCG are linked through a non-ideal backhaul.

In unlicensed/shared/EHF bands, it may be difficult to sustain the assumption that the eNB can always receive a signal from the UE or the UE can always receive a signal from the eNB. For example, in the case of unlicensed/shared bands, the eNB or UE may be blocked by LBT operation at the moment of transmission. In the case of EHF bands, the beam of the eNB may be invisible to the UE, or the beam of the UE may be invisible to the eNB.

Hence, for performance improvement in the random access or channel quality reporting procedure, it is necessary to allow the eNB and the UE to increase their opportunity to transmit as much as possible.

[Random Access Procedure]

Next, a description is given of a procedure for RA.

Figure 5:
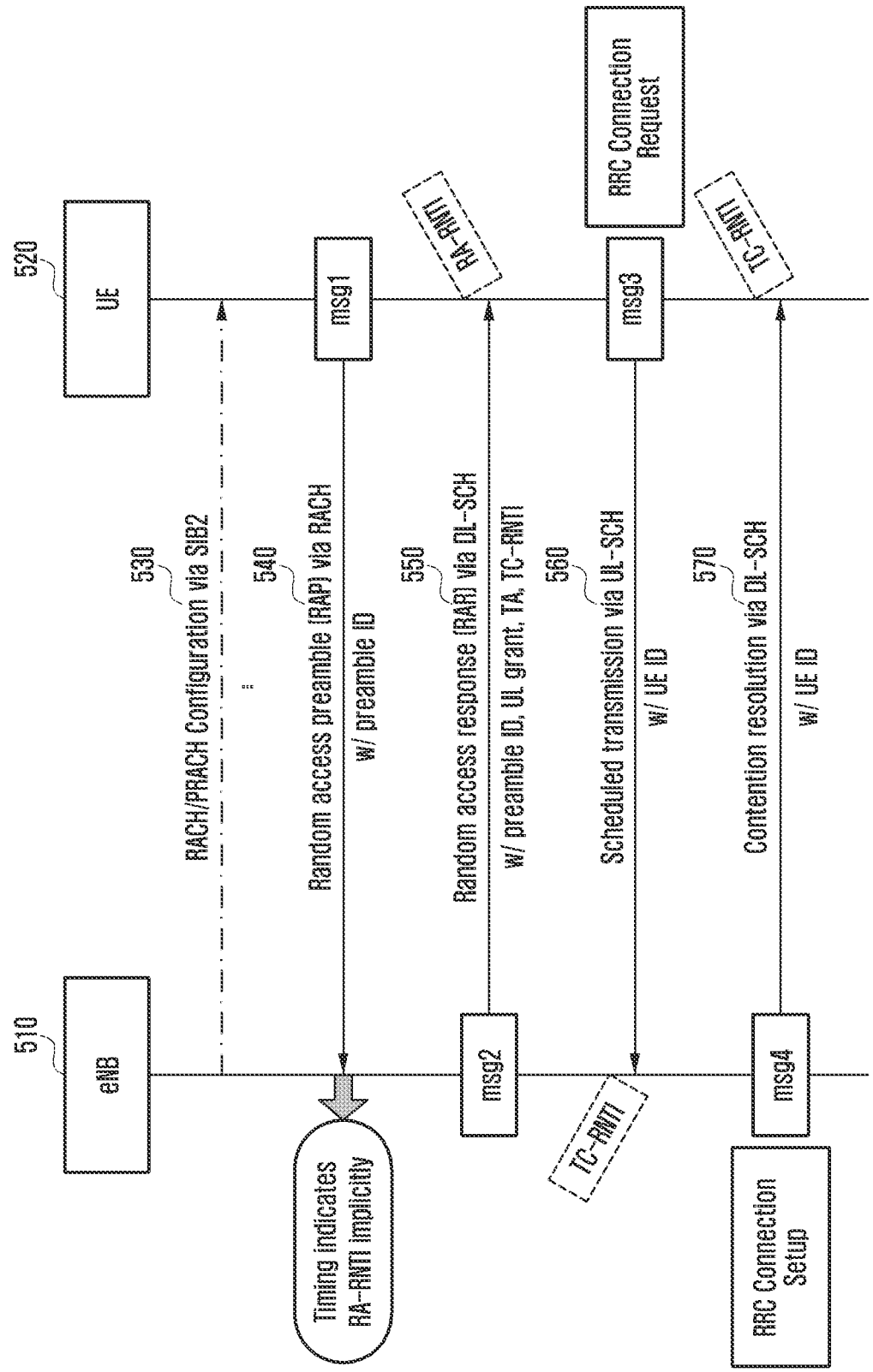
FIG. 5 is a sequence diagram for a random access procedure according to an embodiment of the present disclosure.

FIG. 5 is a sequence diagram for a random access procedure according to an embodiment of the present disclosure.

Referring to FIG. 5, a UE 520 remaining in RRC Idle state performs time/frequency synchronization and cell (re)selection in order to establish a connection to an eNB 510. The UE 520 may receive synchronization signals (PSS/SSS) periodically transmitted by eNBs. While receiving system information (MIB, SIB1, SIB2, SIBX) through broadcast channel signals from eNBs, the UE 520 measures RS and may select the eNB 510 among the eNBs based on channel qualities. Only when parameters regarding channel quality satisfy preset criteria, the UE 520 may start the random access procedure.

The eNB 510 and the UE 520 may carry out a contention-based RA procedure in the following way. Except for RAP message (msg1), other messages (e.g., msg2, msg3, msg4, and the like) may be transmitted through the downlink or uplink shared channel (DL/UL-SCH).

At operation 530, the UE 520 identifies the RACH resource location and variables for RACH operation (RAR window, CR timer, backoff index, maximum retry count, and power control parameter) through synchronization and system information acquisition. To this end, the UE 520 may obtain RACH/PRACH configuration through a system information block (SIB) (e.g., SIB2) received from the eNB 510.

At operation 540, the UE 520 transmits a RAP sequence (msg1) to the eNB 510. Here, the RAP message may contain a preamble ID selected by the UE 520 from a preamble ID set. The RAP message may be transmitted to the eNB 510 through RACH.

At operation 550, the eNB 510 transmits a random access response (RAR) message (msg2) to the UE 520. Here, the UE 520 may receive corresponding msg2 differentiated by RA-RNTI determined at operation 540 from the eNB 510. The RAR message may be transmitted to the UE 520 through DL-SCH. The RAR message may contain a preamble ID, UL grant, TA, TC-RNTI, and the like.

At operation 560, the UE 520 transmits a specific message (msg3) using a resource allocated by msg2 to the eNB 510. Here, the eNB 510 may identify msg3 from the UE 520 by use of temporary C-RNTI transmitted to the UE 520 at operation 550. Message msg3 may be a scheduled transmission message (RRC connection request), may be transmitted to the eNB 510 through UL-SCH, and may contain the ID of the UE 520 (UE ID).

At operation 570, the eNB 510 transmits a specific message (msg4) to the UE 520. The UE 520 may identify corresponding msg4 by using temporary C-RNTI received at operation 550. Message msg4 may be a contention resolution message (RRC connection setup), may be transmitted to the UE 520 through DL-SCH, and may contain UE ID.

Upon reception of SIB2, the UE 520 may determine initial transmission power and transmit RAP message using the determined initial transmission power (operation 540). If RAR message is not received from the eNB 510 within a preset duration (RAR window) after transmitting RAP message, the UE 520 may retransmit RAP message. Normally, the UE 520 may perform RAP retransmission up to the preset maximum retry count. When the UE 520 has failed to receive RAR message even after maximum number of RAP retransmissions, the UE 520 may increase the transmission power by a given power ramp-up amount, reset the retry count to zero, and repeat the random access process. The values for variables such as initial transmission power, RAR window, and maximum retry count may be contained in the SIB message transmitted by the eNB 510.

In 5G communication, use of new frequency bands is under consideration to obtain wider bandwidths for data rates of at least 1 Gbps. More particularly, the mmWave band has attracted attention. The mmWave band is the 30 to 300 GHz band of the electromagnetic spectrum (10 to 1 mm wavelength). In an mmWave communication, power loss is large owing to attenuation of radio waves, limiting the transmission distance. Beamforming is being researched to overcome the limitation of short transmission distance. With beamforming, transmission power can be concentrated in a specific direction according to the configuration of the transmit antenna. The receive antenna may also enhance performance in a specific direction with beamforming. In a communication system using transmission and reception beamforming, unlike in the case of a communication system using omnidirectional antennas, a UE close to the eNB may be unable to communicate with the eNB according to the beam direction. Hence, a procedure for signal transmission, reception, measurement and reporting is needed to periodically determine the direction of transmission and reception beams.

During the random access procedure, as connection setup is not completed, a suitable direction of transmission and reception beams is not yet determined. Hence, determination of a suitable direction for transmission and reception beams is to be considered in the random access procedure. In addition, after connection setup, it is necessary to address the situation where beam mismatch occurs owing to misalignment between transmission and reception beams.

In the case of contention-free random access, the eNB instructs a particular UE to start random access by using an order of PDCCH (physical downlink control channel) or a RRC (radio resource control) message of the upper layer. The directive message may include Preamble ID to be used by the UE and a mask index indicating the RACH resource allowed to use within one frame.

Figure 6:
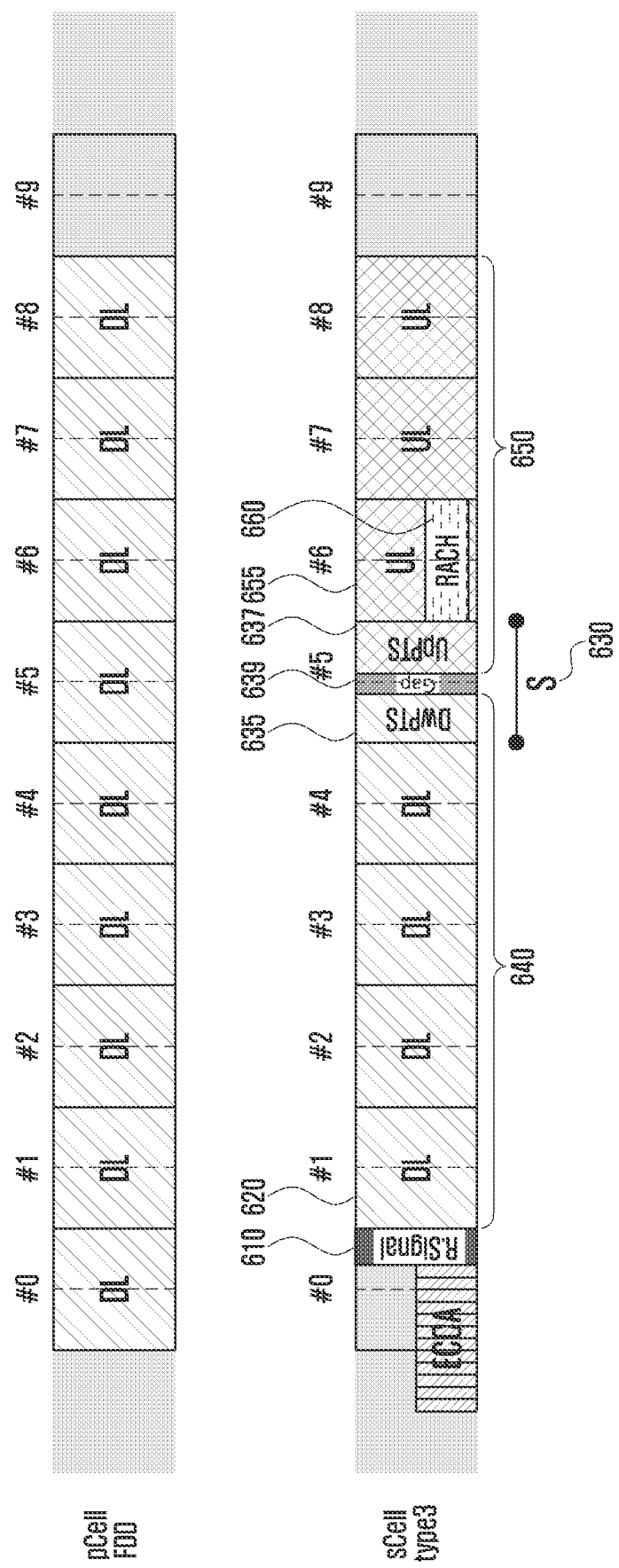
FIG. 6 illustrates a primary cell (PCell) and a secondary cell (SCell) structures and a random access channel (RACH) configuration structure according to an embodiment of the present disclosure.

FIG. 6 illustrates PCell and SCell structures and a RACH configuration structure according to an embodiment of the present disclosure.

Referring to FIG. 6, a type 3 frame structure of an SCell where a RACH (660) is configured in an uplink resource (655) is illustrated. In the related art, frequency division duplex (FDD) uses the type 1 frame structure, and time division duplex (TDD) uses the type 2 frame structure.

In the type 3 frame structure, when the channel is occupied by the eNB, a reservation signal (610) is transmitted until the subframe boundary is reached and DL subframe #1 (620) starts at the subframe boundary (indicated by #1). Thereafter, successive DL subframes (640) are arranged and subframe #5 is configured as a special subframe (630). In the special subframe (630), as data may be transmitted only in DwPTS (635) and UL grant is not allowed in UpPTS (637), when a different signal (PRACH, PUCCH, or SRS) is not arranged in UpPTS (637), the interval from gap period (639) to the start of subframe #6 (655) remains empty. In one embodiment of the present disclosure, it is possible to configure subframe #5 as a DL subframe, without a special subframe, immediately followed by UL subframe #6 (655). In this case, the UE transmitting at the first UL subframe (subframe #6 (655)) may skip LBT operation.

In the type 3 frame structure, the interval of successive DL subframes (640) may be referred to as DL burst, and the interval of successive UL subframes (650) may be referred to as UL burst. Here, the eNB may notify the UE of the end point of the DL burst (640) at the last DL subframe (subframe #5) or at the next-to-last DL subframe (subframe #4) through Common DCI. The eNB may notify the UE of the length of the UL burst (650) at any of DL subframes. In FIG. 6, PRACH is configured in subframe #6 (second UL subframe) as indicated by indicia 655.

Static or Semi-Static Physical Layer RACH Resource Configuration

Figure 7:
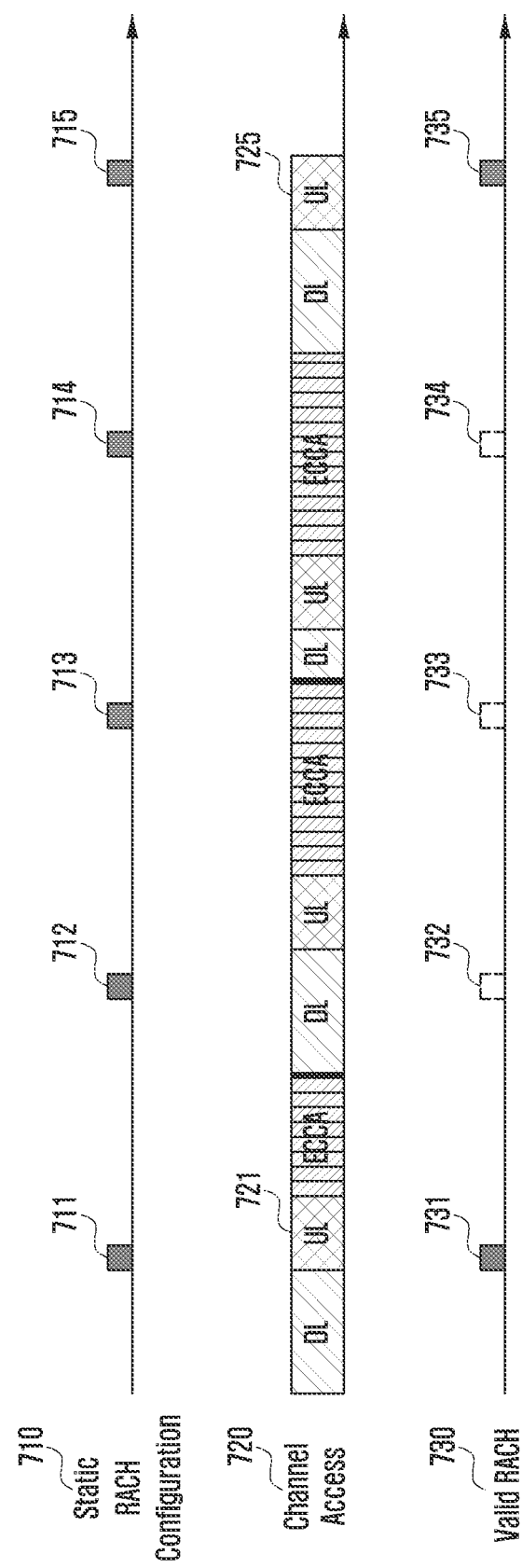
FIG. 7 illustrates a long periodic static RACH resource allocation according to an embodiment of the present disclosure.

FIG. 7 illustrates a long periodic static RACH resource allocation according to an embodiment of the present disclosure.

Referring to FIG. 7, RACH is statically allocated on a periodic basis of a long period with respect to the time reference of PCell as indicated by indicia 710. As RACH resource configuration is periodically allocated with respect to the time reference of PCell, it is difficult to predict the actual occupancy time of the DL burst and UL burst in the unlicensed band where type 3 frame structure is used as indicated by indicia 720. Here, only when the obtained UL subframe matches the RACH configured subframe, RACH configuration is valid as indicated by indicia 730. Specifically, the eNB may allocate RACH on a periodic basis of a long period with respect to the time reference of PCell as indicated by indicia 710. Here, indicia 720 indicates an actual DL and UL subframe configuration in the unlicensed band where type 3 frame structure is used. In this case, among RACHs configured in subframes (711, 712, 713, 714, 715), those RACHs configured in subframes (731, 735) matching a UL subframe of the unlicensed band (721, 725) are valid. Among RACHs configured in subframes (711, 712, 713, 714, 715), those RACHs configured in subframes (732, 733, 734) matching a DL subframe of the unlicensed band are invalid.

Figure 8:
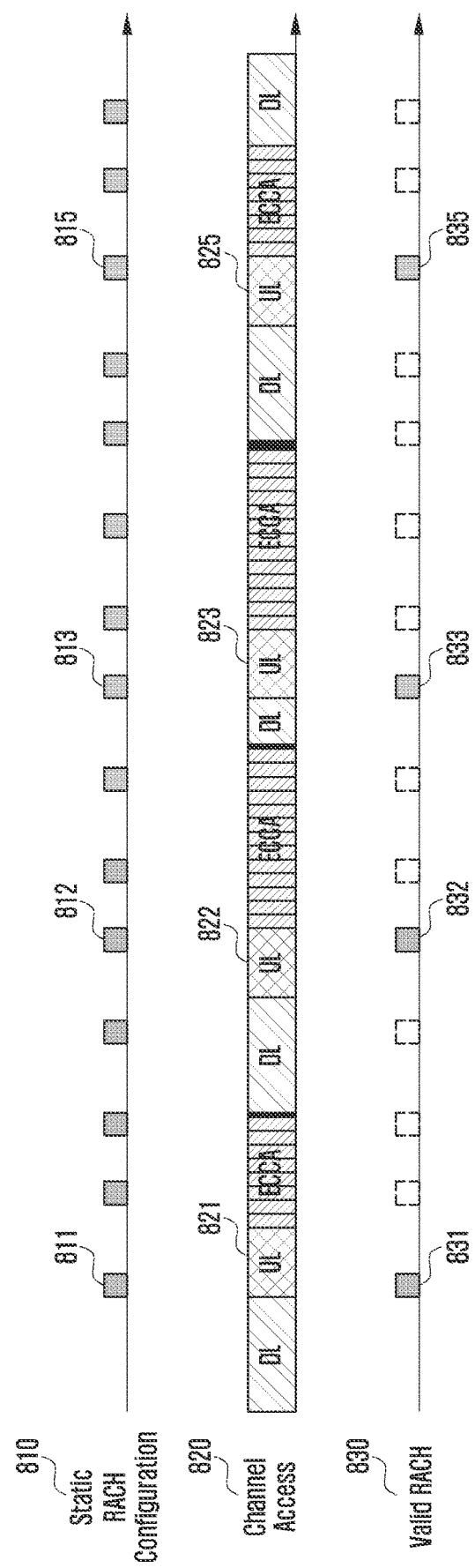
FIG. 8 illustrates a short periodic static RACH resource allocation according to an embodiment of the present disclosure.

FIG. 8 illustrates a short periodic static RACH resource allocation according to an embodiment of the present disclosure.

Referring to FIG. 8, RACH is allocated on a periodic basis of a short period with respect to the time reference of PCell as indicated by indicia 810. When the RACH period is short, the RACH configuration frequently matches UL subframes based on DL/UL switching due to LBT operation as indicated by indicia 820, increasing the number of valid RACHs as indicated by indicia 830. However, when many resources are configured as RACH, RACH would be allocated in too many UL subframes according to the LBT result. Specifically, the eNB may statically allocate RACH on a periodic basis of a short period with respect to the time reference of PCell as indicated by indicia 810. Here, indicia 820 indicates an actual DL and UL subframe configuration in the unlicensed band where type 3 frame structure is used. In this case, among RACHs configured in subframes (811 to 815), those RACHs configured in subframes (831, 832, 833, 835) matching a UL subframe of the unlicensed band (821, 822, 823, 825) are valid. Among RACHs configured in subframes, those RACHs configured in subframes matching a DL subframe of the unlicensed band are invalid. Use of a short RACH period may increase the number of valid RACHs as indicated by indicia 830.

In general, the static RACH resource configuration (710, 810) may be notified by the eNB to the UE in the form of prach-ConfigIndex (physical-layer RACH configuration index) of SIB2 via BCCH. As SIB2 is system information transmitted on a periodic basis of 160 ms, the static RACH resource configuration may also be changed on a periodic basis of 160 ms. Hence, it may be difficult to dynamically adjust the density of RACH resources based on the channel access result and the level of congestion.

Dynamic Physical Layer RACH Resource Configuration

Figure 9:
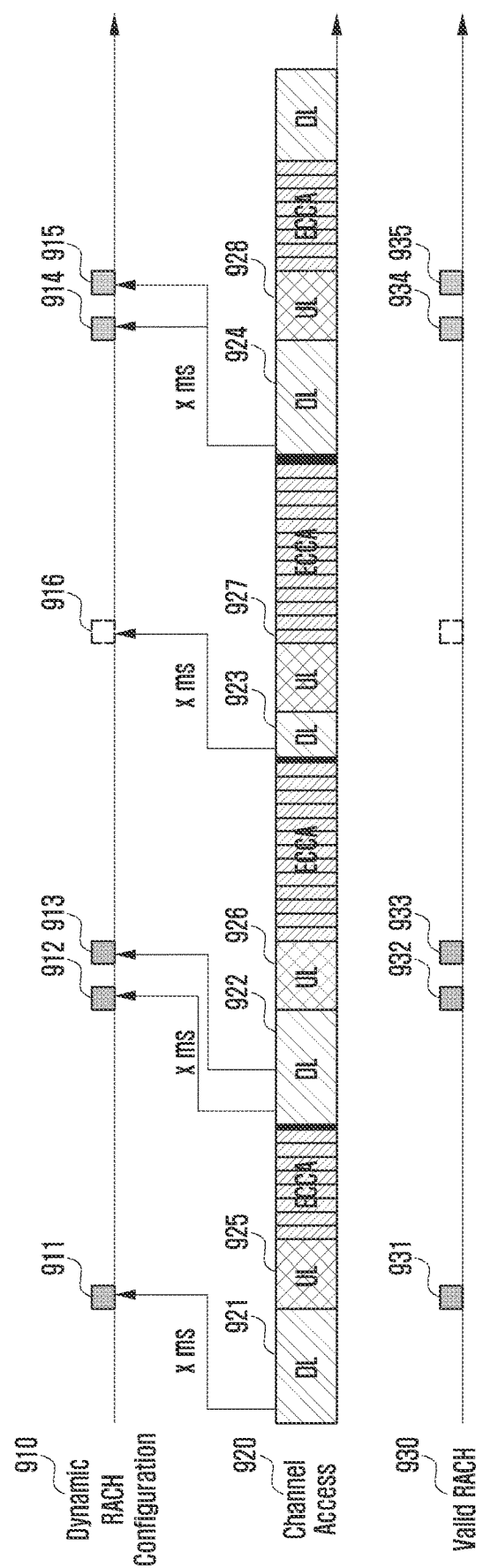
FIG. 9 illustrates a dynamic RACH resource allocation according to an embodiment of the present disclosure.

FIG. 9 illustrates dynamic RACH resource allocation according to an embodiment of the present disclosure.

Referring to FIG. 9, RACH resource is dynamically allocated in the same carrier as indicated by indicia 910 without periodic pre-allocation of RACH resources. In the existing scheme, the subframe in which RACH is allocated is determined according to the frame configuration and RACH density, and this information is given as a table. In the scheme of FIG. 9, for the DL and UL subframe structure (920) beginning at the channel occupation time, RACH operation may be dynamically scheduled in subframes (911, 912, 913, 914, 915, 916) matching a valid UL subframe (925, 926, 927, 928) after x subframes (assuming that subframe length is 1 ms) from the DL subframe in which the order is issued (921, 922, 923, 924). Valid RACHs are indicated by indicia 930 and RACH configured in a subframe matching a UL subframe after x subframes from order issuance is valid. RACH configured in a subframe matching a DL subframe after x subframes from order issuance is invalid as indicated by indicia 916. Those RACHs configured in subframes (931, 932, 933, 924, 935) matching a UL subframe of the unlicensed band (911, 912, 913, 914, 915) are valid.

Here, x ms is a time interval determined based on the preparation time needed for RAP transmission. Hence, x ms prior notification may suffice to allocate at least one RACH resource in subsequent UL subframes as desired by the eNB. As described above, this scheme uses a fixed time of x ms. Hence, when the number of available DL subframes is too small owing to a small amount of DL data, or when the number of available UL subframes is too small owing to LBT failure in an UL subframe, RAP transmission may fail.

Meanwhile, dynamic RACH resource allocation may create a conflict with system frame number (SFN) being an existing absolute time unit, and other configuration settings based on subframe indexes (discovery reference signal (DRS) measurement, RRM measurement, received signal strength indicator (RSSI) measurement, RACH configurations with different priorities). Hence, it is necessary to define the priority between different configurations that the UE may encounter in the same subframe. Namely:

1) In an UL subframe where PUSCH is not allocated, DRS measurement configuration, inter-carrier measurement gap, or RSSI measurement configuration takes priority over RACH configuration. This rule may be (always or depending on settings) applied only to a specific cell (e.g., PSCell).

2) In an UL subframe where PUSCH is not allocated, RACH configuration takes priority over DRS measurement configuration, inter-carrier measurement gap, or RSSI measurement configuration. This rule may be (always or depending on settings) applied only to a specific cell (e.g., SCell).

3) When PUSCH allocation conflicts with RACH configuration, PUSCH allocation takes priority over RACH configuration. This rule may be (always or depending on settings) applied only to contention-based random access (CBRA).

4) When PUSCH allocation conflicts with RACH configuration, RACH configuration takes priority over PUSCH allocation. This rule may be (always or depending on settings) applied only to contention-free random access (CFRA).

5) It is possible to define RACH configuration priority between different SCells. First, according to the information given to SCells by upper layer (e.g., RRC) messages, for example, the SCell where PUCCH and PRACH are allocated takes priority over the SCell where PRACH is allocated, which takes priority over the SCell where PRACH is not allocated yet. Second, according to the result of LBT operation, for example, the SCell whose eNB has succeeded in LBT operation takes priority over the SCell whose eNB is carrying out ECCA, which takes priority over the SCell whose eNB is being blocked by LBT operation. Third, the priority may be given according to the priority index per PRACH resource or SCell.

Figure 10:
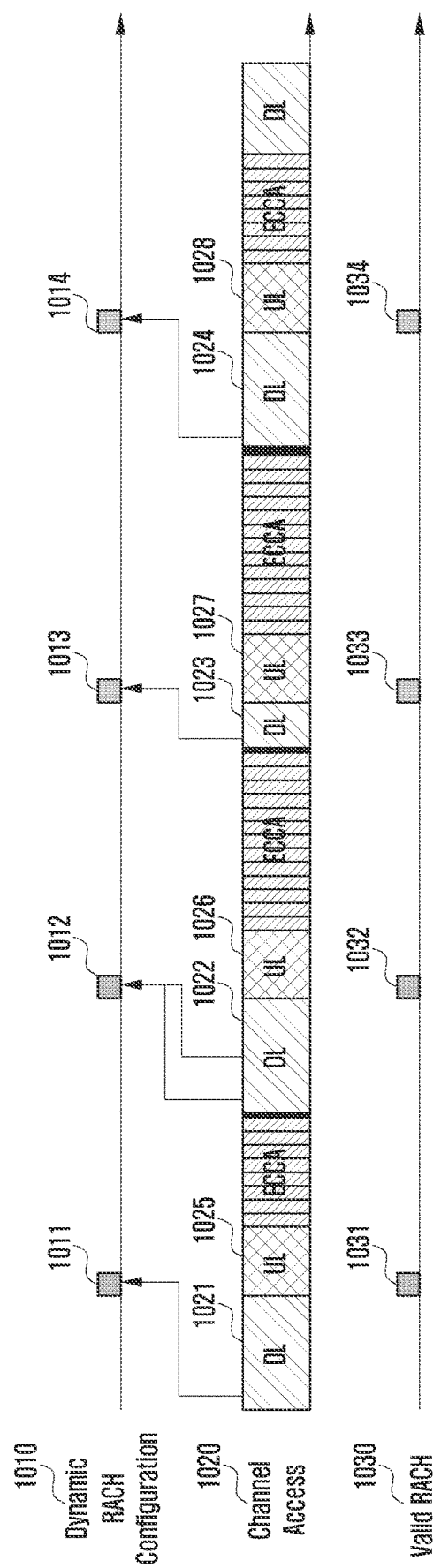
FIG. 10 is a variant of a dynamic RACH resource allocation according to an embodiment of the present disclosure.

FIG. 10 is a variant of a dynamic RACH resource allocation according to an embodiment of the present disclosure.

Referring to FIG. 10, RACH resource is dynamically allocated using the downlink as indicated by indicia 1010 without periodic pre-allocation of RACH resources. For the DL and UL subframe structure (1020) beginning at the channel occupation time, RACH may be allocated in the first subframe of successive UL subframes (1025, 1026, 1027, 1028) following the DL subframe in which the order is issued (1021, 1022, 1023, 1024). In the embodiment of FIG. 10, unlike the embodiment of FIG. 9 where RACH is allocated in a subframe after a fixed interval of x ms from the DL subframe in which the order is issued, the UE may be aware without using a fixed interval that RACH is allocated in the first UL subframe (1025, 1026, 1027, 1028) following the successive DL subframes in which the order is issued (1021, 1022, 1023, 1024). Hence, valid RACHs are indicated by indicia 1030 and each configured RACH matching a UL subframe of the unlicensed band (1011, 1012, 1013, 1014) may be a valid RACH configuration (1031, 1032, 1033, 1034).

The UE may determine the first one of successive UL subframes (1025, 1026, 1027, 1028) by 1) identifying the last or next-to-last one of successive DL subframes based on End Indicator contained in Common DCI of PDCCH transmitted in the DL subframes (1021, 1022, 1023, 1024), 2) identifying the special subframe inserted for DL-UL switching based on an indicator indicating special subframe composition (or partial subframe indicator), or 3) by causing the eNB to notify the UE of the point in time for DL-UL switching in a specific carrier when PCell or PSCell is present.

In one embodiment of the present disclosure, to notify the UE that the scheme is based on a rule related to channel access conditions without use of a fixed interval, the eNB may direct the UE to use PRACH configuration index (PRCI) of 14 for FDD uplink (RACH is configured in every subframe).

The LBT requirement may be normally absent or readily satisfied (if present) in the first subframe after DL subframes (1021, 1022, 1023, 1024). Hence, this scheme may effectively allocate the RACH resource almost always as long as UL subframes (1025, 1026, 1027, 1028) are found. However, in this scheme, when the RACH resource is allocated in multiple ones of successive DL subframes, RAP transmissions of the UE may concentrate in the first one (1026) of upcoming UL subframes. When the interval of successive DL subframes (1021, 1022, 1023, 1024) is short, the UE may fail to finish preparation for RAP transmission.

Figure 11:
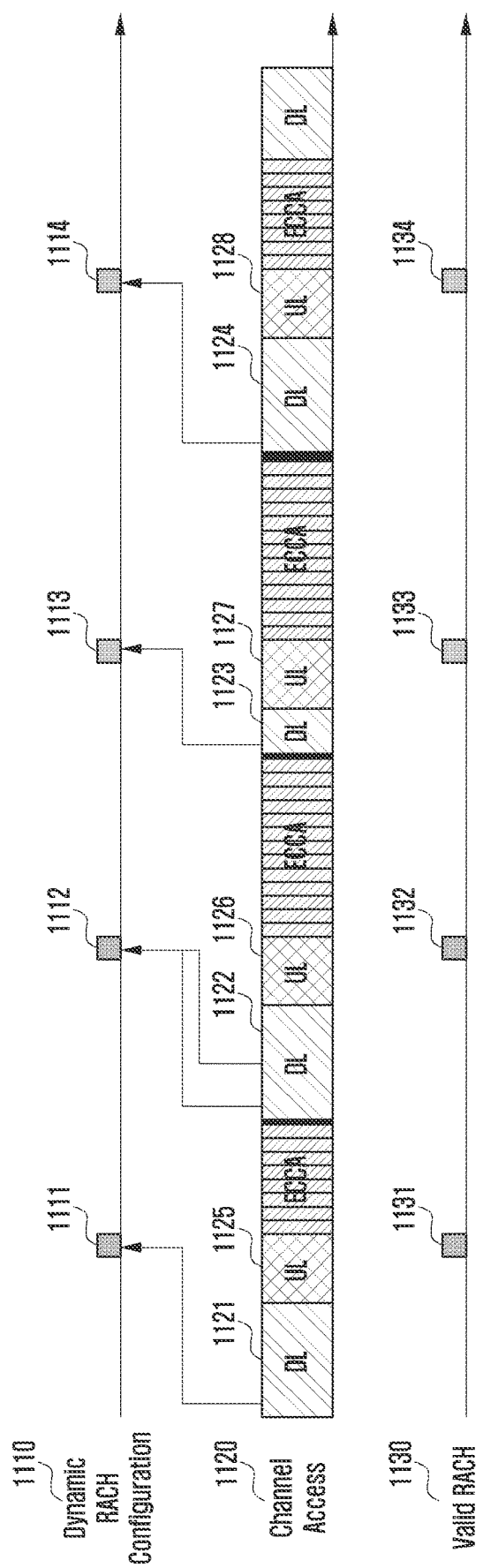
FIG. 11 is a variant of a dynamic RACH resource allocation according to an embodiment of the present disclosure.

FIG. 11 is a variant of dynamic RACH resource allocation according to an embodiment of the present disclosure.

Referring to FIG. 11, RACH resource is dynamically allocated using the downlink as indicated by indicia 1110 without periodic pre-allocation of RACH resources. The embodiment of FIG. 11 is a variant of the embodiment of FIG. 10 where the RACH resource is allocated in the first subframe of successive UL subframes (1025, 1026, 1027, 1028) following successive DL subframes (1021, 1022, 1023, 1024). Specifically, for the DL and UL subframe structure (1120) beginning at the channel occupation time, RACH may be allocated in the last subframe of successive UL subframes (1125, 1126, 1127, 1128) following the DL subframe in which the order is issued (1121, 1122, 1123, 1124). For example, the UE may be aware without using a fixed interval that RACH is allocated in the last subframe of successive UL subframes (1125, 1126, 1127, 1128) following the successive DL subframes in which the order is issued (1121, 1122, 1123, 1124). Hence, valid RACHs are indicated by indicia 1130 and each configured RACH matching a UL subframe of the unlicensed band (1111, 1112, 1113, 1114) may be a valid RACH configuration (1131, 1132, 1133, 1134).

This allows the UE to have some extra time to prepare for RAP transmission. However, the eNB is required to notify the UE of information on the last subframe of successive UL subframes (1125, 1126, 1127, 1128). Such notification may be achieved by at least one of the following ways: 1) the eNB notifies the UE of the length of upcoming DL subframes (1121, 1122, 1123, 1124) and the length of UL subframes (1125, 1126, 1127, 1128) through a PDCCH, 2) the eNB notifies the UE of the total length of UL subframes (1125, 1126, 1127, 1128) according to the result of previous allocation to the UE at the time of DL to UL switching by use of a DL signal in the special subframe, 3) the eNB transmit UL resource allocation information to UEs to which the eNB has allocated UL resources by use of a UL signal in the special subframe and the UEs compute the total length of UL subframes by piecing together the UL resource allocation information, and 4) UEs to which the eNB has allocated UL resources in the next-to-last UL subframe receive End UL Indicator information transmitted by the eNB according to eNB settings.

Figure 12:
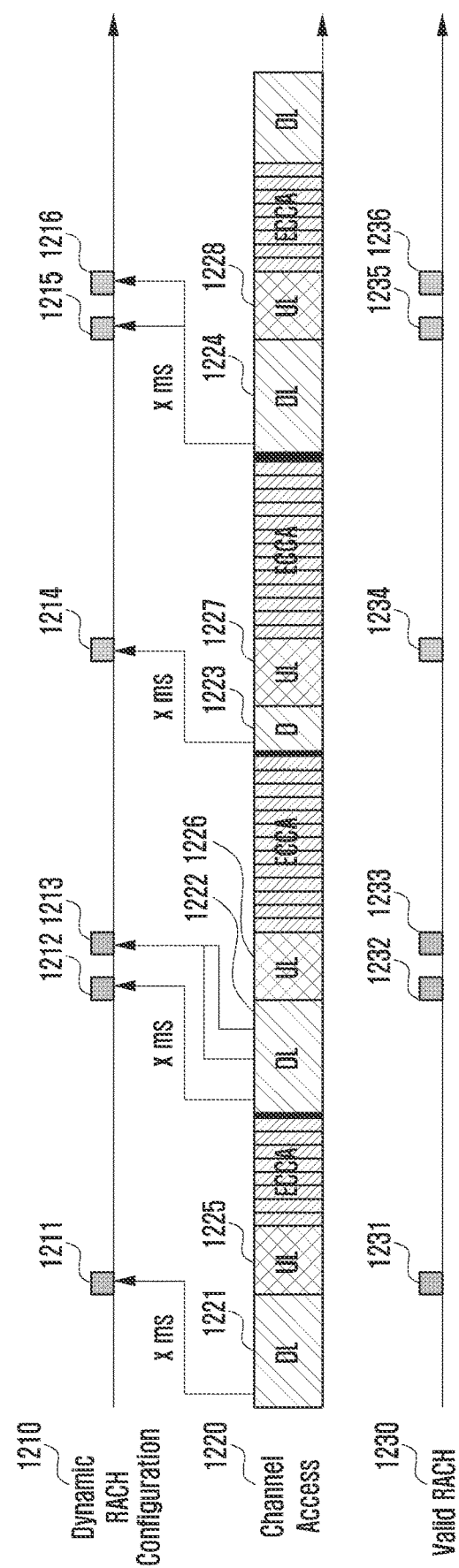
FIG. 12 is a variant of a dynamic RACH resource allocation according to an embodiment of the present disclosure.

FIG. 12 is a variant of dynamic RACH resource allocation according to an embodiment of the present disclosure.

Referring to FIG. 12, RACH resource is dynamically allocated using the downlink as indicated by indicia 1210 without periodic pre-allocation of RACH resources. The embodiment of FIG. 12 is a composite scheme obtained by combining the embodiment of FIG. 9 where a UL subframe following successive DL subframes (921, 922, 923, 924) with a given interval is recognized as RACH resource and the embodiment of FIG. 11 where the last one of UL subframes (1125, 1126, 1127, 1128) following DL subframes (1121, 1122, 1123, 1124) is recognized as RACH resource.

For example, for the DL and UL subframe structure (1220), valid RACHs are indicated by indicia 1230 and the UE may transmit RAP in a valid UL subframe (1231, 1232, 1233, 1234, 1235, 1236), which match a UL subframe of the unlicensed band (1211, 1212, 1213, 1214, 1215, 1216), after x ms from successive DL subframes in which the order is issued (1221, 1222, 1223, 1224), and, when successive UL subframes (1225, 1226, 1227, 1228) end before expiration of x ms, RACH may be allocated in the last UL subframe and the UE may transmit RAP in the last UL subframe with a valid RACH.

In one embodiment of the present disclosure, for the above scheme, the eNB may notify the UE of successive RACH subframes via a single PDCCH. As described before, 1) the UE may use the first RACH subframe of allocated successive RACH subframes in accordance with the above rules, or 2) the UE may use one of indicated RACH resources corresponding to a valid UL subframe in accordance with at least one of the above rules.

As a variant of the above dynamic RACH allocation scheme, it is possible to determine RACH resources by differently interpreting the existing RACH resource configuration table arranged according to the RACH density of the FDD UL or TDD configuration. For example, this table may be interpreted (not in terms of absolute subframe index) in terms of relative subframe index with respect to the start of successive DL subframes (DL burst), the start of successive UL subframes (UL burst), or the time of eNB order issuance. For example, the RACH resource configuration table may be stored in the UE in advance through a RRC-layer control signal, and the reference time for the table may be notified to the UE via a physical-layer (layer-1) signal.

As an example, Table 1 represents physical-layer RACH configuration (PRACH Configuration) for the FDD UL structure. Among configuration variables differentiated by PRACH configuration index (PRCI), the system frame number (SFN) and subframe number with respect to PCell are related to the temporal location of the RACH resource. For example, when PRACH configuration index is set to 0, the UE may be aware that the RACH resource is allocated in subframe #1 of a frame with even SFN. When PRACH configuration index is set to 10, the UE may be aware that the RACH resource is allocated in subframes #2, #5, #8 of each frame.

Dynamic RACH resource allocation described above may be achieved by notifying PRCI to the UE. When PRCI is notified as common or dedicated by the eNB through PDCCH of PCell or SCell, the UE may be aware that the RACH resource is allocated in 1) a subframe after a duration corresponding to n subframes from reception of PRCI set to n, 2) subframe k+n where n is the subframe number corresponding to PRCI and k indicates the start of the earliest DL burst from the time of PRCI reception, or 3) subframe m+n where m indicates the start of the earliest UL burst from the time of PRCI reception and n is the subframe number corresponding to PRCI. Here, n may be a fixed value (e.g., 4) or a changeable value. This type of notification may be applied to various situations described later. For example, when PRCI of 1 is notified, the UE may be aware that the RACH resource is allocated in 1) subframe x+1 where x indicates the time of PRCI reception (subframe after one subframe duration from PRCI reception), 2) subframe k+1 where k indicates the start of the earliest DL burst from the time of PRCI reception (subframe after one subframe duration from the start of the earliest DL burst), or 3) subframe m+1 where m indicates the start of the earliest UL burst from the time of PRCI reception (subframe after one subframe duration from the start of the earliest UL burst).

Meanwhile, in the case where SCell occupies resources throughout frames SFN 1 to SFN 1+1 with respect to PCell, among FDD configurations, 1) only PRCI with "any" SFN may be used, 2) PRCI may be used in disregard of SFN settings, 3) PRCI may be used relative to SFN at which DL subframes begin, or 4) PRCI may be used relative to SFN at which UL subframes begin.

TABLE 1

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |

The existing configuration scheme for the TDD frame structure is more complicated compared with the FDD frame structure. The eNB may notify the UE of [frame position (any, even, odd), indication to the first/second half frame, and indication to which UL subframe after DL-UL switching] and information indicating the RACH resource density within one frame (10 ms) as PRCI for TDD.

The UE may assume that RACH is allocated first at time resource positions indicated by PRCI, and may, if the density is not sufficient, continue to allocate RACH to the next frequency resource determined according to a preset rule at the same time resource positions.

Use of RACH configuration for the TDD frame structure has an advantage in that RACH can be allocated within Uplink Pilot Time Slot (UpPTS) of the special subframe. Meanwhile, in the case where SCell occupies resources throughout frames SFN 1 to SFN 1+1 with respect to PCell (i.e., PCell and SCell are out of synchronization in terms of SFN), among TDD configurations, 1) only PRCI with "any" SFN may be used, 2) PRCI may be used in disregard of SFN settings, 3) PRCI may be used relative to SFN at which DL subframes begin, or 4) PRCI may be used relative to SFN at which UL subframes begin.

Figure 13:
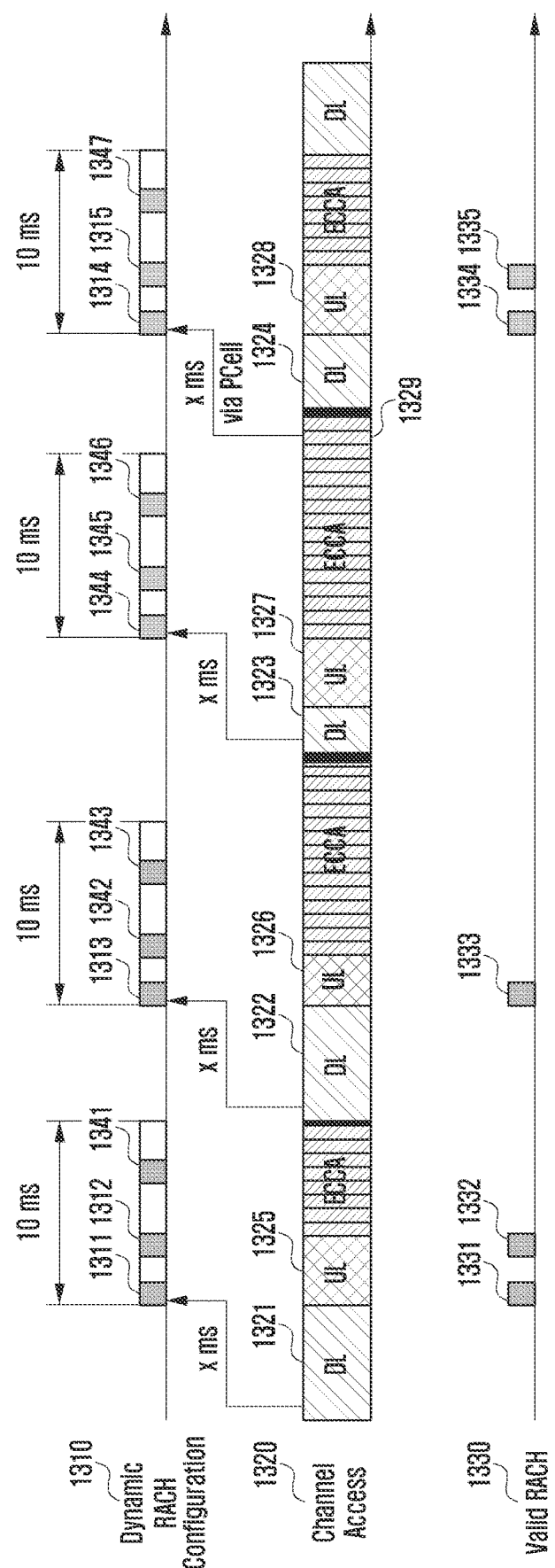
FIG. 13 illustrates a dynamic RACH resource configuration based on a physical-layer RACH (PRACH) configuration index according to an embodiment of the present disclosure.

FIG. 13 illustrates dynamic RACH resource configuration based on a PRACH configuration index according to an embodiment of the present disclosure.

Referring to FIG. 13, RACH resource is dynamically allocated using the downlink as indicated by indicia 1310 without periodic pre-allocation of RACH resources. The UE may receive an L1 control signal for RACH configuration from the eNB. The UE may determine that the RACH resource configuration table configured through RRC starts in x ms from reception of the RACH configuration control signal.

Here, for the DL and UL subframe structure (1320), the UE may receive information on the end of DL burst (1321, 1322, 1323, 1324) and the length of UL burst (1325, 1326, 1327, 1328) from the eNB, and determine validity of PRACH configuration by examining whether PRACH is configured in a subframe belonging to the UL burst (1325, 1326, 1327, 1328). The UE may make a RAP transmission attempt in a subframe with valid PRACH configuration. In other words, among RACH resources dynamically allocated according to the RACH resource configuration table, RACH configured in a subframe belonging to the UL subframes (1325, 1326, 1327, 1328) may be valid (1331, 1332, 1333, 1334, 1335) and matches a UL subframe of the unlicensed band (1311, 1312, 1313, 1314, 1315), wherein valid RACHs are indicated by indicia 1330. Among RACH resources dynamically allocated according to the RACH resource configuration table, RACH configured in a subframe not belonging to the UL subframes (1325, 1326, 1327, 1328) may be invalid (1341, 1342, 1343, 1344, 1345, 1346, 1347).

The eNB may transmit an L1 RACH configuration control signal to the UE in a DL subframe (1321, 1322, 1323). The eNB may also transmit an L1 RACH configuration control signal to the UE through PCell as indicated by indicia 1329.

Figure 14:
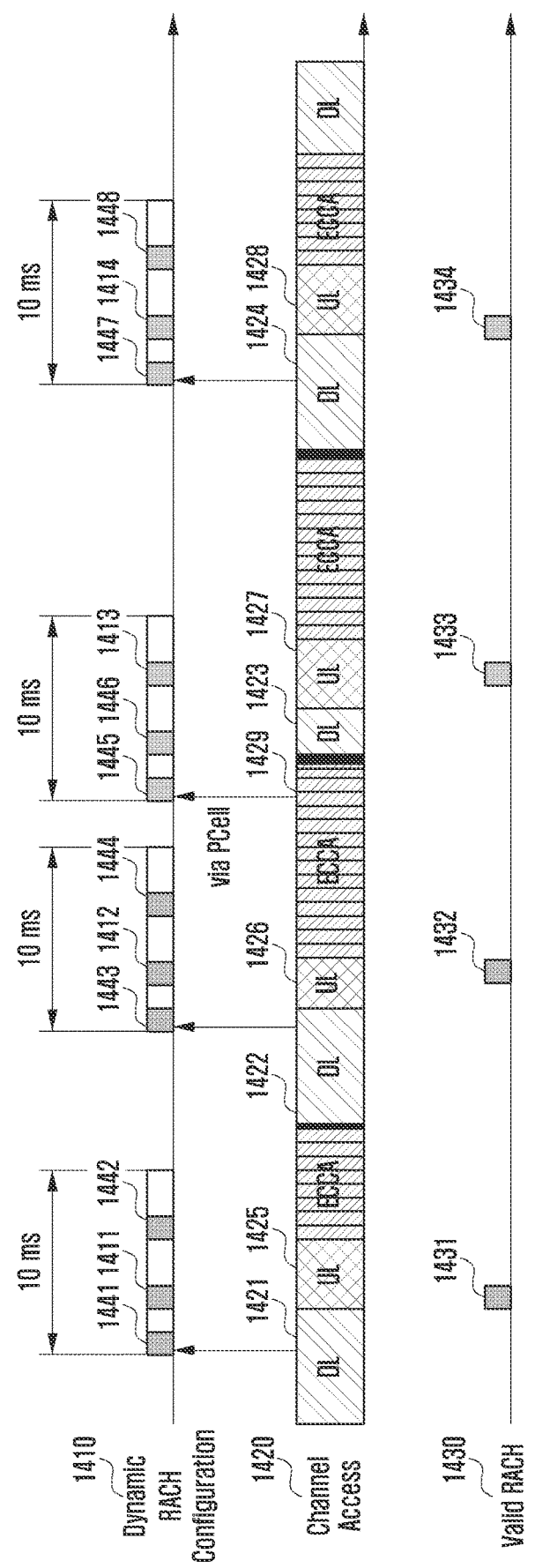
FIG. 14 illustrates a dynamic RACH resource configuration based on a PRACH configuration index according to an embodiment of the present disclosure.

FIG. 14 illustrates a dynamic RACH resource configuration based on a PRACH configuration index according to an embodiment of the present disclosure.

Referring to FIG. 14, RACH resource is dynamically allocated using the downlink as indicated by indicia 1410 without periodic pre-allocation of RACH resources. The UE may receive an L1 control signal for RACH configuration from the eNB. The UE may determine that the RACH resource configuration table configured through RRC starts immediately after reception of the RACH configuration control signal.

Here, for the DL and UL subframe structure (1420), the UE may receive information on the end of DL burst (1421, 1422, 1423, 1424) and the length of UL burst (1425, 1426, 1427, 1428) from the eNB, and determine validity of PRACH configuration by examining whether PRACH is configured in a subframe belonging to the UL burst (1425, 1426, 1427, 1428). The UE may make a RAP transmission attempt in a subframe with valid PRACH configuration. In other words, among RACH resources dynamically allocated according to the RACH resource configuration table, RACH configured in a subframe belonging to the UL subframes (1425, 1426, 1427, 1428) may be valid (1431, 1432, 1433, 1434) and matches a UL subframe of the unlicensed band (1411, 1412, 1413, 1414), wherein valid RACHs are indicated by indicia 1430. Among RACH resources dynamically allocated according to the RACH resource configuration table, RACH configured in a subframe not belonging to the UL subframes (1425, 1426, 1427, 1428) may be invalid (1441, 1442, 1443, 1444, 1445, 1446, 1447, 1448).

The eNB may transmit an L1 RACH configuration control signal to the UE in a DL subframe (1421, 1422, 1424). The eNB may also transmit an L1 RACH configuration control signal to the UE through PCell as indicated by indicia 1429.

Figure 15:
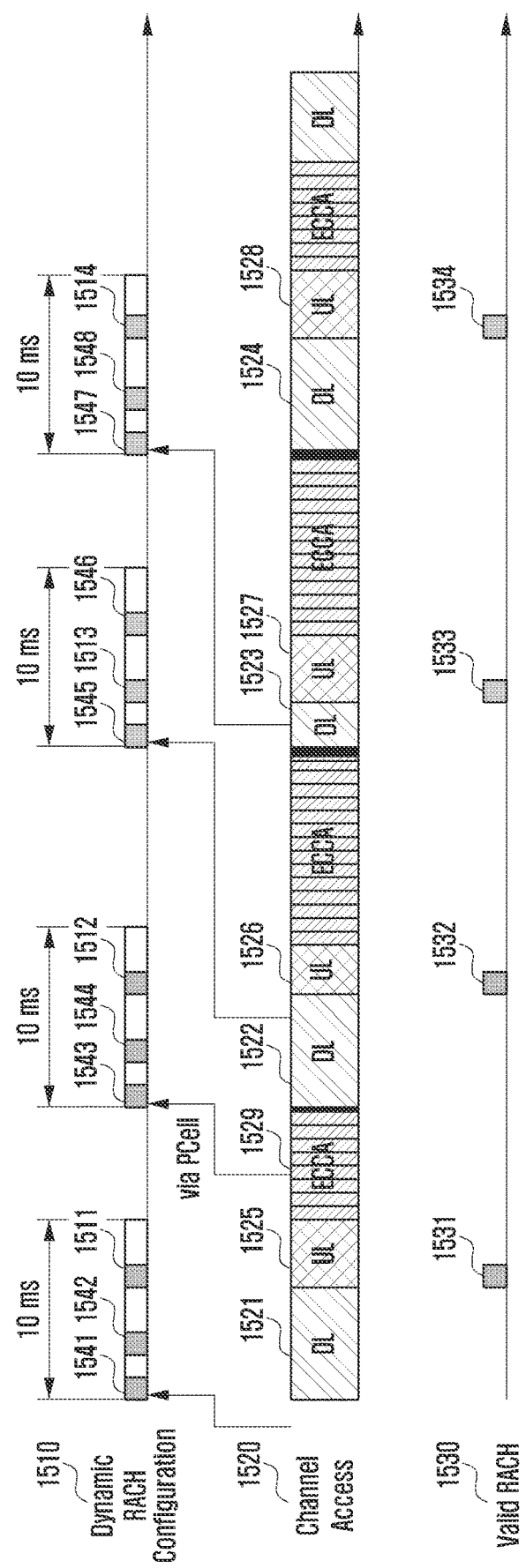
FIG. 15 illustrates a dynamic RACH resource configuration based on a PRACH configuration index according to an embodiment of the present disclosure.

FIG. 15 illustrates a dynamic RACH resource configuration based on a PRACH configuration index according to an embodiment of the present disclosure.

Referring to FIG. 15, RACH resource is dynamically allocated using the downlink as indicated by indicia 1510 without periodic pre-allocation of RACH resources. The UE may receive an L1 control signal for RACH configuration from the eNB. The UE may determine that the RACH resource configuration table configured through RRC starts in the earliest DL subframe (1521, 1522, 1523, 1524) upon or after reception of the RACH configuration control signal.

Here, for the DL and UL subframe structure (1520), to prevent the UE from erroneously determining the earliest DL subframe (1521, 1522, 1523, 1524) owing to a DL control signal error, the eNB may notify the UE of the start of DL burst (1521, 1522, 1523, 1524) through a reservation signal or common DCI. When the UE successfully receives information on the start of DL burst from the eNB, it can accurately identify the beginning of the RACH resource configuration table and validity thereof. In one embodiment of the present disclosure, the information on the start of DL burst (1521, 1522, 1523, 1524) may be represented as an offset between the initial subframe of DL burst and each DL subframe.

The UE may receive information on the end of DL burst (1521, 1522, 1523, 1524) and the length of UL burst (1525, 1526, 1257, 1528) from the eNB, and determine validity of PRACH configuration by examining whether PRACH is configured in a subframe belonging to the UL burst (1525, 1526, 1257, 1528). The UE may make a RAP transmission attempt in a subframe with valid PRACH configuration. In other words, among RACH resources dynamically allocated according to the RACH resource configuration table, RACH configured in a subframe belonging to the UL subframes (1525, 1526, 1527, 1528) may be valid (1531, 1532, 1533, 1534) and matches a UL subframe of the unlicensed band (1511, 1512, 1513, 1514), wherein valid RACHs are indicated by indicia 1530. Among RACH resources dynamically allocated according to the RACH resource configuration table, RACH configured in a subframe not belonging to the UL subframes (1525, 1526, 1527, 1528) may be invalid (1541, 1542, 1543, 1544, 1545, 1546, 1547, 1548).

The eNB may transmit an L1 RACH configuration control signal to the UE in a DL subframe (1522, 1523). The eNB may also transmit an L1 RACH configuration control signal to the UE through PCell as indicated by indicia 1529.

Figure 16:
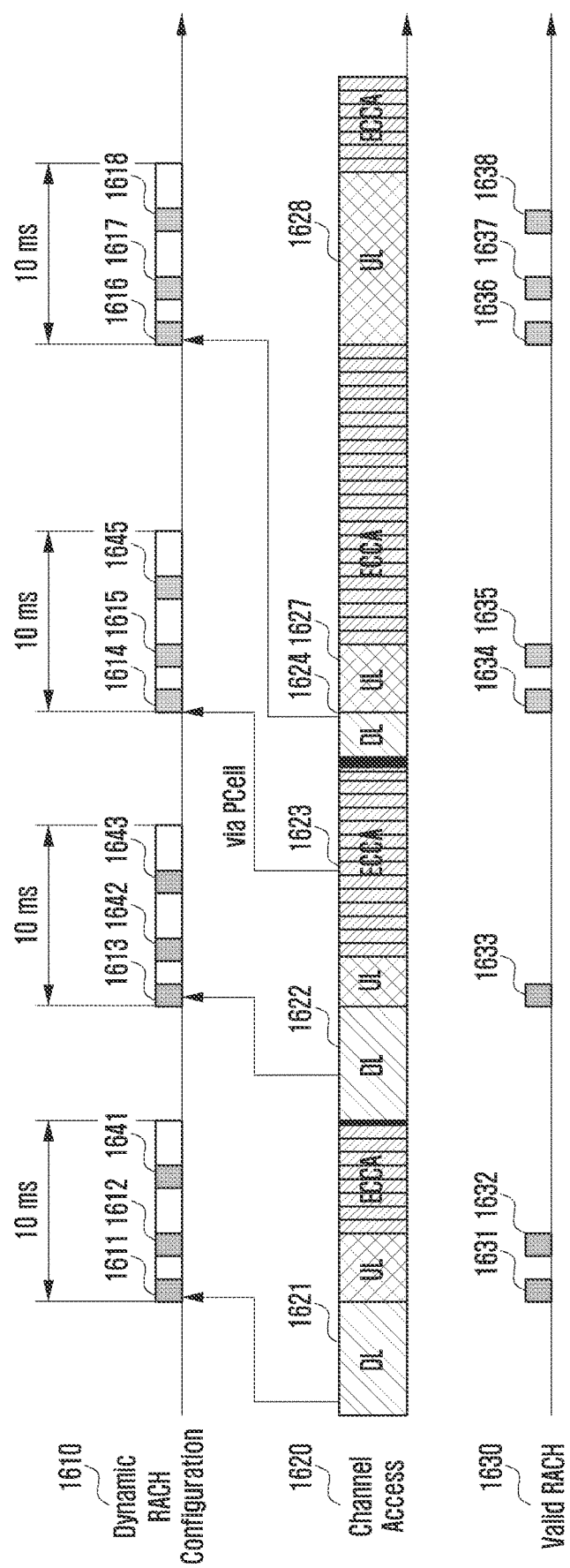
FIG. 16 illustrates a dynamic RACH resource configuration based on a PRACH configuration index according to an embodiment of the present disclosure.

FIG. 16 illustrates a dynamic RACH resource configuration based on a PRACH configuration index according to an embodiment of the present disclosure.

Referring to FIG. 16, RACH resource is dynamically allocated using the downlink as indicated by indicia 1610 without periodic pre-allocation of RACH resources. The UE may receive an L1 control signal for RACH configuration from the eNB. The UE may determine that the RACH resource configuration table configured through RRC starts in the earliest UL subframe (1625, 1626, 1627, 1628) upon or after reception of the RACH configuration control signal.

Here, for the DL and UL subframe structure (1620), to prevent the UE from erroneously determining the earliest UL subframe (1625, 1626, 1627, 1628) owing to a DL control signal error, the eNB may notify the UE of the end of DL burst (1621, 1622, 1624) through common DCI. When the UE successfully receives information on the end of DL burst (1621, 1622, 1624) from the eNB, it can accurately identify the beginning of the RACH resource configuration table and validity thereof. In one embodiment of the present disclosure, the information on the end of DL burst (1621, 1622, 1624) may be represented as an offset between the last subframe of DL burst and each DL subframe.

The UE may receive information on the length of UL burst (1621, 1622, 1624) from the eNB, and determine validity of PRACH configuration by examining whether PRACH is configured in a subframe belonging to the UL burst (1625, 1626, 1627, 1628). The UE may make a RAP transmission attempt in a subframe with valid PRACH configuration. In other words, among RACH resources dynamically allocated according to the RACH resource configuration table, RACH configured in a subframe belonging to the UL subframes (1625, 1626, 1627, 1628) may be valid (1631, 1632, 1633, 1634, 1635, 1636, 1637, 1638) and matches a UL subframe of the unlicensed band (1611, 1612, 1613, 1614, 1615, 1616, 1617, 1618), wherein valid RACHs are indicated by indicia 1630. Among RACH resources dynamically allocated according to the RACH resource configuration table, RACH configured in a subframe not belonging to the UL subframes (1625, 1626, 1627, 1628) may be invalid (1641, 1642, 1643, 1645).

The eNB may transmit an L1 RACH configuration control signal to the UE in a DL subframe (1621, 1622, 1624). The eNB may also transmit an L1 RACH configuration control signal to the UE through PCell as indicated by indicia 1623.

The above resource allocation scheme may be applied not only to RACH but also to uplink channels of different types such as PUCCH, PUSCH, and SRS. When the same allocation scheme is used for channels of different types, the eNB may have to additionally notify the UE of the channel type by use of an additional indicator. The channel type may be identified by the time/frequency/code resource used for direction or notification. Alternatively, the UE may identify the channel type based on states/conditions thereof. In the present disclosure, when the point in time for transmission of an UL signal (PRACH, PUCCH, PUSCH, or SRS) is found as belonging to the UL burst, the UE may transmit to the UL signal at the designated time after success in short LBT. When whether the point in time for transmission of an UL signal belongs to the UL burst is not identified owing to an error in reception of a control signal containing information on the DL burst start/end and UL burst length or eNB's LBT failure, the UE may transmit to the UL signal after performing regular backoff-based LBT according to eNB settings. Alternatively, in this case, the UE may determine that PRACH is invalid or RAP transmission has failed.

Meanwhile, in addition to the scheme for configuring the RACH resource and transmission timing, there is a need for a subsequent procedure for the UE to handle LBT operation failure at the RACH resource for transmission. After transmitting RAP at the RACH resource, the UE has to receive RAR (msg2) from the eNB. However, the eNB may fail in LBT operation. Hence, there is a need for a procedure for handling such a situation.

In the following procedure for RAP transmission or RAR reception, the RACH transmission resource or RAR reception resource may be statically or dynamically allocated by the eNB. For static allocation, the RACH transmission resource or RAR reception resource may be separately allocated on a cell (carrier) basis or on a cell (carrier) group basis according to SIB2 or upper-layer message. When a large number of cells (carriers) are involved, multiple cells may be grouped into random access cell groups (RACG). RACGs may be formed by use of PDCCH or upper-layer (e.g., RRC) message. RACGs are identified by the RACG index, and cells belonging to the same RACG share RA configuration. RA configuration information may include at least one of RACH resource configuration, power control parameter configuration, RAR window, CR timer, and back-off configuration. The UE may determine the order of RACH resources to be sequentially used from RACH resources logically forming a set based on RACH resource configuration information classified in terms of time, frequency or beam.

RAP Transmission Procedure

In the case of contention-free random access (CFRA), the eNB may issue PDCCH order in subframe n for the UE to transmit RAP in subframe n+k. In the case of contention-based random access (CBRA), the RACH process may begin with an upper-layer order in the UE.

For any one of periodic RACH resource allocation, aperiodic RACH resource allocation, and mixed periodic/aperiodic RACH resource allocation, before transmitting on the RACH resource scheduled for transmission, the UE should perform (E)CCA operation to comply with the LBT regulation. For a failed RACH resource (i.e., a RACH resource on which RAP is not transmitted because the result of (E)CCA operation indicates that the channel is already occupied), the UE may perform the following action.

A) The UE may end the RACH process for the RACH resource having failed in LBT operation and report the cause to the eNB. The cause may include at least one of delay due to LBT and information on the frame/subframe with LBT failure. Additionally, 1) the UE may transmit a retry request for a cell having available RACH resource other than the cell with RACH failure, or 2) the UE may wait for a RAP control message from the eNB within a waiting time set by the eNB.

B) The UE may not end the RACH process for the RACH resource having failed in LBT operation and may retry RAP transmission on the next RACH resource allocated within a preset time. This preset time may be defined by using the same DL-UL subframes, RAR window, N special subframes, a time duration set by the eNB, or a time duration set by the UE through measurement of a signal from the eNB. Here, RAR window, N, time duration may be set by the eNB. Additionally, a retry waiting time corresponding to k' subframes may be set by the eNB.

C) The UE may not end the RACH process for the RACH resource having failed in LBT operation, wait for expiration of a preset time without RACH retry, and retry RAP transmission on the next RACH resource allocated after expiration of the preset time. This preset time may be defined by using the same DL-UL subframes, RAR window, N special subframes, a time duration set by the eNB, or a time duration set by the UE through measurement of a signal from the eNB. Here, RAR window, N, time duration may be set by the eNB. Additionally, the RACH retry may be allowed after k' subframes from expiration of the preset time.

D) The UE may not end the RACH process for the RACH resource having failed in LBT operation and may retry RAP transmission on the RACH resource until reception of a new RAP transmission order from the eNB, until success of LBT operation, or until expiration of a specific timer. Upon reception of a new RAP transmission order, the UE ends the existing RACH process and starts a new RACH process. Additionally, the UE is allowed to retry RAP transmission within a retry duration set by the eNB. If the retry also fails for the retry duration, 1) the UE may transmit a retry request for a cell having available RACH resource other than the cell with RACH failure, or 2) the UE may wait for a RAP control message from the eNB within a waiting time set by the eNB.

To increase the possibility of success in UE RAP signal transmission, at least one of the following schemes may be applied. More particularly, when the eNB indicates CFRA, RACH opportunities may be more frequently lost owing to LBT operation. It is necessary to remedy this.

A) When the eNB issues CFRA order, it may specify the preamble ID only without the mask index, ignore the mask index if present, or set the mask index to the largest index value. Consequently, the influence of only the SFN value in the RACH configuration is considered, and RAP transmission is allowed on every RACH resource within the target SFN.

B) When the eNB issues CFRA order, it may specify a delay permission time together with the preamble ID. Within the delay permission time, the UE is allowed to perform RAP transmission on every RACH resource allocated statically on a frame basis or allocated dynamically according to the channel access result.

C) When the eNB issues CFRA order, it may specify the preamble ID. RAP transmission may be allowed on every RACH resource of RAP Cell Group composed of one or more cells including 1) a cell configured with BCCH/PDCCH, 2) a cell configured together with CFRA, 3) a cell configured by an upper-layer message (RRC), 4) a cell activated in the UE, 5) an activated candidate cell in the UE, or 6) a cell confirmed by the UE whether the resource is occupied by the eNB. Additionally, the mask index may be applied to all members of RAP Cell Group.

D) When a UE tries CBRA, other UEs may simultaneously make a RAP transmission attempt on the same RACH resource, increasing the probability of a collision. To determine the correct transmission timing, each UE may generate its reference time by adding a per-UE offset to a specific reference time (e.g., SFN #0, subframe index #0, start time of DL occupation by eNB, end time of DL occupation by eNB, DL-UL switching time of eNB, start time of UL occupation, or reception time of a corresponding message from eNB). The per-UE offset may be generated based on UE information (e.g., C-RNTI, RA-RNTI, IMSI, TMSI).

For the scheme to increase the possibility of success in RAP signal transmission, it is possible to configure a time gap corresponding to at least k subframes between RAP transmission attempts made by the UE for the same carrier. For different carriers, it is possible to 1) ignore the existing time gap set for the same carrier, or 2) configure a time gap corresponding to j subframes (j<k) between RAP transmission attempts made by the UE.

When the rule for priority between RACH processes or configurations of different types is followed by the UE performing a RACH process, the UE may fail to transmit RAP. In the existing DC procedure, dropping or power scaling may occur depending on the priority between RACH processes. In such a case, Preamble Transmission Counter does not increase. Here, RAP transmission operation involving LBT may be regarded as an additional cause for RAP transmission failure. It is possible to determine whether to increase Preamble Transmission Counter based on at least one of the following conditions.

1) When dropping occurs owing to higher-priority UE configuration or LBT failure, Preamble Transmission Counter is not increased. When power scaling occurs owing to higher-priority UE configuration, Preamble Transmission Counter is not increased regardless of the LBT result.

2) When dropping occurs owing to higher-priority UE configuration or LBT failure, Preamble Transmission Counter is not increased. When power scaling occurs owing to higher-priority UE configuration along with successful LBT, Preamble Transmission Counter is not increased. When LBT is successful without power scaling, Preamble Transmission Counter is increased.

3) When dropping occurs owing to higher-priority UE configuration or LBT failure, Preamble Transmission Counter is not increased. When power scaling occurs after successful LBT operation, Preamble Transmission Counter is not increased. When power scaling does not occur after successful LBT operation, Preamble Transmission Counter is increased.

RAR Reception Procedure

In the regular procedure, when the UE succeeds in RAP transmission, it awaits a RAR message from the eNB within the RAR window. For example, the RAR window corresponds to a time duration of 3 to z subframes (z set by eNB) after subframe x with successful RAP transmission. For example, possible subframe y may be given by (x+3)<y<(x+z). When the UE fails to receive RAR within the RAR window, it may retry RAP transmission at time (x+z+4) corresponding to 4 subframes after the end of the RAR window (x+z).

In the case of the 5G band including an unlicensed band, it may be difficult to assume that the eNB always transmits at a fixed time. Hence, it is necessary to adapt the RAR reception procedure accordingly.

Adaptation of the RAR reception procedure may be designed differently according to the following two constraints.

A. Changing RAR window

This constraint is applicable to, but not limited to, a situation where the cell in which the UE transmits RAP is the same as the cell in which the UE waits for RAR.

a) The initial RAR window corresponds to a time duration of 3 to z subframes (set by eNB) after subframe x with successful RAP transmission. For example, possible subframe y may be given by (x+3)<y<(x+z). When at least one of 1) no DL subframe is present before (x+3), 2) no DL subframe is present before (x+z), and 3) no DL subframe corresponding to y is present is satisfied, the UE may reset x to the time of the first DL subframe of the eNB and perform RAR window monitoring according to the new RAR window. The first DL subframe of the eNB may be identified by the UE by using a DL control signal or DL burst start signal after RAP transmission.

b) The initial RAR window corresponds to a time duration of 3 to z subframes (set by eNB) after subframe x with successful RAP transmission. For example, possible subframe y may be given by (x+3)<y<(x+z). When the UE fails to receive RAR within the initial RAR window, it may reset x to the time of the first DL subframe of the eNB and perform RAR window monitoring according to the new RAR window. The first DL subframe of the eNB may be identified by the UE by using a DL control signal or DL burst start signal after RAP transmission.

c) The initial RAR window corresponds to a time duration of 3 to z subframes (set by eNB) after subframe x with successful RAP transmission. For example, possible subframe y may be given by (x+3)<y<(x+z). When the UE fails to receive RAR within the initial RAR window, the UE may move to Scell 2 with a different carrier (next SCell) according to eNB direction, reset x to one of 1) the time when the direction is received from the eNB, and 2) the time of the DL subframe of the eNB first identified in SCell2, and perform RAR window monitoring according to the new RAR window. The sequence between carriers may be set by the eNB for the UE in a configured SCell group.

B. Controlling RAR Counter with the Same RAR Window

This constraint is applicable to, but not limited to, a situation where the cell in which the UE transmits RAP is different from the cell in which the UE waits for RAR.

a) While waiting for RAR, the UE may increase the RAR window counter only for a subframe belonging to the duration from the time when the eNB starts channel occupation to the time when the eNB ends channel occupation (DL End Subframe). The UE may identify whether the channel is occupied by the eNB based on a reference signal from the eNB or control information received through PCell. The UE may identify the time when the eNB ends channel occupation based on a physical layer signal (common L1) from the eNB.

b) While waiting for RAR, for a subframe during which the channel is not occupied by the eNB, the UE may transmit RAR suspension indicator to the upper layer and may not increase the RAR window counter used for computing the end time of the RAR window. The UE may identify whether the channel is occupied by the eNB based on a reference signal from the eNB or control information received through PCell. The UE may consider that the channel is occupied by the eNB for at least allocated UL subframes and commonly identifiable UL subframes. For example, in the case of the type 3 frame structure composed of successive DL subframes and successive UL subframes, when the eNB notifies the position of successive UL subframes, the UE may regard that the channel is occupied by the eNB for the UL subframes.

c) While waiting for RAR, for a subframe during which the channel is found to be occupied or to have a high interference level according to the result of ECCA operation or RSSI measurement, the UE may not increase the RAR window counter.

Cell Selection Procedure for UE Awaiting RAR

The UE may be configured by the eNB so as to perform the RA procedure on one cell (carrier) or perform the RA procedure with movement along different cells. The cell for the UE to move to may be dynamically notified by the eNB reusing the existing carrier indicator field (CIF) via PDCCH. The eNB may form in advance RAR Cell Group composed of multiple cells for the UE to move along by use of an upper-layer message. For sequential movement of the UE, priorities may be assigned to cells belonging to RAR Cell Group.

A) The UE may await RAR in the same cell where the UE has transmitted RAP. The eNB may set a corresponding waiting time for the UE.

B) When one RAP transmission fails or when every RAP transmission fails within the waiting time, the UE may transmit a RAR waiting cell change request to the eNB. In response to the RAR waiting cell change request, the eNB may notify the UE of a cell through which RAR is to be sent.

C) When one RAP transmission fails or when every RAP transmission fails within the waiting time, the UE may move to a RAR dedicated cell configured by the eNB in advance and wait for RAR in the RAR dedicated cell. For control of the eNB, the UE may notify its movement and time thereof before or after movement.

D) When one RAP transmission fails or when every RAP transmission fails within the waiting time, the UE may move to the highest-priority cell of RAR Cell Group configured by the eNB in advance and wait for RAR in the highest-priority cell. For control of the eNB, the UE may notify its movement and time thereof before or after movement.

Meanwhile, RAP Cell Group and RAR Cell Group may be used separately or in combination. During the RA procedure, the UE may measure the channel quality of each cell and report preferred RA cell index to the eNB via message msg1 or msg3. Here, RA cell may be physically replaced with carrier, sector, beam, or PRACH resource, and may be replaced with port (resource mapping unit). When msg1 is used for transmission, the eNB may identify the preferred RA cell index based on the RAP transmission timing and physical unit of the index. When msg3 is used, the RA cell index and comparable information may be inserted in an upper-layer message for transmission.

For RA-RNTI used for msg1 transmission and reception, the UE and eNB may compute RA-RNTI so that it can be distinguished based on one or more of carrier, sector, beam, PRACH resource, and port in addition to the existing RAP transmission timing.

Embodiment Considering DL & UL Frame Structure and LBT

A. Scenario in which the eNB performs LBT operation to obtain a resource and performs data transmission and reception in the downlink and then in the uplink a) The UE may determine whether the eNB has succeeded in LBT by using a direct control signal from the eNB or by monitoring reference signals (CRS, DMRS, CSI-RS, DRS) from the eNB. In a certain system, the eNB may notify the UE of information indicating the resource occupancy time (including DL and UL) from resource acquisition to resource release by use of a common control signal via BCH or PDCCH. The time duration for the eNB to acquire and use the resource is referred to as channel occupancy time (COT).

b) When a RACH resource is configured in a subframe in which eNB LBT is found to be successful according to a received control signal or reference signal, the UE may consider the active time of the corresponding frame for computing the RAR window. For example, if the RAR window is 20 ms and the resource of the frame used by the eNB after successful LBT is 10 ms, the remaining RAR window of the UE is 10 ms. As another example, if the RAR window is 20 ms and the UL resource of the frame used by the eNB after successful LBT is 4 ms, the remaining RAR window of the UE is 16 ms. The UE may apply the RAR window varying depending on LBT success or failure to performing RACH retry or transmission power ramping up.

c) When the eNB successively fails in LBT, according to the following conditions, the UE may issue a carrier change request to PCell, may perform RACH retry in a different carrier if configured, or may increase the RAR window length according to the rule. After transmitting RAP in SCell, the UE may move to PCell and wait for RAR reception. For switching to PCell, parameters related to LBT failure (RAR window change, waiting time, or the like) should be commonly configured in the eNB and UE. Alternatively, upon LBT failure, the eNB may transmit a carrier switching control signal to all UEs or a specific UE. This control signal containing the index to the target carrier to move may be transmitted by PCell to connected UE via PDCCH or separate L1 common signaling. This control signal may be transmitted by PCell to idle UE via MIB/SIB of PBCH, or PCell may cause idle UE to transition to connected UE through paging and transmit to the control signal via PDCCH or L1 common signaling.

Criteria for eNB's LBT failure may be described as follows.

1) The eNB does not succeed in LBT operation within a preset time or until timer expiration from the end of previous resource acquisition, 2) The eNB does not succeed in LBT operation successively for configured N RACH resources, 3) The eNB does not succeed in LBT operation until the remaining RAR window of the UE becomes X ms or Y percent.

Criteria for UE's LBT failure corresponding to those of the eNB may be described as follows.

1) After last signal detection from an eNB, the UE does not succeed in detecting a signal from the eNB until the timer expires, 2) When COT information (or number of successive UL subframes) and PRACH configuration are received from the eNB, PRACH subframe fails to be included in COT N times in succession, 3) After receiving COT information (or number of successive UL subframes) and PRACH configuration from the eNB, the RAR window is decreased if PRACH subframe fails to be included in COT, and the remaining RAR window becomes X ms or Y percent.

B. Scenario in which the eNB allocates the uplink first without LBT operation for resource acquisition and data reception is performed.

As whether the eNB has failed in LBT operation cannot be determined, the UE may determine whether LBT operation has failed on an UL resource allocated by PCell and performs the following operation upon failure.

The UE may issue a carrier change request to PCell, may perform RACH retry in a different carrier if configured, or may increase the RAR window length according to the rule. After transmitting RAP in SCell, the UE may switch to PCell and wait for RAR reception. For switching to PCell and agreement between the UE and the eNB, parameters related to LBT failure should be commonly configured in the eNB and UE. Alternatively, upon LBT failure, the eNB may transmit a carrier switching control signal to all UEs or a specific UE. This control signal may be transmitted by PCell to connected UE via PDCCH or separate L1 common signaling. This control signal may be transmitted by PCell to idle UE via MIB/SIB of PBCH, or PCell may cause idle UE to transition to connected UE through paging and transmit to the control signal via PDCCH or L1 common signaling.

Criteria for UE's LBT failure may be described as follows.

1) The UE does not succeed in LBT operation within a preset time or until timer expiration from the end of previous resource acquisition, 2) The UE does not succeed in LBT operation for configured N RACH resources, 3) The UE does not succeed in LBT operation until the remaining RAR window becomes X seconds or Y percent.

The LBT operation may be performed for at least one of data, control signal (PUCCH, SRS), and RACH transmission.

In the above process, the description on the RAR window may be applied to the contention resolution timer (CR timer). Various variables in the above process may be separately configured for the RAR window and the CR timer.

Backoff Procedure

In the regular LTE random access process, the backoff procedure may be described as follows.

If no RAR is received within the RAR window, or if none of all received RARs contains a RAP ID corresponding to the transmitted RAP, the RAR reception is considered to be unsuccessful and the UE can:

increment PREAMBLE_TRANSMISSION_COUNTER by 1.

if PREAMBLE_TRANSMISSION_COUNTER=preambleTransMax+1, indicate a RA problem to upper layers.

if in this Random Access procedure, RAP was selected by MAC:

based on the backoff parameter in UE, select a random backoff time according to a uniform distribution between 0 and the backoff parameter value.

delay the RA procedure by the selected backoff time.

determine PRACH resource to be used for next RAP transmission.

In the above backoff procedure, when RAR reception is considered to be unsuccessful owing to LBT failure, the UE may use backoff parameter value 2 less than current backoff parameter value 1 (maximum backoff parameter value). Here, smaller backoff parameter value 2 may be valid 1) after backoff parameter generation one time, 2) until expiration of a timer started at the time of LBT failure determination, 3) until expiration of a timer started at the time of backoff parameter generation one time, or 4) until backoff parameter generation N times.

1) In current CA-based LAA, only CFRA is allowed to SCell. In this case, when RACH fails in a subframe indicated by the eNB, as retry is not allowed in a RACH subframe other than the indicated subframe, there is no alternative.

2) For CFRA, the RAR window is to be introduced, and, for CBRA, the RAR window and CR timer are to be introduced. In addition, the RAR window and CR timer are to be suspended according to the result of LBT. To suspend the RAR window or CR timer, the UE may compute the delay due to LBT failure based on 1) UE LBT result, 2) information on eNB LBT result, 3) monitored eNB LBT result, and compare 1) the delay time due to LBT failure or 2) the total waiting time including LBT failure with a preset time or timer to determine whether to drop the present RA process. In other words, 1) when the delay time or waiting time exceeds X percent of the RAR window or CR timer, 2) when a separate timer has expired, or 3) when the time designated by the eNB has elapsed, the UE may drop the present RA process.

3) When the UE transmits multiple RAP signals in multiple CCs or simultaneously transmits RAP and PUSCH, it is necessary to perform power distribution. Hence, when the transmission power for a RAP signal is below a threshold, the UE may suspend the RAR window or the CR timer.

4) To compensate for the loss due to LBT operation, it is necessary to increase the opportunity for RAP transmission. To this end, when RAP is triggered according to PDCCH order or UE conditions, the UE may transmit RAP according to RAP transmission control information indicated by PDCCH order received in subframe k (e.g., at least one of N RACH subframes, M retries, RACH subframe within time k+T, and available component carrier (CC), or may transmit RAP according to RAP transmission control information indicated in advance by a higher-layer (RRC or BCCH) signal (at least one of N RACH subframes, M retries, RACH subframe within time T from reception of the control information, and available CC).

Figure 17:
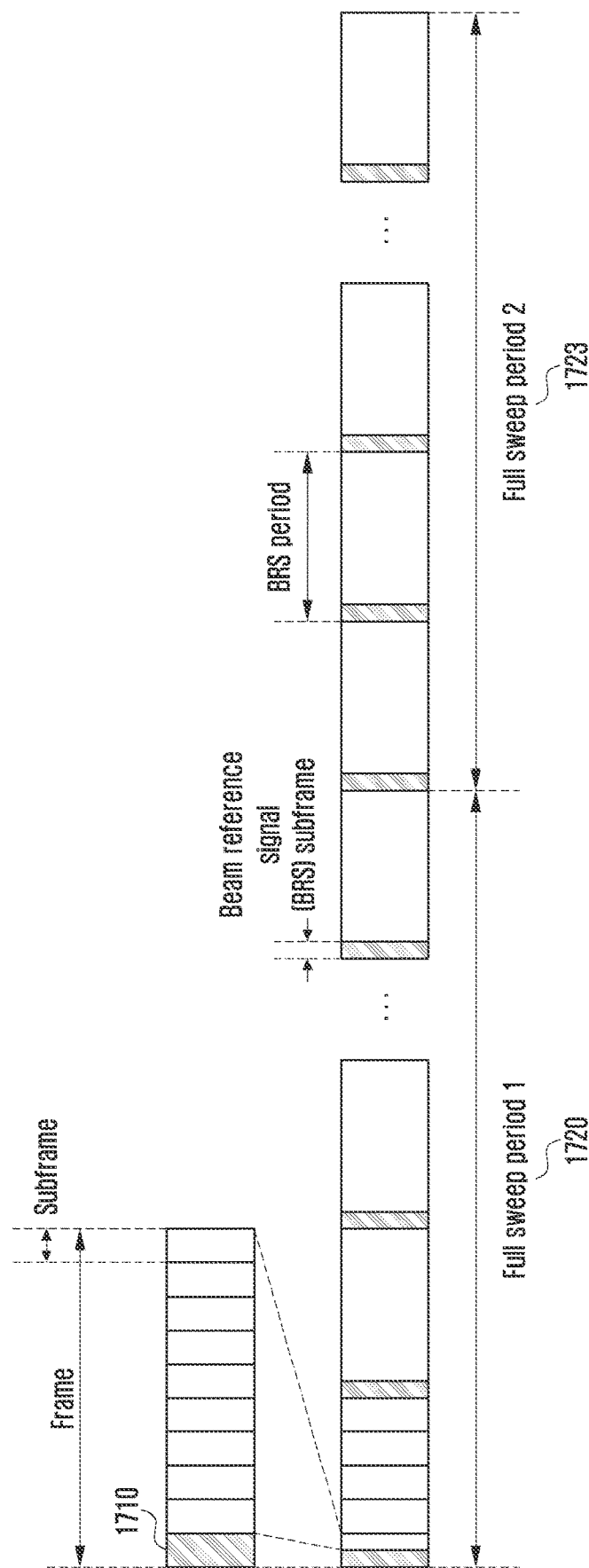
FIG. 17 illustrates a structure of a beam reference signal (BRS) in an mmWave communication system according to an embodiment of the present disclosure.

FIG. 17 illustrates a structure of a beam reference signal (BRS) in an mmWave communication system according to an embodiment of the present disclosure.

Compared with an existing communication system, the beam domain is to be additionally considered in designing an mmWave-based 5G communication system. In practice, the beam domain may be represented as beam identifiers such as a transmission beam index and reception beam index. Specifically, beam indexes may be used as identifiers for analog beams or digital beams.

A description is given of a general procedure for determining the beam index in the downlink.

Referring to FIG. 17, the eNB transmits a reference signal 1710 using different transmission beams on preset multiple resources. This eNB operation is referred to as transmission beam sweeping or eNB beam sweeping. The UE may scan the transmission beam sweeping resources using a fixed reception beam and determine an eNB transmission beam with the best reception performance. The UE may receive the reference signal 1710 using different reception beams for a fixed eNB transmission beam. This UE operation is referred to as reception beam sweeping or UE beam sweeping. According to the system or requirements, a transmission beam sweeping interval (e.g., BRS subframe) where transmission beam sweeping resources are continuous in time may be configured in a preset duration. A reception beam sweeping interval (BRS subframe) where reception beam sweeping resources are continuous in time may be configured in a preset duration. The sweeping resources may be continuous in a logical viewpoint but not continuous in a physical viewpoint according to some configurations.

According to the half-duplex constraint, the transmission beam sweeping interval cannot coincide with the reception beam sweeping interval. For example, when only the transmission beam sweeping interval is configured, reception beam sweeping should be performed over multiple transmission beam sweeping intervals periodically arranged according to a specific period (e.g., BRS period) (1720, 1723). In reverse, when only the reception beam sweeping interval is configured, transmission beam sweeping should be performed over multiple reception beam sweeping intervals.

In addition to determination of downlink transmission and reception beam indexes, a procedure for determining uplink transmission and reception beam indexes may also be considered. For ease of description, channel reciprocity is assumed in the present disclosure. For example, downlink transmission and reception beam indexes are reused as uplink transmission and reception beam indexes, and a separate description will be given if necessary to distinguish between the uplink and the downlink. If it is assumed that transmission and reception are identical in channel characteristics, for example, the best eNB transmission beam will be the best eNB reception beam.

Similarly to the preparation operation in a regular random access procedure, the UE may identify the RACH resource location and variables for RACH operation (e.g., RAR window, CR timer, backoff index, maximum retry count, and power control parameter) through synchronization and system information acquisition. The UE may also obtain beam related information needed for beam-based communication (e.g., number of beams, number of beam sweeping resources, and beam resource location). In a certain embodiment of the present disclosure, the eNB may notify the UE of the above system and UE parameters needed for the RA procedure through RAR message based on the capacity limitation of BCH.

Meanwhile, as it is necessary to determine transmission and reception beams during RA, a beam determination operation is to be added to the existing random access procedure (e.g., as shown in FIG. 5). Hence, operation 0 is needed to replace or supplement the existing operation for synchronization signal reception (e.g., operation 530 in FIG. 5). At operation 0, the UE scans eNB transmission beam sweeping signals. The UE may perform beam determination through 1) using omni beams as UE reception beam, 2) performing eNB transmission beam sweeping multiple times using different UE reception beams, or 3) separate UE reception beam sweeping. Here, when eNB transmission beam sweeping signals are transmitted together with messages, the UE may obtain configuration information for RACH resources for random access. In one embodiment of the present disclosure, it is possible to obtain configuration information for RACH resources in advance through a different RAT.

Meanwhile, according to whether it is necessary to modify each operation (operation 1 to operation 4) of the existing random access procedure (e.g., operation 540 to operation 570 in FIG. 5) owing to the beam sweeping interval, four cases are possible as shown in Table 2.

TABLE 2

|  | Operation 1 | Operation 2 | Operation 3 | Operation 4 |
|---|---|---|---|---|
| Existing Omni-like | Sequence | Message | Message | Message |
| mmWave scenario 1 | Sequence @ Beam sweeping | Message @ Scheduled access | Message @ Scheduled access | Message @ Scheduled access |
| mmWave scenario 2 | Sequence @ Beam sweeping | Message @ Beam sweeping | Message @ Scheduled access | Message @ Scheduled access |
| mmWave scenario 3 | Sequence @ Beam sweeping | Message @ Beam sweeping | Message @ Beam sweeping | Message @ Scheduled access |
| mmWave scenario 4 | Sequence @ Beam sweeping | Message @ Beam sweeping | Message @ Beam sweeping | Message @ Beam sweeping |

For mmWave scenario 4 in Table 2, it is possible to carry out operations of the existing omni system (e.g., operations shown in FIG. 5) while maintaining the beam index sameness. For example, when the UE determines eNB transmission beam 5 to be the best transmission beam at operation 0, it may transmit RAP so that the eNB can receive RAP using reception beam 5 at operation 1. At operations 2 to 4, the eNB and UE maintain the beam index of 5 determined at earlier operation.

However, as mmWave scenario 4 requires beam sweeping resources proportional to the number of beams at each operation, the non-occurrence of random access may cause waste of system resources.

Hence, it is necessary to minimize the beam sweeping interval as far as possible as in mmWave scenarios 1, 2, 3 of Table 2. In the following description, mmWave scenario 1 is described first and then a description is given of changes made to scenario 2, scenario 3, and existing omni-like scenario without a separate sweeping interval.

Figure 18:
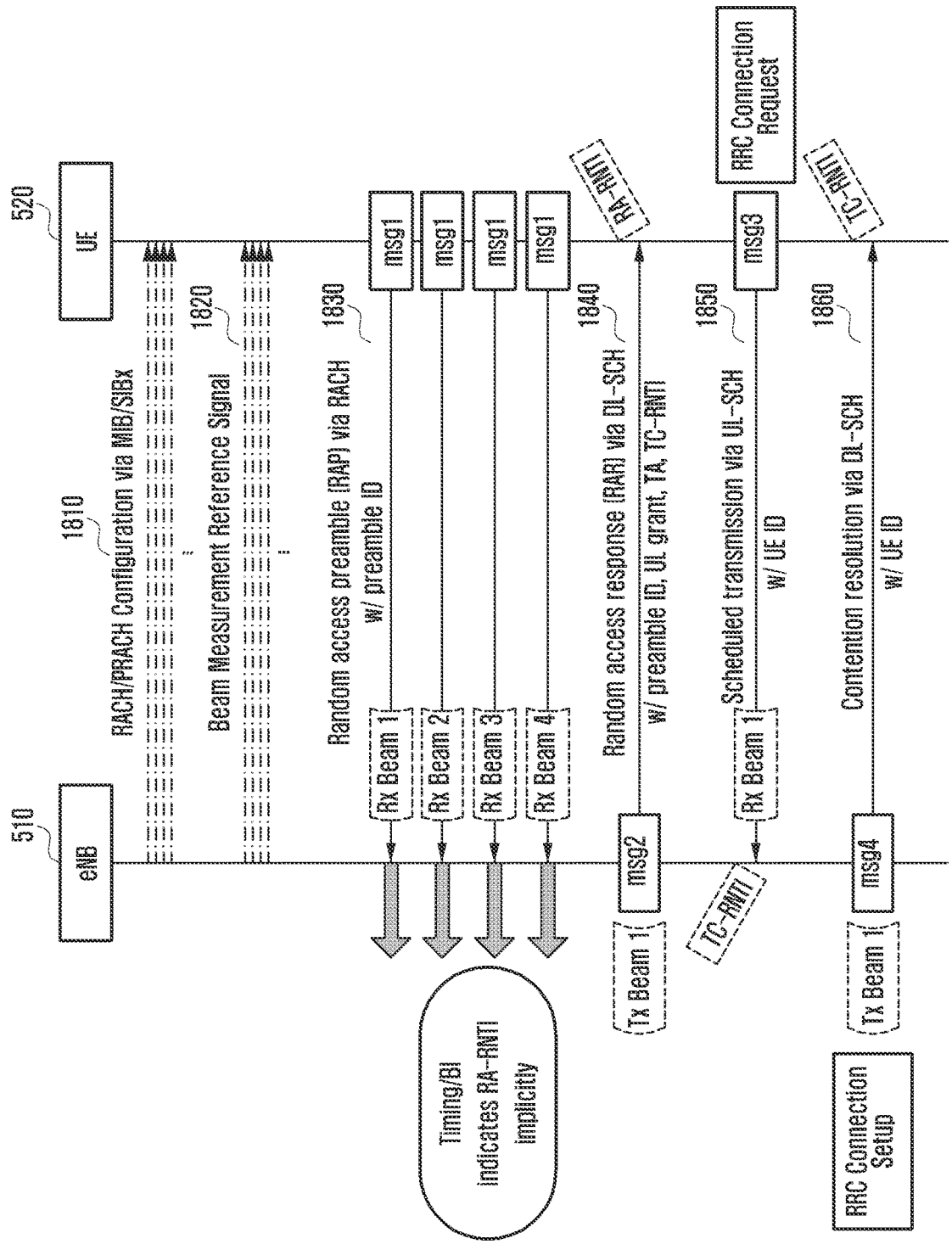
FIG. 18 is a sequence diagram of a random access procedure in an mmWave communication according to an embodiment of the present disclosure.

FIG. 18 is a sequence diagram of a random access procedure in an mmWave communication according to an embodiment of the present disclosure.

Referring to FIG. 18, a description is given with reference to mmWave scenario 1 of Table 2.

At operation 1810, the UE 520 identifies the RACH resource location and variables for RACH operation (RAR window, CR timer, backoff index, maximum retry count, and power control parameter) through synchronization and system information acquisition. To this end, the UE 520 may obtain RACH/PRACH configuration through SIB MIB received from the eNB 510. In addition, the UE 520 may also obtain beam related information needed for beam-based communication (e.g., number of beams, number of beam sweeping resources, beam resource location, and beam sweeping period). In a certain embodiment of the present disclosure, the eNB 510 may notify the UE 520 of the above system and UE parameters through RAR message based on the capacity limitation of BCH.

At operation 1820, the UE 520 scans the transmission beam sweeping interval of the eNB 510. Here, when eNB transmission beam sweeping signals are transmitted together with messages, the UE 520 may obtain configuration information for RACH resources for random access. In this case, operation 1810 and operation 1820 may be carried out in parallel. At operation 1830, the UE 520 transmits a RAP signal (msg1) having a preamble ID during the reception beam sweeping interval of the eNB 510. The following options are possible for the UE to transmit a RAP signal to the eNB.

The UE 520 may determine the reception beam at operation 1820 in at least one of the following ways.

a) The UE may determine a UE reception beam by monitoring the eNB RS sweeping interval in BRS subframe of the eNB.

b) The UE may determine a UE reception beam by monitoring a subframe pre-configured with a beam index among data subframes of the eNB. The UE may examine beam reception performance based on a RS like DMRS or CSI-RS in data subframes.

c) When the eNB schedules and transmits data subframes together with beam index information through a specific beam, the UE may monitor this and determine a UE reception beam. The UE may examine beam reception performance based on a RS like DMRS or CSI-RS in data subframes.

In addition, the process of operation 1830 in which the eNB 510 determines a reception beam to receive a signal transmitted by the UE 520 and the UE 520 performs RAP transmission may be carried out according to a combination of the following a), b), and c).

a) The UE 520 may select one or more eNB transmission beams based on a reference signal measured in the transmission beam sweeping interval of the eNB 510.

b) The UE 520 may transmit a RAP signal over 1) all reception beam resources or 2) some reception beam resources during the reception beam sweeping interval of the eNB 510.

c) The UE 520 may transmit multiple RAP signals during the reception beam sweeping interval of the eNB 510 by 1) using a common preamble ID, 2) using different preamble IDs for different RAP signals, or 3) using different preamble IDs for different beams.

In the above process, when only some of eNB reception beam resources are used, usage of a specific resource may be determined randomly or based on the best or average performance measurement value for the previous beams. When channel reciprocity is assumed, it is possible to determine the eNB reception beam based on performance measurement results for eNB transmission beams.

Meanwhile, the beam index allocation and relationship between the eNB transmission beam sweeping interval and the reception beam sweeping interval may be fixed. However, in the case where the beam index allocation and relationship between the eNB transmission beam sweeping interval and the reception beam sweeping interval are not fixed, it is possible for the UE 520 and eNB 510 to transmit and receive a RAP signal without an index error between the eNB reception beams known to the UE 520 and the beams managed by the eNB 510 by 1) allowing the UE 520 to transmit a RAP signal on all beam resources in the reception beam sweeping interval of the eNB 510, 2) configuring the UE 520 in advance with beam index allocation information in the reception beam sweeping interval of the eNB 510, 3) configuring the UE 520 in advance with information on positional relationship between transmission beams and reception beams of the eNB 510.

In the above process, when the same UE 520 transmits RAP signals with multiple preamble IDs, the eNB 510 may be unable to differentiate the UE 520. Thereafter, when the eNB 510 receives msg3 from the UE 520 at operation 1850, the eNB 510 may identify the UE 520 at last based on UE ID contained in msg3. In the same way, upon reception of multiple connection requests from the same UE 520, the eNB 510 may determine whether to accept only one connection request or multiple connection requests.

After the UE 520 transmits a RAP signal (msg1) in the reception beam sweeping interval of the eNB 510, upon reception of the RAP signal, at operation 1840, the eNB 510 prepares a RAR signal (msg2). If the eNB 510 has scanned multiple beams containing RAP with preamble ID, the eNB 510 may select the best beam with highest reception performance as an eNB transmission beam and transmit RAR message (msg2) using the eNB transmission beam. The RAR message (msg2) may be transmitted to the UE 520 through DL-SCH. The RAR message may contain a preamble ID, UL grant, TA, TC-RNTI, and the like.

When a RAP signal is received from a UE 520 at operation 1830, the eNB 510 may determine RA-RNTI for the UE 520. The eNB 510 may transmit a RAR message (msg2) using the determine RA-RNTI at operation 1840 so that the UE 520 having transmitted the RAP message can readily identify the RAR message.

Hence, it is required to determine the RA-RNTI value based on information commonly known to the eNB 510 and UE 520. This common information may include timing and beam related information and may include, for example, at least one of system frame number (SFN), subframe index, beam sweeping index, beam resource index, and RACH resource index. The beam sweeping index is used to distinguish between different beam resources within the beam sweeping interval. The beam resource index is used to distinguish between different beam resources within one sweeping interval, subframe, or beam period in terms of time or frequency. In the description, the beam sweeping index and beam resource index are collectively referred to as beam index (BI). Meanwhile, when the beam sweeping index is additionally considered for RA-RNTI determination, it is possible to make separate responses to RAPs received through different beams in the same beam sweeping interval. However, when the position of the resource through which the eNB 510 makes a response (msg2) at operation 1840 is determined in advance on a beam basis, it is unnecessary to consider the beam sweeping index for RA-RNTI determination.

To receive RAR message (msg2) transmitted by the eNB 510 at operation 1840, the UE 520 may monitor all or some of configured RAR resources. For example, when RAR resources configured for the eNB reception beam index used to receive msg1 transmitted at operation 1830 are determined in advance, the UE 520 may monitor some of the configured RAR resources only. When RAR resources configured for the eNB reception beam index used to receive msg1 are not determined in advance, the UE 520 may monitor all of the configured RAR resources. Here, to prevent the UE 520 from indefinitely monitoring RAR resources, a timer for RAR resource monitoring (e.g., RAR window) may be configured by the eNB 510, and the eNB 510 may notify the UE 520 of the timer in advance through system information or a per-UE control signal. The time value of the timer may be set in terms of absolute time (seconds, minutes), system time (SFN, subframe index, beam sweeping index, maximum beam count, beam sweeping period, or constant representing multiples of a period), or a combination of absolute time and system time. Upon expiration of the RAR monitoring timer, the UE 520 may return to operation 1830 (via operations 1810 and 1820 in the case of synchronization mismatch).

Upon reception of RAR message (msg2), at operation 1840, the UE 520 may examine whether the received RAR message corresponds to the RAP message transmitted at operation 1830 based on RA-RNTI (RA-RNTI and beam index, or RA-RNTI and beam resource index). For multiple RAPs with different preamble IDs transmitted at the same time, only when the preamble ID of the received RAR is identical to one of the preamble IDs transmitted at the same time, the UE 520 may proceed to the next operation. If a preamble ID match is not found, the UE 520 may further wait for RAR from the eNB 510 until expiration of the RAR monitoring timer.

After verification of RA-RNTI (RA-RNTI and beam index, or RA-RNTI and beam resource index), and preamble ID of the RAR message, at operation 1850, the UE 520 may configure uplink transmission resources for msg3 transmission according to UL grant information (uplink resource allocation information). The UE 520 may update timing advance (TA) information for uplink synchronization. The UE 520 may use temporary C-RNTI to perform transmission and reception comparably to the connected state.

The UE 520 may transmit msg3 (e.g., RRC connection request) scrambled with temporary C-RNTI to the eNB 510 at operation 1850. For RRC connection request, message msg3 may contain the ID of the UE 520 (UE ID: IMSI or randomly selected number). Message msg3 may be transmitted to the eNB 510 through UL-SCH.

Upon reception of msg3, at operation 1860, the eNB 510 may transmit to the UE 520 message msg4 containing UE ID of msg3. Upon reception of msg4, the UE 520 may use temporary C-RNTI as proper C-RNTI and proceed to regular data transmission and reception. Message msg4 may be a contention resolution message (RRC connection setup), may be transmitted to the UE 520 through DL-SCH, and may contain UE ID.

Figure 19:
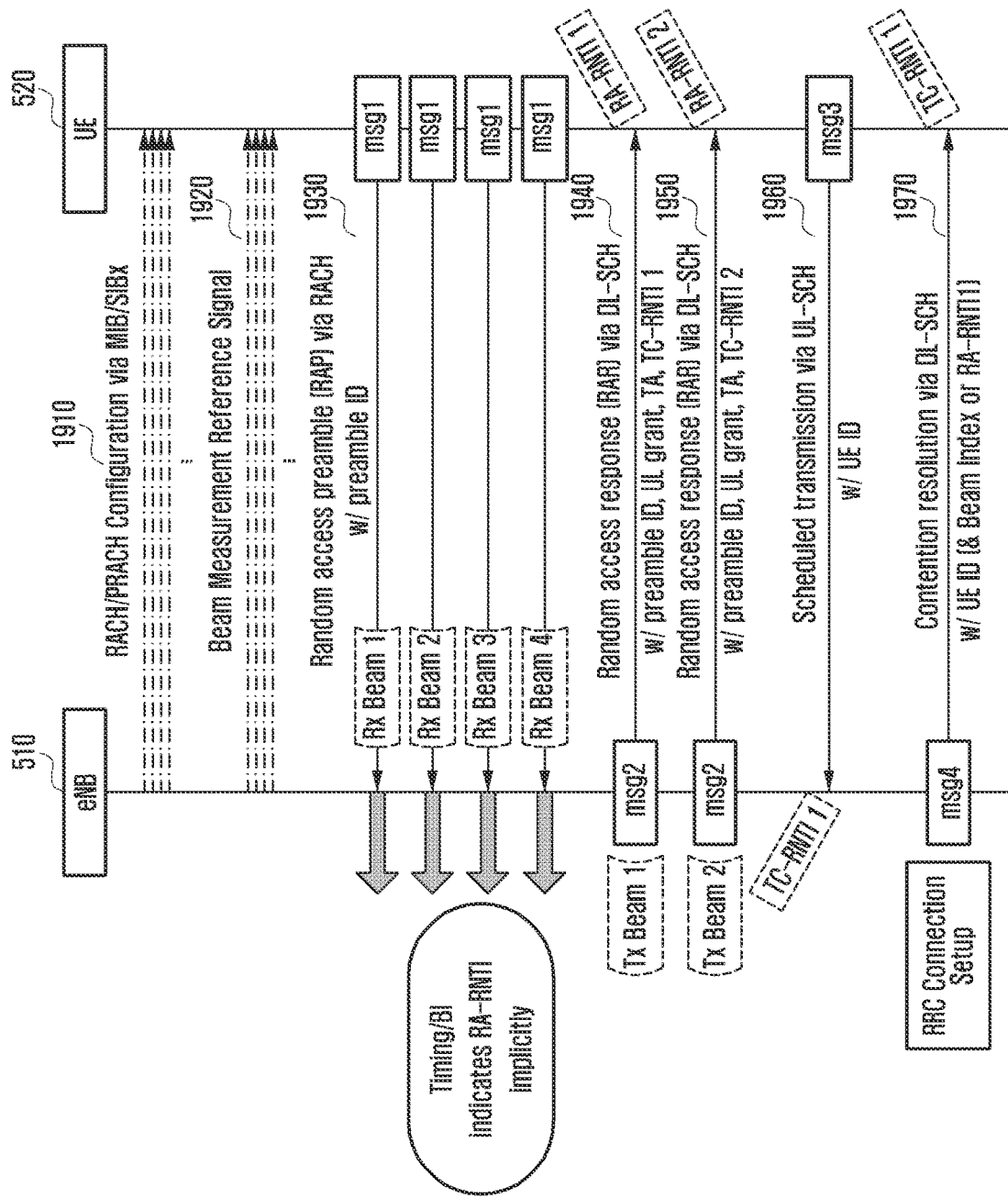
FIG. 19 is a sequence diagram of a random access procedure in an mmWave communication according to an embodiment of the present disclosure.

FIG. 19 is a sequence diagram of a random access procedure in an mmWave communication according to an embodiment of the present disclosure.

Referring to FIG. 18, it is assumed that the UE 520 selects the best transmission/reception beam and performs the subsequent operations accordingly. However, in an mmWave communication, reception performance of a beam may rapidly change with time. Additionally, when RA resources are configured on a beam index basis, when multiple beams show acceptable reception performance, or when beam reciprocity between the eNB and the UE does not hold, the random access procedure using only one beam may cause degradation of system performance. Hence, a description is given of issues arising in a random access procedure using redundant beam resources for performance improvement in an mmWave communication.

Referring to FIG. 19, at operation 1910, the UE 520 may identify the RACH resource location and variables for RACH operation (RAR window, CR timer, backoff index, maximum retry count, and power control parameter) through synchronization and system information acquisition. To this end, the UE 520 may obtain RACH/PRACH configuration through SIB or MIB received from the eNB 510. In addition, the UE 520 may also obtain beam related information needed for beam-based communication (e.g., number of beams, number of beam sweeping resources, beam resource location, and beam sweeping period). In a certain embodiment of the present disclosure, the eNB 510 may notify the UE 520 of the above system and UE parameters through RAR message based on the capacity limitation of BCH.

At operation 1920, the UE 520 may monitor reference signals on a beam basis and determine multiple beam indexes with acceptable reception performance.

At operation 1930, the UE 520 may transmit a RAP signal with preamble ID several times using multiple beams. Here, when the same preamble ID is received through different reception beams, the eNB 510 may carry out the process under the assumption of different UEs. This is because there is a possibility that different UEs select the same preamble ID. The eNB 510 may distinguish between multiple preamble IDs received through individual reception beams. In a certain embodiment of the present disclosure, the eNB 510 may consider different preamble IDs as signals received from different UEs by default, and, when the same preamble ID is received through different beam indexes, the eNB 510 may first determine that the preamble ID is from the same UE and may then determine that the preamble ID is from different UEs. For example, to determine the transmission sequence for RAR messages, the eNB 510 may assign the highest priority to a beam index used to receive the largest number of preamble IDs. If the number of preamble IDs is the same, the eNB 510 may determine the RAR message transmission sequence so that RAR messages with different preamble IDs are transmitted first as far as possible. Namely, in the sequence list, reception information items of the list may be first sorted by preamble ID and then the result may be shuffled so that reception information items with the same preamble ID are separated as far as possible in the list.

When RAP messages (msg1) with the same preamble ID are received through different beam indexes at operation 1930, the eNB 510 may generate (up to N) RAR messages (msg2) for all RAPs and transmit to the RAR messages to the UE 520 at operations 1940 and 1950. Here, as RA-RNTIs are to be different for different RARs, a generation rule may be provided to generate different RA-RNTIs for different beam indexes, beam resource indexes, or other comparable values. When a rule generating the same RA-RNTI is used, it is possible to configure different RAR transmission positions in addition for different beam indexes. Alternatively, RA-RNTI may be generated in an existing manner and RAR message may contain beam ID or PRACH index.

Although the above operation of the eNB 510 is considered, it is possible for the UE 520 having transmitted identical RAP signals through different eNB reception beams to receive multiple RAR messages from the eNB 510. Here, although the eNB 510 assumes that RAP messages received through different beams come from different UEs, to assist selection of the UE 520, the eNB 510 may transmit to the UE 520 RAR messages (msg2) further containing reception performance information for each RAP message (beam ID, beam quality) or RAP priority index. Then, the UE 520 may select a RAR message with highest beam performance or highest RAP priority index.

To reduce complexity of eNB operation, it is possible to use a simple selection rule that enforces the UE 520 to select different preamble IDs for different beams. Then, the eNB 510 may assume that different preamble IDs come from different UEs, and may be unable to determine whether different preamble IDs are transmitted by the same UE 520 until msg3 containing UE ID is received from the UE 520 at operation 1960.

When multiple RAR messages are received before expiration of a specific timer at operations 1940 and 1950, the UE 520 may select one of the RAR messages. Here, the UE 520 may 1) respond to the earliest RAR message, 2) select one RAR message based on RAR reception performance, 3) select one RAR message based on RAR reception performance and RAP reception performance indicated by the RAR messages, 4) select one RAR message based on the priority index of the RAR messages. To enable the eNB 510 to distinguish between msg3 messages transmitted by the UE 520 responding to different RAR messages, when temporary C-RNTIs are assigned through msg2 at operations 1940 and 1960, the eNB 510 should assign different C-RNTIs for different beams.

At operation 1960, the UE 520 transmits to the eNB 510 msg3 corresponding to selected msg2 according to UL grant information of msg2. Upon reception of msg3, at operation 1970, the eNB 510 may transmit msg4 containing UE ID indicated by received msg3.

Meanwhile, those descriptions that are given to operations 1810 to 1860 of FIG. 18 and are not contradictory to the embodiment of FIG. 19 may be applied to operations 1910 to 1970.

Figure 20:
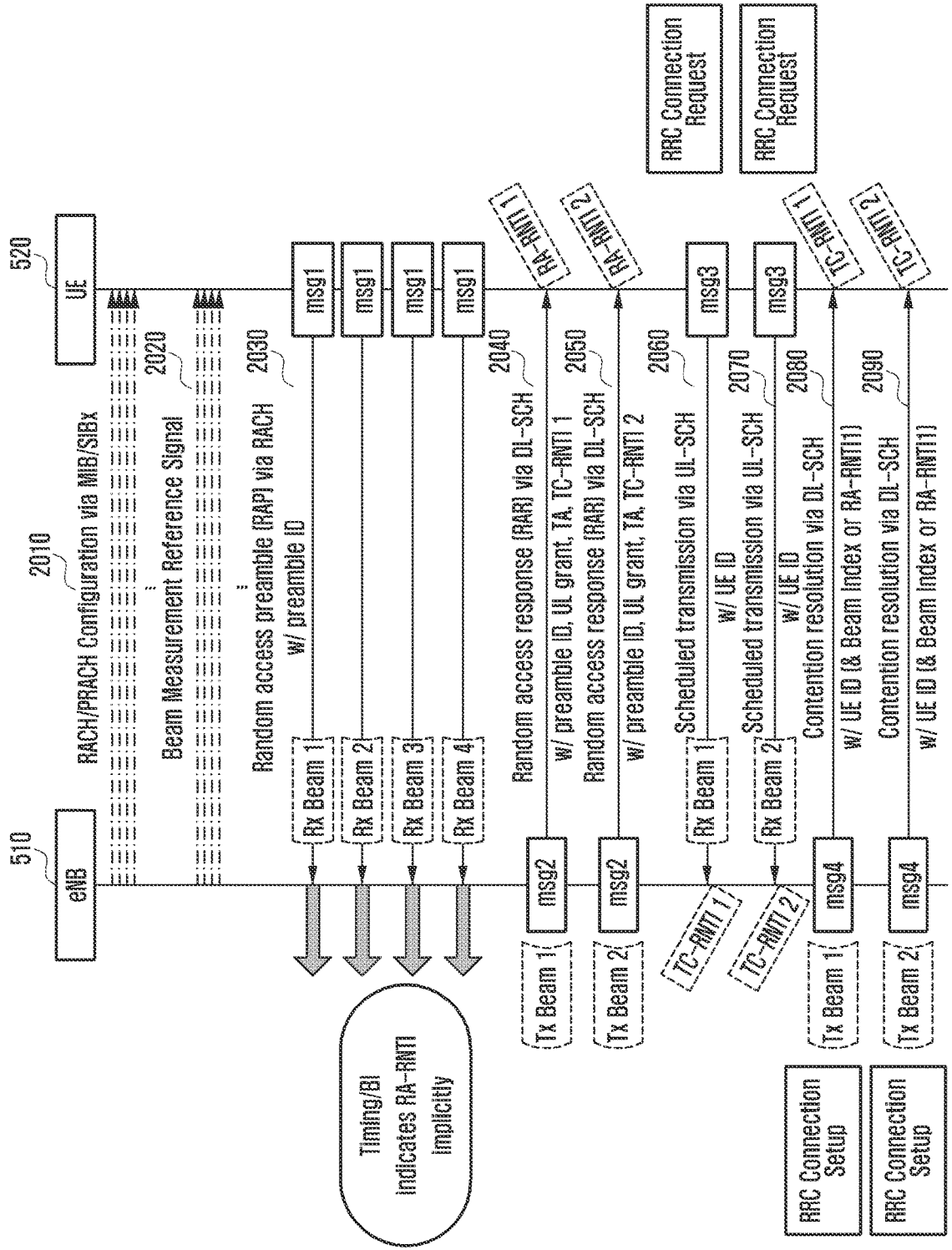
FIG. 20 is a sequence diagram of a random access procedure in an mmWave communication according to an embodiment of the present disclosure.

FIG. 20 is a sequence diagram of a random access procedure in an mmWave communication according to an embodiment of the present disclosure.

Referring to FIGS. 18 and 19, the UE 520 and eNB 510 transmit and receive messages msg3 and msg4 using transmission and reception beam indexes determined during transmission and reception of messages msg1 and msg2. However, to finally determine the beam index during transmission and reception of msg4 based on reception performance of the eNB 510 for msg3, the eNB 510 and the UE 520 may use the following procedure.

Referring to FIG. 20, at operation 2010, the UE 520 may identify the RACH resource location and variables for RACH operation (RAR window, CR timer, backoff index, maximum retry count, and power control parameter) through synchronization and system information acquisition. To this end, the UE 520 may obtain RACH/PRACH configuration through SIB or MIB received from the eNB 510. In addition, the UE 520 may also obtain beam related information needed for beam-based communication (e.g., number of beams, number of beam sweeping resources, beam resource location, and beam sweeping period). In a certain embodiment of the present disclosure, the eNB 510 may notify the UE 520 of the above system and UE parameters through RAR message based on the capacity limitation of BCH. At operation 2020, the UE 520 may monitor reference signals on a beam basis and determine multiple beam indexes with acceptable reception performance. At operation 2030, the UE 520 may transmit a RAP signal several times using multiple beams.

a) When RAP messages (msg1) with the same preamble ID are received through different beam indexes at operation 2030, the eNB 510 may generate (up to N) RAR messages (msg2) for all RAPs and transmit to the RAR messages to the UE 520 at operations 2040 and 2050. Here, as RA-RNTIs are to be different for different RARs, a generation rule may be provided to generate different RA-RNTIs for different beam indexes, beam resource indexes, or other comparable values. When a rule generating the same RA-RNTI is used, it is possible to configure different RAR transmission positions in advance for different beam indexes. Alternatively, RA-RNTI may be generated in an existing manner and RAR message may contain beam ID or PRACH index.

b) The UE 520 may receive multiple RAR messages until expiration of the RAR monitoring timer at operations 2040 and 2050. The UE 520 may generate one msg3 message for each RAR message (or up to M msg3 messages according to eNB settings) and transmit to the eNB 510 the msg3 messages scrambled with temporary C-RNTIs contained in the corresponding RAR messages at operations 2060 and 2070.

c) Upon reception of msg3 messages at operations 2060 and 2070, the eNB 510 may determine UE ID of the msg3 messages and be aware that the msg3 messages are transmitted by the same UE 520. The eNB 510 may select one msg3 message among the msg3 messages randomly or according to reception performance. Thereafter, the eNB 510 may 1) transmit msg4 message corresponding to the selected msg3 message to the UE 520 at operation 2080, or 2) transmit multiple msg4 messages corresponding to the individual msg3 messages at operation 2080 and 2090, where the msg4 message corresponding to the selected msg3 message may contain beam index information (or RA-RNTI or identity information of UE 520) for the selected msg3 message.

d) The UE 520 may 1) select one msg4 message based on eNB transmission beam indexes for received msg4 messages, or 2) examine multiple msg4 messages received until expiration of a specific timer and select one msg4 message according to the beam index (or RA-RNTI) information indicated by the eNB 510, and then start data transmission and reception through a connection established using the selected msg4 message. More specifically, the UE 520 may use temporary C-RNTI (TC-RNTI) of msg2 message received at operations 2040 and 2050 to find the msg4 message containing RA-RNTI information matching TC-RNTI used for msg2 reception among msg4 messages received at operations 2080 and 2090. Alternatively, the UE 520 may determine whether msg4 message contains beam index information used for msg1 transmission at operation 2030. If msg4 message contains the indicated information, the UE 520 may determine that msg4 message is correct. Otherwise, the UE 520 may determine that msg4 message is not selected by the eNB 510 and terminate the corresponding RACH process.

Meanwhile, among descriptions that are given to operations 1810 to 1860 of FIG. 18 and to operations 1910 to 1970 of FIG. 19, those not contradictory to the embodiment of FIG. 20 may be applied to operations 2010 to 2090.

Figure 21:
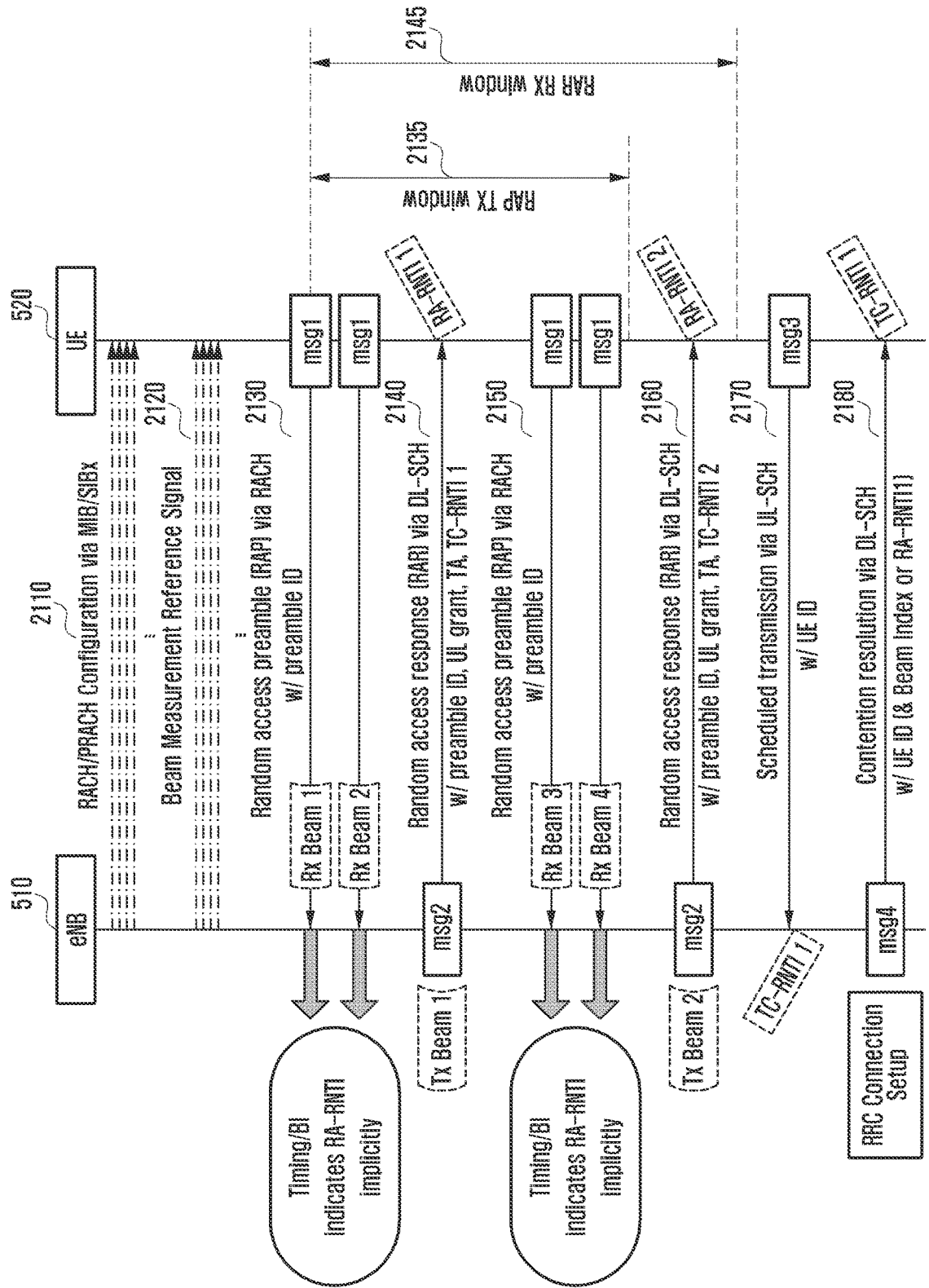
FIG. 21 is a sequence diagram of a random access procedure in an mmWave communication according to an embodiment of the present disclosure.

FIG. 21 is a sequence diagram of a random access procedure in an mmWave communication according to an embodiment of the present disclosure.

For RAP transmission (operation 1930 of FIG. 19, operation 2030 of FIG. 20) and RAR reception (operations 1940 and 1950, operations 2040 and 2050), the UE 520 does not necessarily have to successively transmit N RAP messages and successively receive M (≤N) RAR messages.

Referring to FIG. 21, the UE 520 may select valid PRACH resources among configured PRACH resources within the RAR window according to beam measurement results and may transmit one or more RAP messages before expiration of a specific timer set by the eNB 510 although one or more selected PRACH resources are discontinuous in time.

For example, the eNB 510 may set RAP TX window 2135 or/and RAR RX window 2145 for the UE 520. As depicted at operation 2130 and 2150, during RAP TX window 2135 (k-subframe duration starting immediately after the subframe in which RAP is transmitted first), the UE 520 may additionally transmit up to N RAP messages to the eNB 510.

As depicted at operation 2140 and 2160, the UE 520 may receive one or more RAR messages until expiration of RAR RX window 2145. When multiple RAR messages are received during RAR RX window 2145, according to RAR selection options described before, the UE 520 may select one RAR message (option described in FIG. 19), or may transmit msg3 messages for multiple received RAR messages (option described in FIG. 20).

Meanwhile, RAP TX window 2135 and RAR RX window 2145 may be predefined or be set by the eNB 510. One of RAP TX window 2135 and RAR RX window 2145 may be represented as a function of the other. For example, only RAP TX window (N_p) 2135 may be set, and RAR RX window 2145 may be given by N_r=N_p+k. As another example, only RAR RX window (N_r) 2145 may be set, and RAP TX window 2135 may be given by N_p=N_r−k. As another example, only RAP TX window (N_p) 2135 may be set, and RAR RX window 2145 may be defined based on an event. The event may correspond to reception of M_max RAR messages, reaching X percent of RAR window (2145) for backoff, or reception of RAR message with an acceptable level of quality. Here, the parameter for detecting occurrence of the event may be set by the eNB 510 via SIB. Operations to configure and operate RAP TX window 2135 and RAR RX window 2145 for messages RAP (msg1) and RAR (msg2) may be similarly applied to beam sweeping operations for msg3 and msg4 messages.

Meanwhile, among descriptions that are given to operations 1810 to 1860 of FIG. 18, to operations 1910 to 1970 of FIG. 19, and to operations 2010 to 2090 of FIG. 20, those not contradictory to the embodiment of FIG. 21 may be applied to operations 2110 to 2180.

RACH Configuration Considering Number of Beams

When the transmission beam sweeping interval of the eNB 510 is compose of one BRS (beam reference signal) subframe, the time and frequency resources may be used (if possible to transmit multiple beams at the same time) to sweep most beams of the eNB 510 for transmission. However, in a RACH subframe, allocating multiple RACH resources in the frequency domain may increase the processing load, complicating the implementation. Hence, the number of beams supported in the RACH subframe may be less than that supported in the BRS subframe. To sweep the same number of beams, the eNB reception beam sweeping interval for random access may be set to be longer than the eNB transmission beam sweeping interval. The eNB transmission beam sweeping interval and the eNB reception beam sweeping interval may be notified by the eNB 510 to the UE 520 through BCH or a dedicated message, and the time value thereof may be set by the eNB 510 in terms of absolute time, system time (SFN, subframe index, beam sweeping count, beam count, RACH subframe period, or constant representing multiples of a period), or a combination of absolute time and system time.

As such, according to the reception beam sweeping interval of the eNB 510, the UE 520 may transmit a RAP signal in each RACH subframe or transmit a RAP signal once in several RACH subframes.

First, a description is given of a case where the UE 520 is allowed to perform RAP transmission in each RACH subframe within the eNB reception beam sweeping interval.

The eNB 510 may provide the UE 520 with configuration information indicating 1) use of different preamble IDs, or 2) use of the same preamble ID. No specific information can be given with respect to usage of preamble ID. Within the eNB reception beam sweeping interval, when RAR message is received from the eNB 510 between one RACH subframe and the next RACH subframe, the UE 520 may choose 1) not to transmit RAP signal in the following RACH subframe, or 2) to transmit RAP signal in a valid RACH subframe. The eNB 510 may wait for RAR reception until expiration of a specific timer or a preset time, and may stop waiting upon reception of RAR message according to settings.

Next, a description is given of a case where the UE 520 is allowed to perform RAP transmission in only one RACH subframe within the eNB reception beam sweeping interval.

The eNB 510 may select one eNB reception beam index within the eNB reception beam sweeping interval based on previous eNB signal measurement results. Here, to enable the UE 520 to operate in a specific RACH subframe, the eNB 510 should notify the UE 520 of the RACH subframe corresponding to the selected eNB reception beam index. The UE 520 may be aware of the eNB reception beam index by 1) configuring in advance a relationship between the eNB reception beam index in the BRS subframe and the eNB reception beam index in the RACH subframe (via BCH), or 2) enforcing the eNB 510 to notify the UE 520 of at least one of available beam index information, RACH subframe location, and RACH resource location based on previous UE beam reports (time/frequency location or beam/port index). Option 2) is applicable only to a UE already in connected state. When the eNB 510 notifies the UE 520 of a specific RACH subframe instead of a specific reception beam index, the UE 520 may transmit RAP message as to any eNB reception beam in the notified RACH subframe.

Figure 22:
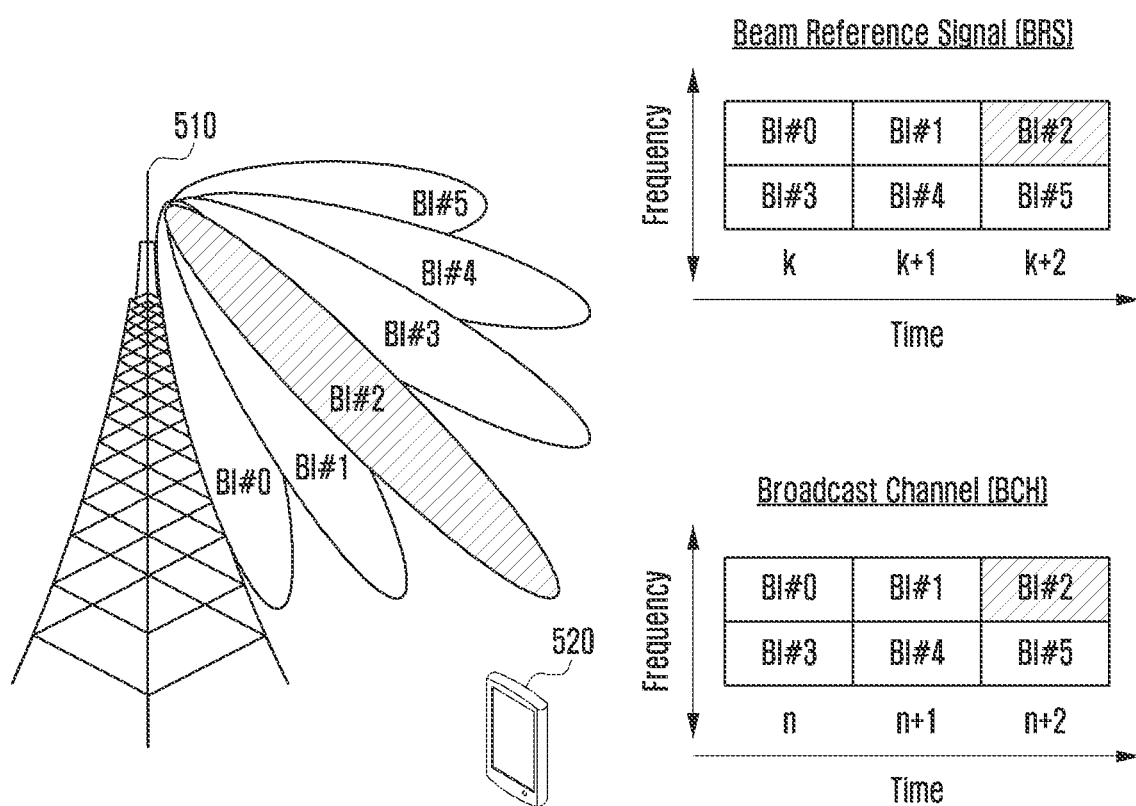
FIG. 22 illustrates a beam reference signal (BRS)/broadcast channel (BCH) transmission structure and UE's optimal beam selection according to an embodiment of the present disclosure.

FIG. 22 illustrates a BRS/BCH transmission structure and UE's optimal beam selection according to an embodiment of the present disclosure.

Referring to FIG. 22, the eNB 510 may transmit a beam reference signal (BRS) through beam sweeping and the UE 520 may receive the beam reference signal. The eNB 510 may simultaneously transmit multiple beams in the frequency domain within one beam sweeping interval. In FIG. 21, BI #0 and BI #3 are transmitted in sweeping interval k, BI #1 and BI #4 are transmitted in sweeping interval k+1, and BI #2 and BI #5 are transmitted in sweeping interval k+2. When the UE 520 receives beam BI #2 with best reception performance, it may select beam BI #2 as the beam to communicate with the eNB 510 having transmitted BRS.

The BCH may operate in the same manner as BRS.

In FIG. 22, BRS sweeping interval k and BCH sweeping interval n may be separated by a time offset or may coincide (i.e., k=n). More particularly, when BRS and BCH are transmitted at the same timing, BRS and BCH may be separated by a frequency offset in the frequency domain. The UE 520 may be aware that BRS and BCH related by a specific time/frequency offset have the same eNB beam index. For example, the UE 520 may select a beam with high performance based on BRS and receive BCH of the selected beam.

The eNB 510 may transmit a PRACH configuration table for eNB beams via BCH as follows. 1) One BCH signal may carry PRACH configuration only for one beam index. 2) One BCH signal may carry PRACH configuration for multiple beam indexes transmitted at the same timing. 3) One BCH signal may carry PRACH configuration for all beam indexes transmitted by the system. In one embodiment of the present disclosure, multiple PRACH resources may be configured for one beam index. In another embodiment of the present disclosure, instead of selecting the best beam only, the UE 520 may select a given number of best beams (e.g., four beams according to eNB's direction or UE implementation) and configure all PRACH resources for the selected beams. In another embodiment of the present disclosure, the UE 520 may select the best beam (e.g., BI #0) among eNB beams measured by one Rx beam, select the best beam (e.g., BI #1) among eNB beams measured by another Rx beam, and configure all PRACH resources for the selected two beams (BI #0 and BI #1). The eNB 510 may notify the UE 520 of a beam selection mode described above for PRACH resource configuration through BCH or UE-dedicated message.

FIG. 23 illustrates eNB information regarding beams, PRACH configuration table, and PRACH resource selection according to an embodiment of the present disclosure.

Referring to FIG. 23, the UE 520 may compose information regarding eNB beams, PRACH configuration table, and PRACH resource selection according to BRS and BCH structures of FIG. 22.

In Case 1, the UE 520 may transmit a RAP signal to the eNB 510 on the third PRACH resource (PRACH #2) 2310 associated with the eNB beam (BI #2 in FIG. 22) determined through BRS reception.

In Case 2, the UE 520 may transmit multiple RAP signals to the eNB 510 on the third PRACH resource (PRACH #2) 2320 and sixth PRACH resource (PRACH #5) 2323 associated with the eNB beam (BI #2 in FIG. 22) determined through BRS reception.

In Case 3, the UE 520 may transmit a RAP signal to the eNB 510 on the sixth PRACH resource (PRACH #5) 2335, which satisfies mask index settings 2340 (allowing transmission on specific PRACH resources (i.e., PRACH #1, #3, #5)) configured on BCH, among the third PRACH resource (PRACH #2) 2330 and sixth PRACH resource (PRACH #5) 2335 associated with the eNB beam (BI #2 in FIG. 22) determined through BRS reception.

Meanwhile, the mapping between eNB beams and PRACH resources may be in various forms such as one-to-one, one-to-many, and many-to-one. In the case of one-to-many mapping where one eNB beam is associated with multiple PRACH resources, the UE 520 may transmit RAP or msg3 message while changing UE transmission beams. In the case of many-to-one mapping where multiple eNB beams are associated with one PRACH resource, the eNB 510 may perform simultaneous transmissions through multiple beams or transmit a composite signal through multiple beams.

Whether the UE 520 transmits one RAP message or multiple RAP messages is described in other part of the specification. In one embodiment of the present disclosure, multiple PRACH resources may be configured in frequency domain at a PRACH transmission timing, and beams determined to be valid based on BRS measurement may be configured on multiple PRACH resources. Here, when it is difficult for the UE 520 to perform simultaneous transmissions on multiple PRACH resources owing to transmission power constraints, the UE 520 may determine to transmit one or more RAP messages on PRACH resources corresponding (in order) to beams with best reception performance within the limits of possibility of simultaneous transmission.

Hereinabove, a description is given of mmWave scenario 1 in Table 2. Next, a description is given of scenarios without a separate sweeping interval such as mmWave scenario 2, mmWave scenario 3, and existing omni-like scenario with a focus on differences relative to mmWave scenario 1.

A description is given of mmWave scenario 2.

TABLE 3

| | Operation 1 | Operation 2 | Operation 3 | Operation 4 |
|---|---|---|---|---|
| mmWave scenario 2 | Sequence @ Beam sweeping | Message @ Beam sweeping | Message @ Scheduled access | Message @ Scheduled access |

In Table 3, mmWave scenario 2 is described.

Whereas the UE 520 may monitor the downlink control channel for a duration corresponding to the RAR window in mmWave scenario 1, the UE 520 may monitor the downlink control channel for an eNB transmission beam sweeping interval in mmWave scenario 2. The eNB 510 may notify the UE 520 of the eNB transmission beam sweeping interval for msg2 transmission via BCH or a different network. The RAR window in mmWave scenario 1 may correspond to the number of failures to receive RAR during the eNB transmission beam sweeping interval in mmWave scenario 2.

A description is given of mmWave scenario 3.

TABLE 4

| | Operation 1 | Operation 2 | Operation 3 | Operation 4 |
|---|---|---|---|---|
| mmWave scenario 3 | Sequence @ Beam sweeping | Message @ Beam sweeping | Message @ Beam sweeping | Message @ Scheduled access |

In Table 4, mmWave scenario 3 is described.

The difference between mmWave scenario 3 and mmWave scenario 1 may include the difference between mmWave scenario 2 and mmWave scenario 1 described above, and the following description.

Whereas the UE 520 transmits msg3 message through an uplink data channel allocated via RAR reception in mmWave scenario 1, the UE 520 may transmit msg3 message through sweeping in an eNB reception beam sweeping interval in mmWave scenario 3. The eNB 510 should provide the UE 520 with configuration information for the eNB reception beam sweeping interval (subframe location or the like) through RAR message or system information. To prevent a collision, the eNB 510 may also notify the UE 520 of frequency resource locations.

A description is given of omni-like scenario.

TABLE 5

| | Operation 1 | Operation 2 | Operation 3 | Operation 4 |
|---|---|---|---|---|
| Omni-like scenario | Sequence @ RACH subframe | Message @ Scheduled access | Message @ Scheduled access | Message @ Scheduled access |

In Table 5, omni-like scenario is described.

Beam sweeping is required for the mmWave band. Hence, even in omni-like scenario, beam sweeping is to be supported over several subframes although a beam sweeping interval (e.g., subframe) is not separately configured. Here, the eNB 510 may notify the UE 520 of beams to be used in periodic RACH subframes through PBCH using MIB/SIB or through common DCI or a separate L1 control signal.

When a long-term control signal and a short-term control signal are used together, information set by the short-term control signal may override information set by the long-term control signal. The process for using a RACH sweeping interval composed of multiple RACH resources physically spread in the time domain may be identical to the process for using a RACH sweeping interval composed of physically continuous RACH resources. However, it is difficult to always sweep all beams in a specific time owing to scheduling conditions of the eNB 510. Hence, the eNB 510 may configure a RACH sweeping timer for the UE 520, so that the UE 520 can transmit or receive a control signal using a suitable beam before expiration of the RACH sweeping timer. When RACH operation does not proceed successfully until expiration of the RACH sweeping timer, the UE 520 may report the current status information to the eNB 510. Then, the eNB 510 may configure the UE 520 with a next RACH sweeping interval or comparable timer so as to resume the suspended RACH operation.

RACH Procedure for Connected UE

A UE in connected state (connected UE) may initiate contention-free RACH or contention-based RACH if necessary. The connected UE may refer to a UE connected to a specific carrier identical to or different from the carrier to which the UE makes random access. For example, a UE being connected to a fourth generation (4G) network and making random access to a 5G network under the control of the 4G network may be regarded as a connected UE. The connected UE may refer to a UE connected to a specific cell identical to or different from the cell to which the UE makes random access.

The UE 520 in connected state may receive configuration information for random access from the eNB 510. Contention-free RACH for connected UE may be managed according to the following conditions and operations.

Conditions: in addition to handover triggering, and TA acquisition, it is possible to further consider beam mismatch, necessity of beam tracking/refinement, and eNB's failure in resource acquisition (cell on/off, muting for interference control, discontinuous use in the unlicensed band or licensed shared band).

Operations: when the eNB 510 detects an occurrence of the above condition, the eNB 510 assigns dedicated preamble ID to the UE 520 and triggers RACH operation. This operation may be indicated by a RRC signal or L1 signal. In addition, the eNB 510 may allocate resources so that the UE 520 can transmit RAP in RACH subframe indicated by specific time/frequency/beam index, time interval, beam sweeping interval, or within an effective time (timer) after indication, and transmit an initiation order to the UE 520. Upon reception of RAP from the UE 520, the eNB 510 may transmit to the UE 520 a RAR message containing at least one of preamble ID, TA, UL grant (uplink allocation information), beam index, beam tracking completion indicator, and RACH completion indicator. The RAR message may further contain configuration information for the next RACH resource and operation.

Contention-based RACH for connected UE may be managed according to the following conditions and operations.

Conditions: in addition to handover triggering, and TA acquisition, it is possible to further consider beam mismatch, necessity of beam tracking/refinement, and eNB's failure in resource acquisition (cell on/off, muting for interference control, discontinuous use in the unlicensed band or licensed shared band).

To detect an occurrence of the above condition, the UE 520 may identify a specific event by measuring a reference signal from the eNB 510 or determine recoverability of TA loss or beam mismatch due to failure of uplink resource allocation before expiration of a given timer. The value of the timer may be different for TA recovery or beam recovery. Here, the value of the timer for TA recovery may be greater than that for beam recovery.

> Operations: upon detecting an occurrence of the above condition, the UE 520 may trigger RACH operation by use of preamble ID allocated by the eNB 510 (serving or neighbor eNB) or selected from a preamble ID set. In addition, the eNB 510 (serving or neighbor eNB) may allocate resources so that the UE 520 can transmit RAP in RACH subframe indicated by specific time/frequency/beam index, time interval, beam sweeping interval, or within an effective time (timer) after event occurrence, and may prepare for operation of the UE 520. Upon reception of RAP from the UE 520, the eNB 510 may transmit to the UE 520 a RAR message containing at least one of preamble ID, TA, UL grant (uplink allocation information), beam index, beam tracking completion indicator, and RACH completion indicator. The RAR message may further contain configuration information for the next RACH resource and operation.

Meanwhile, it is possible to distinguish between RACH resources in the frequency or time domain to use a specific RACH resource for contention-free RACH. In this case, the eNB 510 may determine preamble ID received on the specific RACH resource to be dedicated preamble ID. Hence, the eNB 510 may identify dedicated preamble ID without designating some members of the preamble ID set as dedicated preamble ID. In the subsequent RACH operation, to enable the UE 520 and eNB 510 to distinguish between RACH resources using RA-RNTI, it is necessary for RA-RNTI to include an index for resources designated for dedicated RACH. Here, the index may be specified based on at least one of SFN, subframe index, RACH resource index in order of time or frequency, beam index, and port number.

Controlling Dedicated Preamble ID Allocation in MC Environment

As 64 preamble IDs are a limited resource, it is difficult to assign preamble IDs to all connected UEs of multiple neighboring eNBs. Hence, instead of assigning dedicated preamble ID to one UE, it is necessary to assign preamble ID commonly to all connected UEs or to a group of connected UEs. In this case, as multiple UEs may use the same dedicated preamble ID, it is necessary to resolve a collision correspondingly.

First, a description is given of a case where a neighbor eNB assigns the same dedicated preamble ID to UEs.

Here, the description involves a serving eNB (first eNB or eNB1), neighbor eNB (second eNB or eNB2), and neighbor eNB (third eNB or eNB3).

a) Each eNB (eNB1, eNB2, eNB3) establishes multi-connectivity (MC) to a UE belonging to the coverage thereof. For example, eNB1 establishes multi-connectivity to a UE belonging to eNB2 and eNB3. To establish multi-connectivity, eNB1, although not a serving eNB, may maintain RRC connection contexts of a UE belonging to eNB2 and eNB3 (for a fixed valid time or for a time when a condition is satisfied).

b) eNB1 may notify eNB2 and eNB3 of available dedicated preamble ID for multi-connectivity.

c) eNB2 and eNB3 may assign the dedicated preamble ID received from eNB1 to UE2 (belonging to eNB2) and UE3 (belonging to eNB3), respectively.

d) When a condition for initiating RACH operation for eNB1 is satisfied, UE2 may transmit RAP to eNB1 on a RACH resource of eNB1 by use of the dedicated preamble ID of eNB1. Likewise, when a condition for initiating RACH operation for eNB1 is satisfied, UE3 may transmit RAP to eNB1 on a RACH resource of eNB1 by use of the dedicated preamble ID of eNB1. In this case, although the dedicated preamble ID of eNB1 is the same, UEs can be mostly distinguished by use of RA-RNTI determined according to UE's RAP transmission resource index, or transmission time/frequency/beam index. However, if the above index is the same and RA-RNTI is the same correspondingly, it is possible for multiple UEs to receive msg2 from the eNB and to transmit msg3 on the same resource, causing a collision. To resolve this, the eNB may allocate multiple resources for msg3 transmission, and the UE may select an uplink resource based on UE-specific information such as UE ID and transmit msg3 on the selected uplink resource. When multiple resources are not used for msg3 transmission, to avoid a collision, different RACH resources may be separately configured in advance for different eNBs.

Next, a description is given of a case where the serving eNB assigns the same dedicated preamble ID to UEs.

a) Each eNB establishes multi-connectivity (MC) to a UE belonging to the coverage thereof. For example, eNB1 establishes multi-connectivity to a UE belonging to eNB2 and eNB3. To establish multi-connectivity, eNB1, although not a serving eNB, may maintain RRC connection contexts of a UE belonging to eNB2 and eNB3 (for a fixed valid time or for a time when a condition is satisfied).

b) eNB2 and eNB3 may each notify eNB1 of different dedicated preamble IDs for multi-connectivity.

c) eNB2 and eNB3 may assign its dedicated preamble ID to UE2 (belonging to eNB2) and UE3 (belonging to eNB3), respectively.

d) When a condition for initiating RACH operation for eNB1 is satisfied, UE2 may transmit RAP to eNB1 on a RACH resource of eNB1 by use of the dedicated preamble ID assigned by eNB2. Likewise, when a condition for initiating RACH operation for eNB1 is satisfied, UE3 may transmit RAP to eNB1 on a RACH resource of eNB1 by use of the dedicated preamble ID assigned by eNB3. In this case, as the dedicated preamble ID of eNB2 is different from that of eNB3, there is no collision between UE2 and UE3. However, if the dedicated preamble ID of eNB2 is used by eNB1, there is a possibility of a collision between UE1 of eNB1 and UE2. In practice, as eNB1 is already aware of dedicated preamble ID of eNB2, it is desirable for eNB1 not to assign this dedicated preamble ID to connected UE of eNB2. Nevertheless, a collision may occur according to implementation constraints or when a UE uses the same preamble ID for contention-based RACH. Here, although the dedicated preamble ID may be the same, UEs can be mostly distinguished by use of RA-RNTI determined according to UE's RAP transmission resource index, or transmission time/frequency/beam index. However, if the above index is the same and RA-RNTI is the same correspondingly, it is possible for multiple UEs to receive msg2 from the eNB and to transmit msg3 on the same resource, causing a collision. To resolve this, the eNB may allocate multiple resources for msg3 transmission, and the UE may select an uplink resource based on UE-specific information such as UE ID and transmit msg3 on the selected uplink resource. When multiple resources are not used for msg3 transmission, to avoid a collision, different RACH resources may be separately configured in advance for different eNBs.

Instead of using dedicated preamble ID as described above, it is possible to assign contention preamble ID. In this case, as the possibility of collision increases, it is desirable to reduce the possibility of collision by separately configuring different RACH resources for different eNBs.

As described above, it is possible to separately configure different RACH resources in advance for different eNBs through cooperation between eNBs. This may operate in combination with dedicated preamble ID assignment.

a) Serving eNB (eNB1) may configure a specific RACH resource of neighbor eNB (eNB2) as a separate resource for a UE leaving eNB1. To establish multi-connectivity to eNB2, the UE of eNB1 may transmit RAP on a resource that is allocated to eNB2 and used for a UE belonging to eNB1.

b) Serving eNB (eNB1) may configure a specific RACH resource of neighbor eNB (eNB2) as a separate resource for a UE entering eNB2. To establish multi-connectivity to eNB2, the UE of eNB1 may transmit RAP on a resource that is allocated to eNB2 and used for a UE belonging to eNB2.

Power Ramping Rule Considering Beam Change

During a random access procedure, when the RAR window expires, the UE may determine this as an access failure and may retry RAP transmission. The main cause of access failure is that the transmission power of the UE is too low to reach the eNB. In general, to select an initial eNB, the UE determines the initial transmission power using an open loop power control scheme based on synchronization signals and reference signals from the eNB. In a retry attempt for RAP transmission, the UE increases the current transmission power by a given power ramping amount (or rate) and transmits RAP using the increased transmission power. However, in unlicensed band/shared band communication, it is difficult for such a retry procedure to distinguish between shortage of UE transmission power and eNB LBT failure for the cause of access failure. Power control parameters required by the present disclosure may be included in system information transmitted via PBCH.

Accordingly, to address the above problem in unlicensed band/shared band communication, a description is given of a power control rule for a UE.

For example, the following criteria for UE LBT failure may be determined for one or more RAP transmission attempts made within a preset time.

1) In a RAP transmission attempt, the UE does not increase RACH retry count if LBT operation fails.

2) In a RAP transmission attempt, the UE increases RACH retry count and does not perform power ramping up if LBT operation fails.

3) In a RAR reception attempt, the UE does not increase RACH retry count if the eNB fails in LBT operation.

4) In a RAR reception attempt, the UE increases RACH retry count and does not perform power ramping up if the eNB fails in LBT operation.

In 3) and 4) for a RAR transmission attempt of the eNB, to enable the UE to be aware of eNB's LBT failure, the eNB may notify the UE by transmitting, after LBT success, a signal containing information on the result (success or failure) of LBT operation performed at a specific time. Or, the UE may monitor reference signals from the eNB within the RAR window to detect eNB LBT failure.

Meanwhile, the above retry procedure may cause the following problems in a beam-based communication system.

a) For the cause of access failure, it is difficult to distinguish between shortage of UE transmission power, eNB reception beam mismatch, and UE transmission beam mismatch.

b) When the distance between the eNB and the UE is not changed, increasing the transmission power owing to beam mismatch may cause the eNB to make an error in receiving multiple uplink signals owing to interference.

Accordingly, to address the above problems, the present disclosure proposes a power control rule for the UE.

Figure 24:
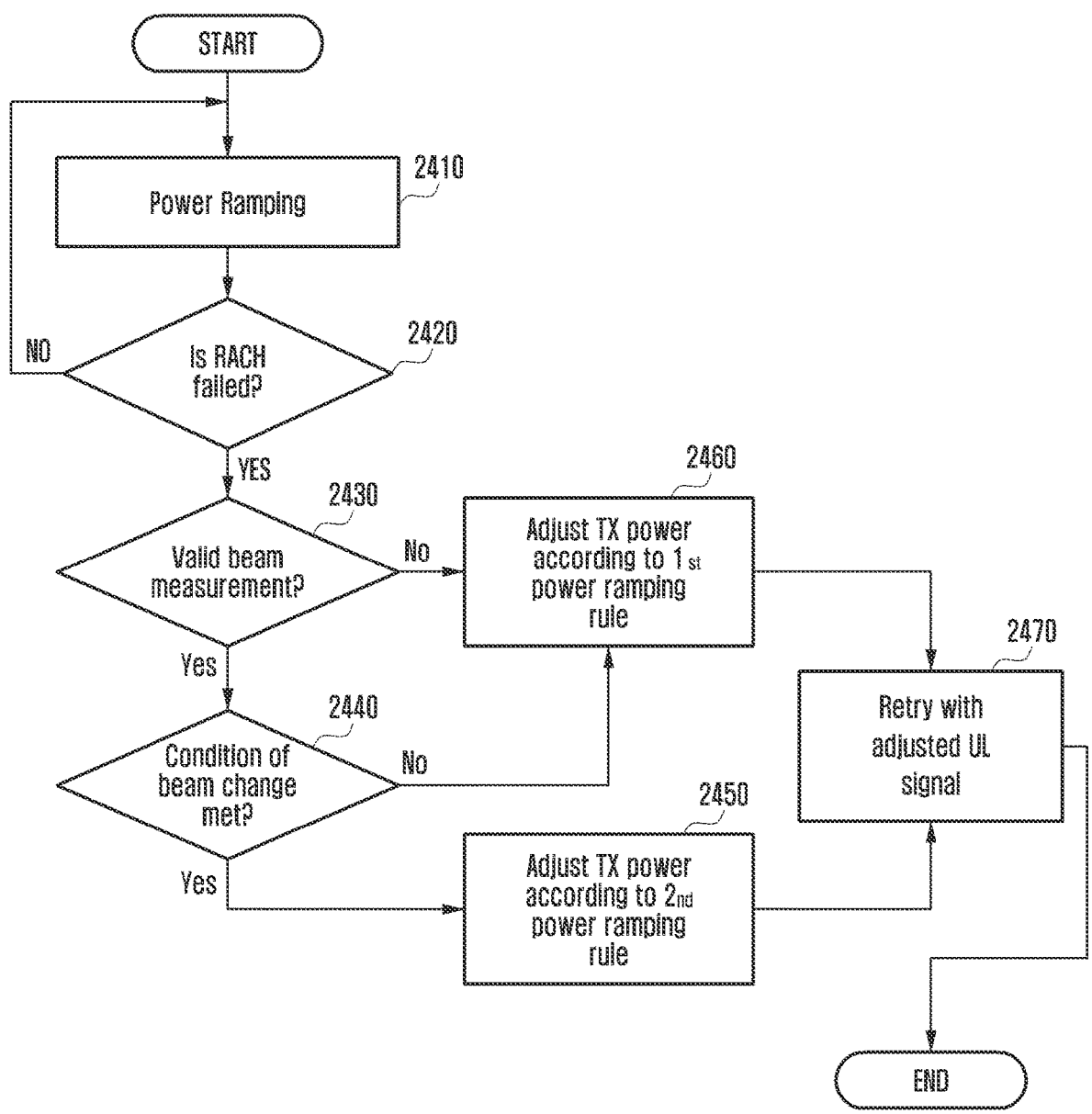
FIG. 24 is a flowchart for determining a power ramping rule and making a retry according to an embodiment of the present disclosure.

FIG. 24 is a flowchart for determining a power ramping rule and making a retry according to an embodiment of the present disclosure.

Figure 25:
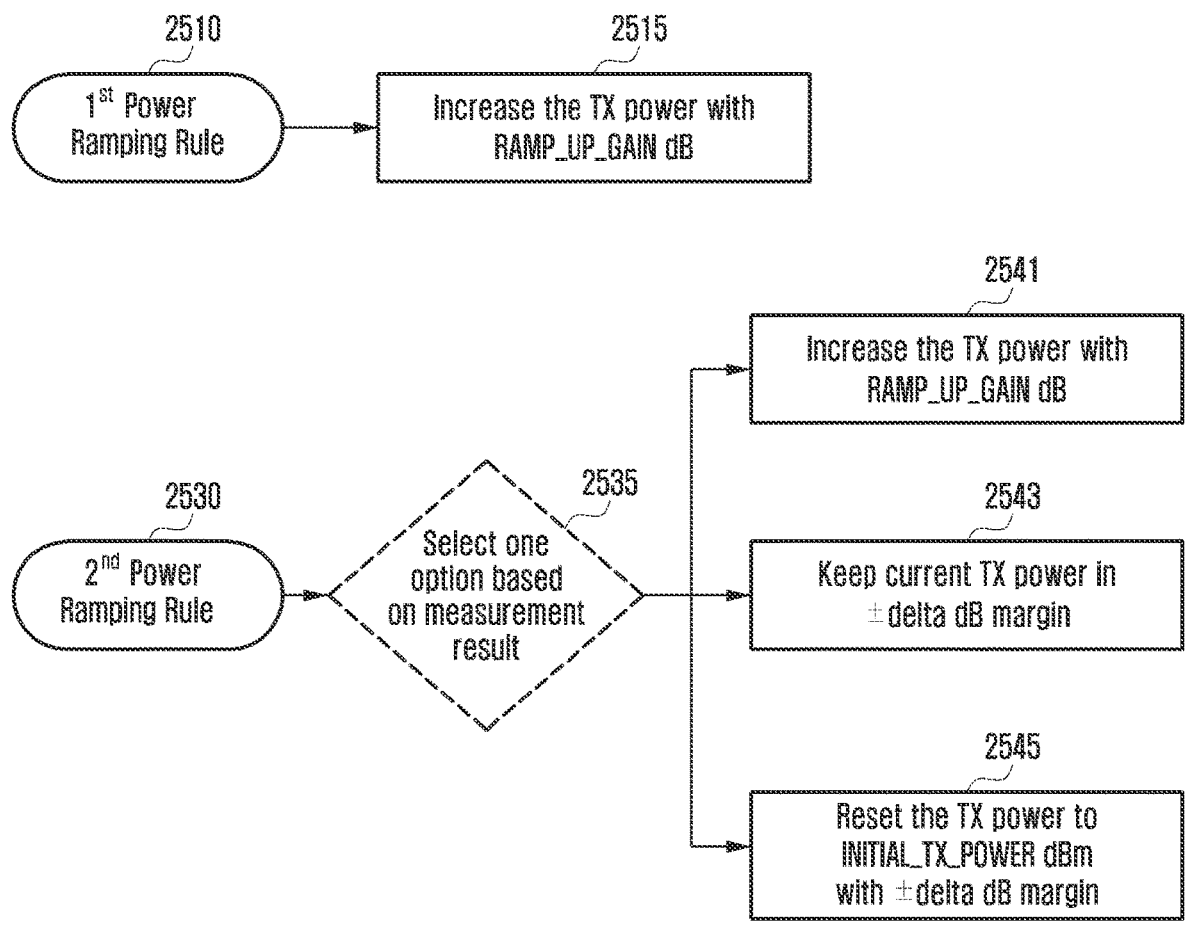
FIG. 25 illustrates a power ramping rule according to an embodiment of the present disclosure.

FIG. 25 illustrates a power ramping rule according to an embodiment of the present disclosure.

Referring to FIG. 24, at operation 2410, the UE may start power ramping.

At operation 2420, the UE determines whether RACH has failed (e.g., RAR is not received within the RAR window, RAR is not received after N retries, expiration of a beam validity timer, expiration of CR timer). When RACH has failed, the UE may examine the beam change condition at operations 2430 and 2440.

In one embodiment of the present disclosure, the UE may skip operation 2420 (determining RACH failure) and examine the beam change condition at operations 2430 and 2440.

To examine the beam change condition, at operation 2430, the UE determines whether a valid beam measurement is present.

When a valid beam measurement for examining the beam change condition is not present, the procedure proceeds to operation 2460 at which the UE may follow the first (existing) power control rule.

When a valid beam measurement is present, at operation 2440, the UE examines the beam change condition. If the beam change condition is met, the procedure proceeds to operation 2450 at which the UE may follow the second power control rule and then proceeds to operation 2470 and retry with adjusted UL signal. Here, if necessary, the UE may determine additional conditions and perform corresponding power control operations. In addition, the RAR window may be extended according to the beam state condition.

If the beam change condition is not met at operation 2440, the procedure proceeds to operation 2460 at which the UE may follow the first (existing) power control rule and then proceeds to operation 2470 and retry with adjusted UL signal.

Here, the beam change condition may correspond to 1) a situation where at least one of a pair of transmission beam and reception beam is changed when channel reciprocity holds, or 2) a situation where at least one of downlink transmission beam, downlink reception beam, uplink transmission beam, and uplink reception beam is changed when channel reciprocity does not hold.

Whether to change the beam may be determined according to at least one of: 1) a beam index change is caused by beam measurement, 2) received power (RSRP) or channel quality (RSRQ) of the current beam drops below a preset margin, 3) the beam validity timer expires without occurrence of the beam change condition for the current beam, and 4) a logical combination of 1), 2), 3) (for example, (c1 AND c2), (c1 AND NOT c3), (c1 OR c2)). As an example for 4), although the beam index is changed, if the difference between reception powers is less than preset delta, the UE may maintain the current transmission power.

Referring to FIG. 25, a first power control rule 2510 is a regular power control rule. When the power control condition is met, the transmission power may be increased by a preset ramp-up rate (RAMP_UP_GAIN) as indicated by indicia 2515.

The second power control rule 2530 is a power control rule for a beam-based communication system, and includes three options as indicated by indicia 2541, 2543, 2545. The UE may select one of the three options according to beam measurement results indicated by indicia 2535. The three options are described as follows.

Option 1 (2541) is to increase the transmission power by a preset ramp-up rate (RAMP_UP_GAIN).

Option 2 (2543) is to maintain the current transmission power. If necessary, the transmission power may be finely adjusted by ±delta.

Option 3 (2545) is to reset the transmission power to the initial value. If necessary, the transmission power may be finely adjusted by ±delta.

In one embodiment of the present disclosure, the UE may receive beam-based RS from the eNB and measure the signal strength on a periodic basis of 40 ms, and may transmit RAP on a PRACH resource configured via system information if necessary. When RAR is not received until expiration of the RAR window (e.g., 20 ms) owing to failure of RAP transmission or RAR reception, the UE may examine reception performance of the current beam. If the reception performance is less than a preset level, the UE may increase the transmission power by RAMP_UP_GAIN.

In another embodiment of the present disclosure, the UE may receive beam-based RS from the eNB and measure the signal strength on a periodic basis of 40 ms, and may transmit RAP on a PRACH resource configured via system information if necessary. Later, when RAR is not received until expiration of the RAR window (e.g., 20 ms) owing to failure of RAP transmission or RAR reception, there may be 5 ms left before reception of next beam-based RS. In this case, considering that it can receive next beam-based RS before expiration of a given timer (e.g., 10 ms) set by the eNB and change the current beam to an acceptable beam, the UE may postpone current RA retry operation until acquisition of the next beam.

In another embodiment of the present disclosure, the UE may receive beam-based RS from the eNB and measure the signal strength on a periodic basis of 40 ms, and may transmit RAP on a PRACH resource configured via system information if necessary. Later, when RAR is not received until expiration of the RAR window (e.g., 20 ms) owing to failure of RAP transmission or RAR reception, there may be 5 ms left before reception of next beam-based RS. In this case, considering that the beam validity timer is set to 30 ms and 35 ms has already passed after the current beam-based RS, the UE may assume that the used beam is already changed and perform RAP transmission while maintaining the current transmission power until beam update.

In another embodiment of the present disclosure, the UE may receive beam-based RS from the eNB and measure the signal strength on a periodic basis of 40 ms, and may transmit RAP on a PRACH resource configured via system information if necessary. Later, when RAR is not received until expiration of the RAR window (e.g., 20 ms) owing to failure of RAP transmission or RAR reception, there may be 15 ms left before reception of next beam-based RS. In this case, considering that the beam validity timer is set to 30 ms and 25 ms has already passed after the current beam-based RS, the UE may assume that the used beam is not changed and increase the transmission power by RAMP_UP_GAIN until beam update.

In another embodiment of the present disclosure, the UE may measure the signal strength of beam-based RS from the eNB in a reception monitoring interval of 40 ms, and may transmit RAP on a PRACH resource configured via system information if necessary. Later, when RAR is not received until expiration of the RAR window (e.g., 20 ms) owing to failure of RAP transmission or RAR reception, there may be 5 ms left until the end of the next reception monitoring interval. In this case, considering that the beam validity timer is set to 30 ms and 35 ms has already passed after the current beam-based RS, the UE may assume that the used beam is already changed. Further considering that it can receive next beam-based RS before expiration of a given timer (e.g., 10 ms) set by the eNB and change the current beam to an acceptable beam, the UE may postpone current RA retry operation until acquisition of the next beam.

In another embodiment of the present disclosure, the UE may measure the signal strength of beam-based RS from the eNB in a reception monitoring interval of 40 ms, and may transmit RAP on a PRACH resource configured via system information if necessary. Later, when RAR is not received until expiration of the RAR window (e.g., 20 ms) owing to failure of RAP transmission or RAR reception, there may be 15 ms left until the end of the next reception monitoring interval. In this case, considering that it is very difficult to receive next beam-based RS and change the current beam to an acceptable beam before expiration of a given timer (e.g., 10 ms) set by the eNB, the UE may increase the transmission power by RAMP_UP_GAIN.

In another embodiment of the present disclosure, the UE may receive beam-based RS from the eNB in a consecutive RS interval of 5 ms repeated on a periodic basis of 40 ms and measure the signal strength, and may transmit RAP on a PRACH resource configured via system information if necessary. Later, when RAR is not received until expiration of the RAR window (e.g., 20 ms) owing to failure of RAP transmission or RAR reception, there may be 10 ms left until the start of the next consecutive RS interval of 5 ms. In this case, considering that the beam validity timer is set to 30 ms and 25 ms has already passed after the current beam-based RS, the UE may assume that the used beam is not changed and thus increase the transmission power by RAMP_UP_GAIN.

In another embodiment of the present disclosure, the UE may receive beam-based RS from the eNB in a consecutive RS interval of 5 ms repeated on a periodic basis of 40 ms and measure the signal strength, and may transmit RAP on a PRACH resource configured via system information if necessary. Later, when RAR is not received until expiration of the RAR window (e.g., 20 ms) owing to failure of RAP transmission or RAR reception, there may be 10 ms left until the start of the next consecutive RS interval of 5 ms and with 15 ms left until the end thereof. In this case, considering that 50 percent or more of the time interval is included in a duration of 5 ms to receive next beam-based RS before expiration of a given timer (e.g., 13 ms) set by the eNB, the UE may determine that beam update is highly probable and thus postpone current RA retry operation until acquisition of the next beam.

In another embodiment of the present disclosure, the UE may receive beam-based RS from the eNB in a consecutive RS interval of 5 ms repeated on a periodic basis of 40 ms and measure the signal strength, and may transmit RAP on a PRACH resource configured via system information if necessary. Later, when RAR is not received until expiration of the RAR window (e.g., 20 ms) owing to failure of RAP transmission or RAR reception, there may be 10 ms left until the start of the next consecutive RS interval of 5 ms and with 15 ms left until the end thereof. In this case, considering that 50 percent or more of the time interval is included in a duration of 5 ms to receive next beam-based RS before expiration of a given timer (e.g., 13 ms) set by the eNB, the UE may determine that beam update is highly probable. As such, the UE may transmit RAP with beam transmission power increased by RAMP_UP_GAIN. Then, 1) when the same beam is maintained after beam update, or 2) when similar beam performance is maintained after beam update (at least one of 1) and 2) holds), the UE may decrease the transmission power by RAMP_UP_GAIN to recover the original transmission power.

In another embodiment of the present disclosure, the UE may receive beam-based RS from the eNB and measure the signal strength on a periodic basis of 40 ms, and may transmit RAP on a PRACH resource configured via system information if necessary. Later, when RAR is not received until expiration of the RAR window (e.g., 20 ms) owing to failure of RAP transmission or RAR reception, the UE may examine the reception performance of the currently used beam. If the reception performance is lower than a preset threshold, the UE may cancel changes in transmission power made from the previous beam determination time to the present time.

In another embodiment of the present disclosure, the UE may receive beam-based RS from the eNB and measure the signal strength on a periodic basis of 40 ms, and may transmit RAP on a PRACH resource configured via system information if necessary. Later, when RAR is not received until expiration of the RAR window (e.g., 20 ms) owing to failure of RAP transmission or RAR reception, the UE may examine the reception performance of the currently used beam. If the reception performance is lower than a preset threshold, the UE may cancel changes in transmission power made from expiration of the beam validity timer set by the eNB after previous beam determination to the present time.

In beam-based power ramping described above, transmission power control operation where beam mismatch is determined by the UE may be applied to the unlicensed band. For example, determining beam mismatch may be replaced with determining the success/failure of LBT operation. In this case, as the UE performs LBT operation before transmitting RAP (msg1) or msg3, it may immediately determine the success/failure of LBT operation. Hence, the time required to determine the success/failure of LBT operation may be less than the time required to determine beam mismatch.

Channel Quality Reporting Procedure

Figure 26:
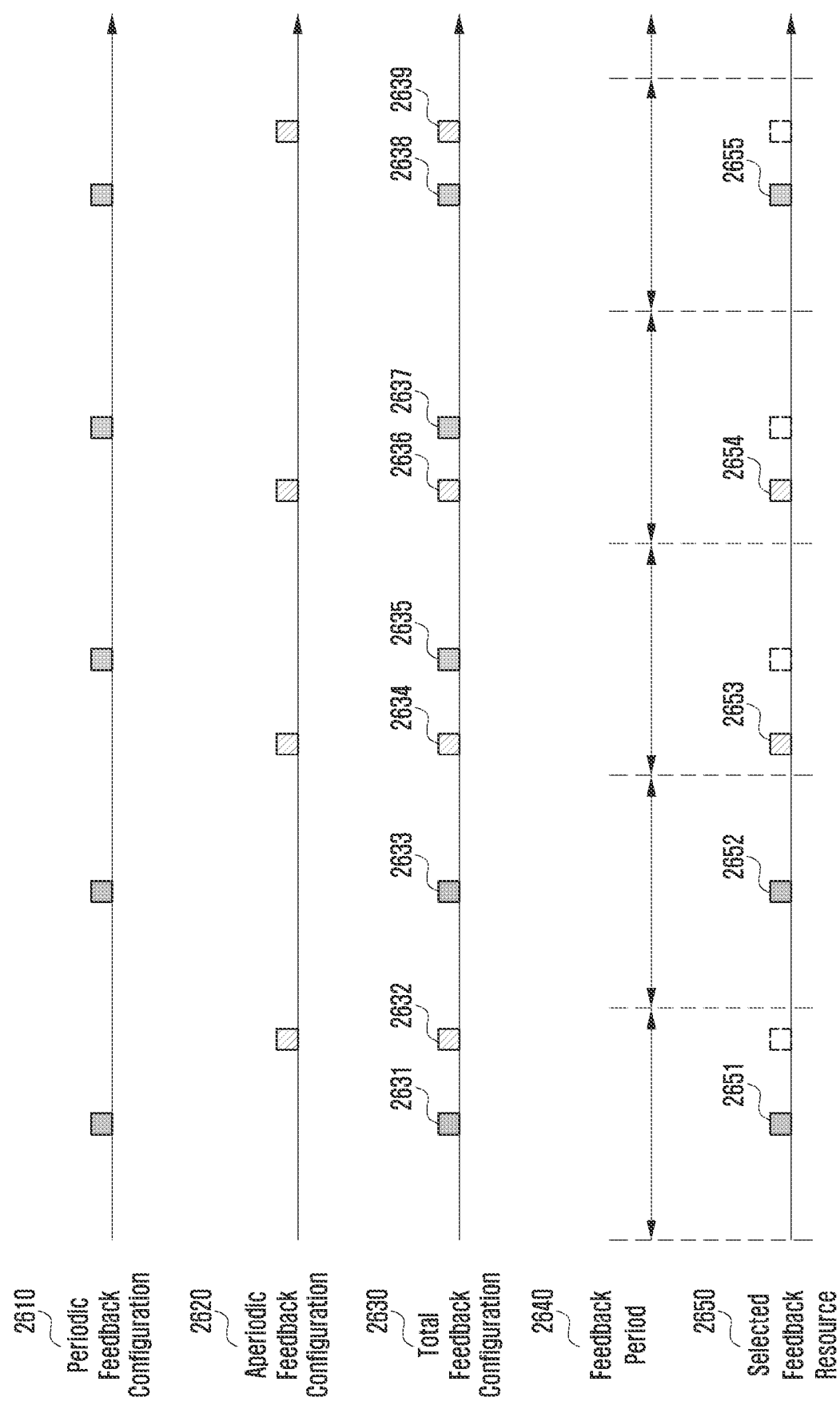
FIG. 26 illustrates allocation and selection of channel quality reporting resources according to an embodiment of the present disclosure.

FIG. 26 illustrates allocation and selection of channel quality reporting resources according to an embodiment of the present disclosure.

Referring to FIG. 26, the eNB may allocate an uplink resource to the UE for channel quality reporting. For PSCell or SCell in which transmission is performed according to LBT operation, aperiodic allocation of channel quality reporting resources by PCell alone is not sufficient for addressing the loss of transmission opportunity due to LBT operation.

Hence, in the present disclosure, periodic allocation of channel quality reporting resources is considered. When the UE has failed to report channel quality owing to LBT failure on a periodic resource, it may perform LBT operation on the next periodic resource, increasing the success rate for reporting. However, when the period of the periodic resources is too short, the amount of data reported to the eNB may exceed the minimum amount of report data needed by the eNB for scheduling. As such, in the present disclosure, periodic channel quality reporting and aperiodic channel quality reporting are used together so as to increase the success rate for channel quality reporting according to eNB's decisions or needs while avoiding excessive reporting load.

In the existing scheme, the eNB may allocate PUCCH to the UE for periodic channel quality reporting, allocate PUSCH to the UE for aperiodic channel quality reporting, or allocate both PUCCH and PUSCH. If PUCCH for periodic reporting and PUSCH for aperiodic reporting are allocated together in the same subframe, the UE may transmit the channel quality report together with data via PUSCH. The eNB may specify the reporting type of a channel quality report according to a channel for the wideband or a channel for an allocated band. The reporting type may be wideband, UE selected sub-band, eNB configured sub-band. Reporting mode of the UE may be determined by two pieces information including the reporting type and the transmission mode.

To notify the UE of aperiodic channel quality reporting, the eNB sets the CQI Request Field to '1' 1) when using downlink control information (DCI) format to indicate uplink resource allocation of the downlink control channel (PDCCH), or 2) when using eNB RAR message (msg2) as RAR grant to indicate resource allocation for UE msg3 in CFRA.

When a DCI format for indication is received in subframe n, the UE may determine to transmit a channel quality report in subframe n+k. Here, k is 4 for a FDD system and has a different value according to DL/UL subframe configuration for a TDD system.

When RAR grant is received for indication, the UE determines the UL delay field. If the UL delay field is set to 0, the UE determines to report channel quality in the earliest uplink subframe among subframes n+k (k>=6). If the UL delay field is set to 1, the UE determines to report channel quality in the next-earliest uplink subframe among subframes n+k (k>=6).

The existing channel quality reporting procedure described above may fail to consider channel uncertainty in 5G bands. For example, when a UE is unable to transmit a signal because it is blocked by LBT operation on a channel quality reporting resource allocated by the eNB, the eNB may miscalculate that the signal of the UE is not received owing to interference or shortage of transmission power, or the UE has failed to receive an order for aperiodic channel quality reporting. In the existing 4G licensed bands, such an error occurs infrequently. Hence, when an expected channel quality report is not received, the eNB may have only to allocate channel quality reporting once more. However, in the 5G bands where such an error may occur frequently, frequent resource reallocation may cause inefficiency in resource usage, and PCell or PSCell in full charge of scheduling may be heavily loaded.

Accordingly, in the present disclosure, resources for periodic channel quality reporting are pre-allocated to thereby reduce the load for resource allocation and increase the probability of successful transmission in an environment where LBT operation is required.

Scheme 1) The eNB notifies the UE in the same manner as existing PUCCH allocation and performs PUSCH allocation as physical layer mapping in specific SCell (e.g., SCell using an unlicensed band).

Scheme 2) The eNB notifies the UE in the same manner as existing SPS allocation and transmits a separate indication to notify that allocation is not for voice over internet protocol (VoIP) but for channel quality reporting.

Scheme 3) The eNB employs a new PUSCH allocation scheme to enable periodic allocation within a limited time and allocate N consecutive subframes in each period.

It is not necessary to use all the pre-allocated channel quality reporting resources for actual channel quality reporting. For example, although channel quality reporting resources are allocated on a periodic basis of 3 subframes, if the period of channel quality reporting requested by the eNB is 10 subframes, the UE has only to report once for 3 channel quality reporting resources in 10 subframes. Here, when LBT operation fails on the first channel quality reporting resource, the UE may prepare for transmission on the second channel quality reporting resource. When LBT operation succeeds on the second channel quality reporting resource, the UE may transmit a report and may use the third channel quality reporting resource for other uplink data transmission.

As described above, the UE may transmit a channel quality report in the first available subframe within the channel quality reporting period based on the LBT result and may transmit regular uplink data on the remaining available resources.

Referring to FIG. 26, even in the case of mixed periodic/aperiodic resource allocation (2610, 2620), the UE applies the same rule by transmitting a channel quality report (2650) in the first available subframe within the channel quality reporting period regardless of periodic or aperiodic resource allocation. For example, periodic resources (2610) and aperiodic resources (2620) are allocated together, resulting in overall allocation of resources as indicated by indicia 2630 (2631, 2632, 2633, 2634, 2635, 2636, 2637, 2638, 2639). In this case, the UE may transmit a channel quality report using the earliest resource (2651, 2652, 2653, 2654, 2655) in each channel quality reporting period 2640.

Meanwhile, when the subframe configured with a channel quality reporting resource is identical to the subframe scheduled for ACK/NACK transmission, 1) the UE may transmit both a channel quality report and ACK/NACK information. Otherwise, the UE may transmit a channel quality report only. 2) When transmission on the ACK/NACK resource is still unsuccessful until expiration of the ACK/NACK minimum report delay time, the UE may transmit both a channel quality report and ACK/NACK information. Otherwise, the UE may transmit a channel quality report only.

Figure 27:
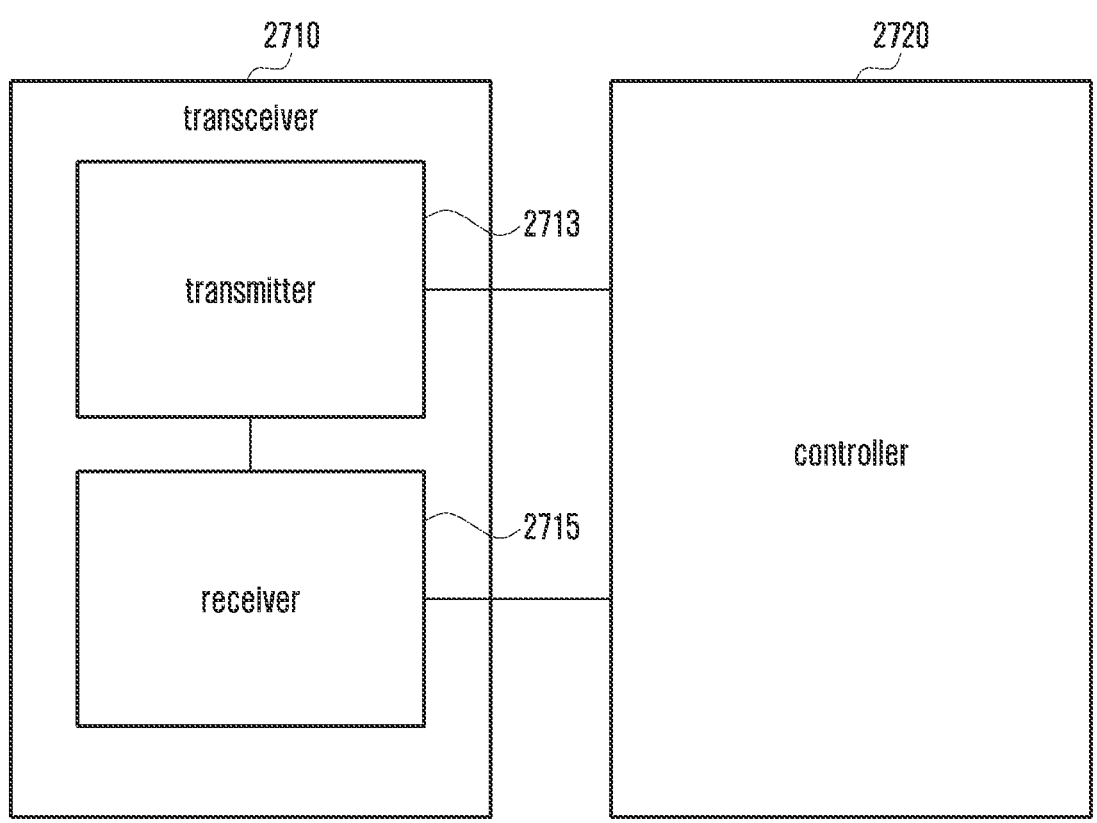
FIG. 27 is a block diagram of a user equipment according to an embodiment of the present disclosure.

FIG. 27 is a block diagram of a user equipment according to an embodiment of the present disclosure.

Referring to FIG. 27, the UE may include a transceiver 2710 and a controller 2720 to control the overall operation thereof. The transceiver 2710 may include a transmitter 2713 and a receiver 2715.

The transmitter 2713 and the receiver 2715 may be collectively referred to as a transceiver. The transceiver 2710 may transmit and receive signals to and from other network entities.

The controller 2720 may control the UE to perform a function according to one of the embodiments described before. For example, the controller 2720 may receive RACH configuration from the eNB, and may transmit to the eNB a RAP message in an uplink subframe of an unlicensed band matching a subframe configured as a RACH resource according to the RACH configuration. The controller 2720 may receive a beam reference signal from the eNB in the eNB transmission beam sweeping interval, transmit a RAP message on multiple reception beam resources within the eNB reception beam sweeping interval to the eNB, and receive at least one RAR (random access response) message corresponding to the RAP message from the eNB.

Although the controller 2720 and the transceiver 2710 are shown as separate entities, they may be realized as a single entity like a single chip. The controller 2720 and the transceiver 2710 may be electrically connected to each other.

The controller 2720 may be a circuit, an application-specific circuit, or a processor. UE operations may be implemented using a memory unit storing corresponding program codes. Specifically, the UE may be equipped with a memory unit to store program codes implementing desired operations, and the controller 2720 may read and execute the program codes stored in the memory unit.

Figure 28:
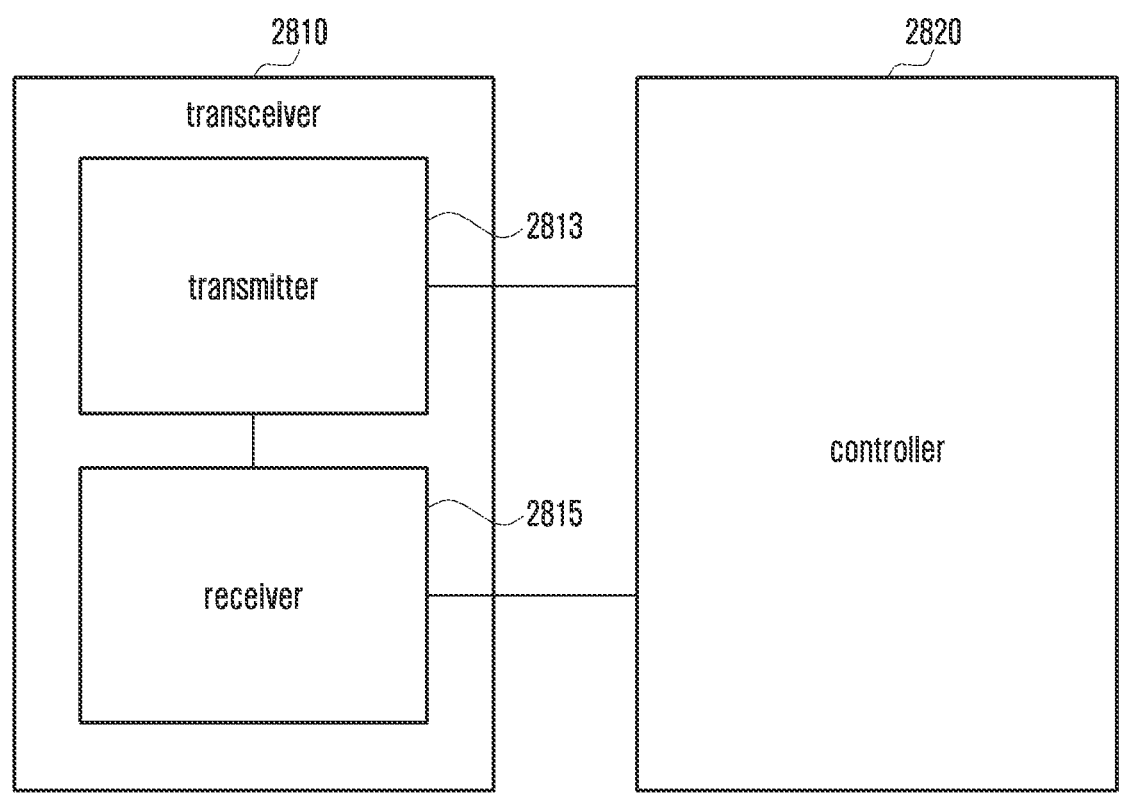
FIG. 28 is a block diagram of a base station according to an embodiment of the present disclosure.

FIG. 28 is a block diagram of a base station according to an embodiment of the present disclosure.

Referring to FIG. 28, the base station eNB may include a transceiver 2810 and a controller 2820 to control the overall operation thereof. The transceiver 2810 may include a transmitter 2813 and a receiver 2815.

The transmitter 2813 and the receiver 2815 may be collectively referred to as a transceiver. The transceiver 2810 may transmit and receive signals to and from other network entities.

The controller 2820 may control the eNB to perform a function according to one of the embodiments described before. For example, the controller 2820 may transmit RACH configuration to a UE, and may receive a RAP message in an uplink subframe of an unlicensed band matching a subframe configured for the UE as a RACH resource according to the RACH configuration. The controller 2820 may transmit a beam reference signal to the UE in the eNB transmission beam sweeping interval, receive a RAP message on multiple reception beam resources within the eNB reception beam sweeping interval from the UE, and transmit at least one RAR message corresponding to the RAP message to the UE.

Although the controller 2820 and the transceiver 2810 are shown as separate entities, they may be realized as a single entity like a single chip. The controller 2820 and the transceiver 2810 may be electrically connected to each other.

The controller 2820 may be a circuit, an application-specific circuit, or a processor. ENB operations may be implemented using a memory unit storing corresponding program codes. Specifically, the eNB may be equipped with a memory unit to store program codes implementing desired operations, and the controller 2820 may read and execute the program codes stored in the memory unit.

It should be understood that schemes or methods and devices or components shown in FIGS. 1 to 28 are not intended to limit the scope of the present disclosure. It will also be apparent to those skilled in the art that the present disclosure may be practiced with only some of the aspects including components, entities, and operations described in FIGS. 1 to 28.

ENB operations and UE operations described herein may be implemented using memory units storing corresponding program codes. Specifically, the eNB or the UE may be equipped with a memory unit to store program codes implementing desired operations. To perform a desired operation, the controller of the eNB or the UE may read and execute the program codes stored in the memory unit by using a processor or a central processing unit (CPU).

Various components and modules of the entity, base station or user equipment described in the specification may be implemented by use of hardware (such as complementary metal oxide semiconductor (CMOS) logic circuits), software, firmware (such as software stored in machine readable media), or a combination thereof. For example, various electrical structures and schemes may be realized by use of electric circuits such as transistors, logic gates, and application specific integrated circuits (ASIC).

While the present disclosure has been shown and described with reference to various embodiments, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   transmitting, to a base station, at least one random access preamble using at least one resource for transmitting the at least one random access preamble;
   monitoring a random access response based on a random access response window;
   identifying that the random access response is not received within the random access response window;
   determining to retransmit, to the base station, at least one random access preamble in case that the random access response is not received within the random access response window;
   identifying whether a transmission beam for a retransmission is changed based on the determining to retransmit the at least one random access preamble;
   determining to suspend a power ramping counter in case that the transmission beam for the retransmission is changed; and
   retransmitting, to the base station, at least one random access preamble, based on the determined power ramping counter.

2. The method of claim 1, further comprising:
   determining to increment a power ramping counter by a predetermined value, in case that the transmission beam for the retransmission is not changed.

3. The method of claim 1, wherein transmitting the at least one random access preamble further comprises:
   receiving, from the base station, at least one synchronization signal;
   in case that a measurement result of the at least one synchronization signal is greater than a predetermined threshold value, identifying an index of the at least one synchronization signal;
   determining at least one resource for transmitting at least one random access preamble corresponding to the identified index of the synchronization signal; and
   transmitting, to the base station, the at least one random access preamble based on the determined at least one resource for transmitting the at least one random access preamble.

4. The method of claim 3, further comprising:
   receiving, from the base station, information on mapping between the index of at least one synchronization signal and at least one resource for a random access preamble transmission.

5. A method performed by a base station in a wireless communication system, the method comprising:
   receiving, from a terminal, at least one random access preamble using at least one resource for transmitting the at least one random access preamble; and
   receiving, from the terminal, at least one random access preamble which is retransmitted based on a power ramping counter,
   wherein a random access response is monitored based on a random access response window, by the terminal, that the random access response is not received within the random access response window is identified, a retransmission is determined, to suspend a power ramping counter is determined in case that a transmission beam for the retransmission is changed.

6. The method of claim 5, wherein to increment a power ramping counter by a predetermined value is determined, in case that the transmission beam for the retransmission is not changed.

7. The method of claim 5, wherein receiving the at least one random access preamble further comprises:
   transmitting, to the terminal, at least one synchronization signal; and
   receiving, from the terminal, the at least one random access preamble based on at least one resource for transmitting the at least one random access preamble, the at least one resource for transmitting the at least one random access preamble being determined based on a reception result of the at least one synchronization signal,
   wherein the at least one resource for transmitting the at least one random access preamble corresponds to an index of the synchronization signal, in case that a measurement result of the at least one synchronization signal is greater than a predetermined threshold value.

8. The method of claim 7, further comprising:
   transmitting, to the terminal, information on mapping between the index of at least one synchronization signal and at least one resource for a random access preamble transmission.

9. A terminal in a wireless communication system, the terminal comprising:
   a transceiver; and
   at least one processor configured to:
      transmit, to a base station via the transceiver, at least one random access preamble using at least one resource for transmitting the at least one random access preamble,
      monitor a random access response based on a random access response window,
      identify that the random access response is not received within the random access response window,
      determine to retransmit, to the base station, at least one random access preamble in case that the random access response is not received within the random access response window,
      identify whether a transmission beam for a retransmission is changed based on the determining to retransmit the at least one random access preamble,
      determine to suspend a power ramping counter in case that the transmission beam for the retransmission is changed, and
      retransmit, to the base station via the transceiver, at least one random access preamble, based on the determined power ramping counter.

10. The terminal of claim 9, wherein the at least one processor is further configured to:
    determine to increment a power ramping counter by a predetermined value, in case that the transmission beam for the retransmission is not changed.

11. The terminal of claim 9, wherein the at least one processor is further configured to:
    receive, from the base station via the transceiver, at least one synchronization signal, in case that a measurement result of at least one synchronization signal is greater than a predetermined threshold value, identify an index of the at least one synchronization signal, determine at least one resource for transmitting at least one random access preamble corresponding to the identified index of the synchronization signal, and transmit, to the base station via the transceiver, the at least one random access preamble based on the determined at least one resource for transmitting the at least one random access preamble.

12. The terminal of claim 11, wherein the at least one processor is further configured to:
receive, from the base station via the transceiver, information on mapping between the index of at least one synchronization signal and at least one resource for a random access preamble transmission.

13. A base station in a wireless communication system, the base station comprising:
a transceiver; and
at least one processor configured to:
receive, from a terminal via the transceiver, at least one random access preamble using at least one resource for transmitting the at least one random access preamble, and
receive, from the terminal via the transceiver, at least one random access preamble which is retransmitted based on a power ramping counter,
wherein a random access response is monitored based on a random access response window, by the terminal, that the random access response is not received within the random access response window is identified, a retransmission is determined, to suspend a power ramping counter is determined in case that a transmission beam for the retransmission is changed.

14. The base station of claim 13, wherein to increment a power ramping counter by a predetermined value is determined, in case that the transmission beam for the retransmission is not changed.

15. The base station of claim 13, wherein the at least one processor is further configured to:
transmit, to the terminal via the transceiver, at least one synchronization signal, and
receive, from the terminal via the transceiver, the at least one random access preamble based on at least one resource for transmitting the at least one random access preamble, the at least one resource for transmitting the at least one random access preamble being determined based on a reception result of the at least one synchronization signal,
wherein the at least one resource for transmitting the at least one random access preamble corresponds to an index of the synchronization signal, in case that a measurement result of the at least one synchronization signal is greater than a predetermined threshold value.

16. The base station of claim 15, wherein the at least one processor is further configured to:
transmit, to the terminal via the transceiver, information on mapping between the index of at least one synchronization signal and at least one resource for a random access preamble transmission.

* * * * *